United States Patent
Lyman et al.

(10) Patent No.: US 10,304,305 B2
(45) Date of Patent: May 28, 2019

(54) LOCKDOWN APPARATUS FOR INITIATION OF LOCKDOWN PROCEDURES AT A FACILITY DURING AN EMERGENCY

(71) Applicant: EMERGENCY ALERT SOLUTIONS GROUP, LLC, Great Falls, VA (US)

(72) Inventors: Brian M. Lyman, Great Falls, VA (US); Kevin G. Cherven, Great Falls, VA (US)

(73) Assignee: EMERGENCY ALERT SOLUTIONS GROUP, LLC, Great Falls, VA (US)

( * ) Notice: Subject to any disclaimer, the term of this patent is extended or adjusted under 35 U.S.C. 154(b) by 0 days.

(21) Appl. No.: 15/859,177

(22) Filed: Dec. 29, 2017

(65) Prior Publication Data

US 2018/0120899 A1 May 3, 2018

Related U.S. Application Data

(63) Continuation of application No. 15/642,286, filed on Jul. 5, 2017, which is a continuation of application
(Continued)

(51) Int. Cl.
*G08B 21/00* (2006.01)
*G08B 17/02* (2006.01)
(Continued)

(52) U.S. Cl.
CPC .......... *G08B 17/02* (2013.01); *G06F 1/1632* (2013.01); *G07C 9/00* (2013.01); *G07C 9/00182* (2013.01); *G08B 3/10* (2013.01); *G08B 5/38* (2013.01); *G08B 7/06* (2013.01); *G08B 19/005* (2013.01); *G08B 25/001* (2013.01); *G08B 25/008* (2013.01); *G08B 25/10* (2013.01);
(Continued)

(58) Field of Classification Search
CPC ...... G08B 17/02; G08B 19/005; G08B 25/12; H04W 4/90; G09B 5/04; G07C 2009/00269
See application file for complete search history.

(56) References Cited

U.S. PATENT DOCUMENTS 7,277,018 B2   10/2007  Reyes et al.
7,460,020 B2 * 12/2008  Reyes ...................... G08B 7/06
                                                        340/506
(Continued)

*Primary Examiner* — Adnan Aziz
(74) *Attorney, Agent, or Firm* — Kenealy Vaidya LLP

(57) ABSTRACT

Some embodiments are directed to a lockdown apparatus for facilitating initiation of lockdown procedures at a facility. The lockdown apparatus can include an actuator configured to transmit a lockdown initiation signal upon being actuated. The actuator can be configured to be recognizably distinguishable from a fire alarm actuator. The lockdown apparatus can also include a lockdown communicator configured to produce a lockdown communication for communicating initiation of lockdown procedures to the facility occupants and individuals not disposed proximate the facility upon transmission of the lockdown initiation signal, the lockdown communication being recognizably distinguishable from the fire alarm communication. The lockdown communicator can also include a vibrator that creates vibrations of sufficient strength to be perceivable by facility occupants upon transmission of the lockdown initiation signal.

20 Claims, 10 Drawing Sheets

Related U.S. Application Data

No. 15/419,917, filed on Jan. 30, 2017, now Pat. No. 9,734,700, which is a continuation of application No. 15/250,766, filed on Aug. 29, 2016, now Pat. No. 9,589,449, which is a continuation of application No. 15/015,625, filed on Feb. 4, 2016, now Pat. No. 9,454,890, which is a continuation of application No. 14/286,377, filed on May 23, 2014, now Pat. No. 9,286,790.

(51) Int. Cl.

| | | |
|---|---|---|
| *G08B 25/12* | (2006.01) | |
| *G07C 9/00* | (2006.01) | |
| *H04W 4/90* | (2018.01) | |
| *G09B 5/04* | (2006.01) | |
| *H04L 29/08* | (2006.01) | |
| *H04M 1/02* | (2006.01) | |
| *G08B 3/10* | (2006.01) | |
| *G08B 5/38* | (2006.01) | |
| *G08B 25/00* | (2006.01) | |
| *G08B 7/06* | (2006.01) | |
| *G08B 19/00* | (2006.01) | |
| *G08B 25/10* | (2006.01) | |
| *G06F 1/16* | (2006.01) | |
| *H04W 4/14* | (2009.01) | |

(52) U.S. Cl.
CPC .............. *G08B 25/12* (2013.01); *G09B 5/04* (2013.01); *H04L 67/12* (2013.01); *H04M 1/0202* (2013.01); *H04W 4/90* (2018.02); *G07C 2009/00269* (2013.01); *H04W 4/14* (2013.01)

(56) References Cited

U.S. PATENT DOCUMENTS

| | | | |
|---|---|---|---|
| 8,427,297 B1* | 4/2013 | Markey | G08B 7/06 340/3.1 |
| 2003/0206096 A1* | 11/2003 | Right | G08B 25/12 340/287 |
| 2010/0245087 A1* | 9/2010 | Gerner | G07C 9/00111 340/541 |
| 2014/0291070 A1* | 10/2014 | White | A62B 1/20 182/49 |
| 2015/0015381 A1 | 1/2015 | McNutt | |
| 2015/0130609 A1* | 5/2015 | Jacobs | G08B 25/12 340/517 |
| 2015/0215755 A1* | 7/2015 | Bekanich | H04W 4/22 455/404.1 |
| 2016/0232774 A1* | 8/2016 | Noland | G08B 13/1672 |
| 2017/0004694 A1* | 1/2017 | Dodson | G08B 25/006 |
| 2017/0069196 A1* | 3/2017 | Jacobs | G08B 25/12 |

\* cited by examiner

LOCKDOWN APPARATUS FOR INITIATION OF LOCKDOWN PROCEDURES AT A FACILITY DURING AN EMERGENCY

CROSS REFERENCE TO RELATED APPLICATION

This application is a continuation of U.S. patent application Ser. No. 15/642,286 filed on Jul. 5, 2017, and allowed on Sep. 13, 2017, which is a continuation of U.S. patent application Ser. No. 15/419,917 filed on Jan. 30, 2017, which is a continuation of U.S. patent application Ser. No. 15/250,766 filed on Aug. 29, 2016 and allowed on Oct. 23, 2016, which is a continuation of U.S. patent application Ser. No. 15/015,625 filed on Feb. 4, 2016 and issued on Jun. 9, 2016, as U.S. Pat. No. 9,454,890, which is a continuation of U.S. patent application Ser. No. 14/286,377 filed on May 23, 2014 and issued on Mar. 15, 2016 as U.S. Pat. No. 9,286,790, the contents of each of which are herein incorporated by reference in their entireties.

BACKGROUND

The present disclosure relates to methods and apparatus for enhancing safety and/or security in potentially dangerous situations. More particularly, some of these embodiments are directed to addressing safety and/or security issues, such as those issues involving or otherwise related to emergencies in facilities.

Unfortunately, violent incidents in or around schools in the United States, including shootings, have been a regular occurrence for decades. Over the 40 years preceding the Apr. 20, 1999, Columbine, Colo. mass shooting, more than 150 students and staff members were killed in U.S. school related shooting incidents. More disturbingly, in just the 14 years since Columbine, over 114 school shootings have resulted in the deaths of more than 190 students and staff members. The incidences of shootings at other facilities, such as hospitals, malls, movie theaters, post offices, and other government/military instillations, have also significantly increased over the past several years.

The internet's free flow of information, copycats, dissemination and ease in obtaining guns, limitations of our mental health institutions, and the lack of jobs in the economy, all operate to increase the propensity of more shootings, including mass shootings. The magnitude of this threat is tremendous based on the large number of potential targets. For example, the United States has over 132,000 public and private K-12 schools, over 4,400 colleges and universities, and over 117,000 daycare facilities.

SUMMARY

The handling of violent situations in schools and other facilities has been the focus of much discussion over the last decade based on the large number of recent incidences of violence, and the accompanying media attention. However, the related art fails to provide any methods or apparatus for sufficiently addressing the above threat, such as by sufficiently impeding or preventing shooting(s) or other types at violence, and/or by enhancing safety and/or security once the shooting(s) or other types of violence has initiated, even though evidence suggests that this epidemic of violence will become even more prolific. This failure in the related art is especially egregious when contrasted with the tremendous resources allocated to other safety related issues that generate or otherwise involve fewer casualties. For example, fire safety is heavily regulated by state and/or federal codes that require all schools to maintain resilient file alarm systems and to regularly perform effective fire drills, even though no student in the U.S. has died in a school fire in the last 50 years.

It may therefore be beneficial to provide methods and apparatus for enhancing safety and/or security in potentially dangerous situations, and in particular addressing safety and/or security issues that involve or are otherwise related to emergencies. The emergencies addressed by some of these embodiments relate to shooting(s) and/or other types of violence at facilities, including but not limited to events referred to in the present disclosure as active shooter situations that warrant or otherwise involve lockdown situations or lockdown related procedures. In other words, these embodiments relate to situations where it may be beneficial to contain facility occupants to a locked or otherwise secured room or location in order to restrict entry and/or exit from those areas for the purpose of minimizing exposure to injury or death that could directly or indirectly result from the active shooter situation. Thus, some of the disclosed embodiments are directed to, or otherwise operate in the context of, lockdown situations at such facilities involving active shooter situations.

It is intended that embodiments of the present disclosure be applicable to any type of facility, such as indoor or outdoor facilities, or combinations of both, including but not limited to: 1) buildings and/or grounds of buildings; 2) aircraft, ships and other types of transportation related vehicles; and 3) any other type of area that can be subjected to safety and/or security issues, such as underground or underwater facilities, offshore platforms such as oil rigs, outdoor gathering places such as outdoor malls and flea markets, sports arenas, etc., and other facilities that include indoor, covered, and/or outdoor areas. It is also intended that embodiments of the present disclosure not be limited to active shooter situations, and instead be applicable in any type of potentially dangerous situation, such as situations involving any type of emergency. In addition, embodiments of the present disclosure are intended to enhance the safety and/or security of anything, including people, animals and other organisms, personal and real property, etc., regardless of whether the object of protection is disposed at the facility.

Many of the embodiments are disclosed herein in the context of addressing emergency situations in and around buildings, such as schools, pre-schools, college campuses, training facilities, recreational facilities, country clubs, sports clubs including health clubs, restaurants, banks, commercial and/or government offices, court houses, factories and/or other manufacturing facilities, movie theaters, concert halls, hotels, casinos, residences, condominiums, apartment buildings, housing complexes, shops, shopping malls, grocery stores, automotive dealerships, hospitals, medical centers, post offices, government/military instillations, sports arenas, airports, bus terminals, train stations, libraries, museums, prisons, and any other facilities in which people gather. Some of the emergencies addressed by these embodiments include violent incidents including but not limited to incidents involving the unlawful use of firearms and/or other dangerous weapons at these facilities. However, even though much of the present disclosure is provided in the context of the above specific applications, such as active shooter type incidents at schools, it is intended that the various inventive aspects be applied in many other different facilities and other types of situations, such as weather related emergencies, facility investigations, etc.

Some of the disclosed embodiments include apparatus that directly or indirectly addresses the above safety and/or security issues. The term apparatus as used in the present disclosure is intended to include any tangible objects; software or computer programs capable of performing the various disclosed determinations, operations, calculations, etc.; products of manufacture; particles of matter; etc. Other embodiments are directed to methods of manufacturing and/or methods of using the above apparatus. Still other embodiments are directed to methods or procedures for directly or indirectly addressing or relating to the above safety and/or security issues, such as the lockdown procedures themselves, which can be performed in conjunction with the above apparatus or alternatively in isolation from the above apparatus.

Various of the disclosed embodiments applicable to lockdown situations include, or directly or indirectly relate to, methods and apparatus for: 1) initiating and/or otherwise communicating the lockdown situation; 2) procedures to be followed subsequent to initiation of the lockdown situation and/or communication thereof; and/or 3) terminating or otherwise communicating the termination of a lockdown situation. Some aspects of these methods and apparatus are summarized below, and an index of topics is provided for convenience.

I. Initiating and/or Otherwise Communicating the Lockdown Situation
   A. Actuator
      1. Manually Operated Actuator
         a. Actuator Configuration
         b. Procedures for Actuation
      2. Automatic Actuator
   B. Communicator
      1. Individuals Located at or in Proximity to the Facility in Lockdown
         a. Annunciator
         b. Visual Indicator
         c. Other Mediums
         d. Results of Communication
      2. Individuals Not Located at or in Proximity to the Facility in Lockdown
   C. Other Apparatus and Methods Effective at Lockdown Initiation II. Procedures Subsequent to Initiation/Communication of Lockdown
   A. Individuals Located at or in Proximity to the Facility in Lockdown
      1. Basic Lockdown Procedures
      2. Response Time Versus Duration of Safety Zone
      3. Response Based on Immediacy and Context of Danger
      4. Communications During Lockdown
   B. Individuals Not Located at or in Proximity to the Facility in Lockdown
      1. Authorities Addressing Circumstances Giving Rise to Lockdown
      2. Individuals Facilitating Favorable Outcomes at Facility in Lockdown
      3. Individuals Not Providing Benefit to Facility in Lockdown III. System Summary I. Initiating and/or Otherwise Communicating the Lockdown Situation Embodiments are intended to include various methods and apparatus for initiating and/or otherwise communicating a lockdown situation. A few exemplary methods and apparatus are summarized below for exemplary purposes, and are not intended to be construed as a mandatory or exhaustive listing of such methods and apparatus. Embodiments are intended to include all known, related art, and/or later developed technologies for implementing any and all of the operations disclosed below and elsewhere in the disclosure in the context of initiating and/or otherwise communicating a lockdown situation.

A. Actuator

Some embodiments include an actuator for facilitating initiation of lockdown procedures. Embodiments are intended to include or otherwise involve any type of actuator that enables initiation of the lockdown procedures, including known, related art, and/or later developed technologies.

1. Manually Operated Actuator

Some embodiments include a manually operated actuator or multiple manually operated actuators, which can be manually operated by a user to initiate lockdown procedures or as part of a procedure for initiating lockdown procedures. Any type of manually operated actuator can be used, however many embodiments include manually operated actuators that are relatively easy and intuitive to operate, while also being configured to impede or otherwise resist accidental or unintentional actuation.

a. Actuator Configuration

In some of these embodiments, the manually operated actuator includes a switch or button (which in some embodiments is circular) that facilitates initiation of lockdown procedures upon being pressed or otherwise actuated. In some embodiments, the button needs to be pressed for actuation with a sufficient force and/or depressed for a certain period to impede or otherwise reduce accidental or unintentional actuations. In some of these embodiments, the actuator or button is configured to increase recognizability or ease of identification especially in comparison to fire alarm pull stations and other switches or apparatus, including but not limited to those that may be disposed proximate to the actuator or button. The actuator configurations that facilitate recognition and identification include size, shape, color, texture, location, disposition, orientation, method of operation, etc. However, as indicated above, it is also important for the actuator embodiments to be configured for relatively easy and intuitive operation to facilitate swift actuation, by many different types of people (including children), in very stressful situations.

Some embodiments include at least one statically disposed or stationary manually operated actuator, which can be permanently disposed at a certain location. For example, some embodiments include a single manually operated actuator that is permanently disposed at a certain location. For example, it may be beneficial for the actuator of these embodiments to be disposed at a front office, such as at or proximate a main entrance of a school, so that it can be conveniently actuated by relevant school officials present at that location. By virtue of their location, the officials located proximate the school's main entrance may be some of the first officials able to recognize a situation warranting a lockdown, such as entry into the school of an active shooter, and thus convenient actuation by these officials may expedite initiation of the lockdown. Alternatively or additionally, it may be beneficial to dispose a static manually operated actuator in or proximate the office of a senior school official, such as the Vice-Principal or Principal, for various reasons, such as to ensure convenient actuation by an official with authorization to initiate lockdown, its proximity to the main entrance, etc.

However, other embodiments include multiple statically disposed manually operated actuators at the above and/or other locations. For example, it may be beneficial to dispose manually operated actuators at a facility's common areas, such as along the hallways, entrances/exits, etc., of a school.

It may also be beneficial to dispose the actuators in other locations, such as in individual rooms, such as in classrooms, gymnasiums, etc.

In some of these embodiments, the manually operated actuators are disposed proximate or at locations similar to fire alarm actuators (pull stations). The disposition of these actuators can be tailored or otherwise dictated by the locations relevant to identification of circumstances warranting initiation of lockdown to facilitate expedited actuation. For example, the actuators can be located proximate the circumstances that warrant the lockdown, such as nearby anticipated locations of violence. Alternatively or additionally, the actuators can be located proximate to facility occupants who are most likely to identify circumstances warranting initiation of the lockdown to facilitate expedited actuation, including not only anticipated locations of violence, but also facility monitoring stations.

In addition or as an alternative to the statically disposed manually operated actuators, some embodiments include mobile manually operated actuators. In some of these embodiments, the mobile actuators are configured to be carried on the person of certain facility occupants. For example, the mobile actuators can be carried by teachers and/or other school officials. The mobile actuators may be beneficial for various reasons, such as by expediting actuation and thus initiation of lockdown.

Embodiments are intended to include any mobile actuator configuration. For example, the mobile actuator can constitute a designated single purpose device that is solely directed to actuation, such as in the context of lockdown. Some of these embodiments are configured to facilitate ease in carrying the actuator, such as by being: 1) attached to a necklace or other device to be worn around the neck, 2) attached to a clip or other device for attachment to a belt, existing security card, etc., 3) sized for disposition in a pocket, etc.

Alternatively, the mobile actuator can constitute a part of a multi-purpose device that is directed or otherwise configured for operation(s) in addition to actuation, such as in the context of lockdown. In some of these embodiments, the actuator operations are provided via another electronic device, such as a mobile phone, smart phone, iPad, etc. For example, some or all of the actuator operations may be provided via an application on a smart phone. These embodiments can be beneficial such as for reasons of convenience, i.e., many or all of the relevant facility occupants (such as teachers and/or other school officials) already own and/or regularly carry such devices.

Embodiments of the static and mobile actuators are intended to include any and all useful configurations. For example, with regard to the static actuators, embodiments are intended to include any structure that reduces, minimizes, impedes, or prevents accidental or unintended actuation. In some such embodiments, a transparent surface or shield is provided over or around a button that communicates actuation upon being depressed. In some of these embodiments, the shield is in the form of a hinged member that can be manually rotated to expose the button for actuation. In other embodiments, the shield breaks or is otherwise deformed upon being subjected to a sufficient force to thereby enable the button to be actuated.

Embodiments are also intended to include any and all useful apparatus that may supplement the actuators. For example, some embodiments of the static actuators also include apparatus for monitoring the environment of the actuators. In some embodiments, a camera or video recorder can be provided proximate the actuators, which may be beneficial for various reasons. In some of these embodiments, the camera or video recorder can capture a still or video image that may be relevant to determining the cause of actuation of the actuator, circumstances surrounding or prompting initiation of the lockdown procedures, identification of the individual actually engaging or actuating the actuator, etc.

b. Procedures for Actuation

Some embodiments are directed to methods and/or apparatus for identifying and/or facilitating the identification of situations or circumstances warranting the initiation of lockdown procedures. Identification of these situations and circumstances can be used to guide the manual actuation of the actuators. For example, some embodiments include apparatus and/or methods for guiding, training, or instructing facility occupants as to the proper situations and circumstances that warrant manual actuation of the actuator. As disclosed herein, safety and/or security can be enhanced by swiftly identifying potentially dangerous situations. For example, early identification of an active shooter can be used as an early warning to inform facility occupants to initiate procedures designed to prevent or reduce casualties.

As one example, apparatus can be disposed at facility entrances/exits to communicate that certain individuals, such as visitors, must perform certain procedures, such as procedures related to obtaining authorization for entry, confirmation of entry (such as by signing in), etc. Embodiments are intended to include or otherwise cover any type of methods and apparatus for performing this operation. For example, this apparatus can be in the form of a sign communicating the prescribed procedures. Facility officials can be trained, guided, or instructed to manually actuate an actuator if a visitor fails to follow the prescribed procedures subsequent to entry. In some embodiments, the visitor's failure to follow the prescribed procedures is sufficient to warrant manual actuation, while in other embodiments manual actuation is only warranted after additional events, such as the visitor's continued failure to follow the prescribed procedures even after being personally confronted by the facility official.

The above and/or other methods and apparatus can facilitate or expedite the identification of situations or circumstances warranting the initiation of lockdown procedures in other ways. For example, these methods and apparatus can educate facility occupants as to recommended procedures in certain situations. In some of these embodiments, the apparatus and methods direct the facility occupants to recognize gunfire, and to then follow recommended procedures, such as to assume the worst-case scenario, avoid investigating the situation, and instead to immediately actuate the actuator to initiate a lockdown and then follow lockdown procedures.

2. Automatic Actuator

Alternatively, or in addition to the manually operated actuators, automatic actuators can be used to facilitate initiation of lockdown procedures. Embodiments are intended to include or otherwise cover any type of automatic actuators that are beneficial in the context or application of the system. For example, in the context of a lockdown system for a facility, automatic actuators can be used that include a sensor that senses gunfire, such as via acoustic and/or vibration sensing techniques or technologies. In these embodiments, the automatic actuator facilitates initiation of the lockdown procedures upon sensing the sounds and/or vibrations of gunfire. Similarly, some automatic actuators may include sensors that sense the release or existence of certain types of gasses that would warrant initiation of lockdown procedures, such as pepper spray, tear gas, gasses related to weapons' discharge, etc.

B. Communicator

Some embodiments include a communicator for facilitating communication of initiation of lockdown procedures. Embodiments are intended to include or otherwise involve any type of communicator that enables the communication of initiation of the lockdown procedures, including known, related art, and/or later developed technologies.

The communicators and communication methods of some of the embodiments include two types of apparatus and/or operations, which are each summarized below. Characterizing the different types of communicators and communication methods is not intended as limiting in any way, and is merely provided for explanatory purposes. For example, in some embodiments, both types can be provided by the same unitary or integral apparatus, or form part of the same method or step. Alternatively, in other embodiments, both types are provided via separate and discreet apparatus, methods, or steps.

The first type includes apparatus and/or methods that directly communicate initiation of the lockdown procedures to individuals located at or in proximity to the facility in lockdown, such as via annunciators, visual indicators, etc. Another example of this first type includes apparatus and/or methods that directly communicate initiation of the lockdown procedures to individuals not located at or in proximity to the facility in lockdown, such as electronics, software, telecommunications equipment, etc., that perform this operation via voice messaging, text messaging, SMS, etc., utilizing hard-wired, wireless, and/or other technologies.

The second type includes apparatus and methods that structurally, functionally, and/or operationally connect the actuators with the first type of communicators. For example, the second type includes apparatus and methods for enabling or instructing the first type of communicator to perform the appropriate and/or timely communication of initiation of the lockdown procedures if the actuator is actuated. In other words, the second type includes any apparatus and methods for initiating operation of the first type of communicator upon actuation of any of the actuators. Examples of the second type include any apparatus and/or method for generating and/or receiving a signal indicating actuation of any of the actuators, and transmitting the signal or another signal to instruct any of the first type of communicators to perform the timely and appropriate communication of initiation of the lockdown.

Embodiments of the second type include any and all technologies for performing this operation, including hard-wired, wireless, processor implemented, and/or other technologies. In particular, some embodiments of the second type of communicator include signal/message generators, transmitters, and/or receivers, as well as relevant lines or modes of transmission. Some of the embodiments dispose all or some of the apparatus of the second type in a centralized location, such as at a control panel, while other embodiments dispose this apparatus at different locations.

A few exemplary embodiments of communicators or communication procedures (some of which are constituted by the above first type, while others are constituted by both of the first and second types) are disclosed below in two different contexts. Specifically, the embodiments are disclosed below in the contexts of communicating to: 1) individuals located at or in proximity to the facility in lockdown; and 2) individuals not located at or in proximity to the facility in lockdown. However, this distinction is not intended as limiting in any way, and is merely provided for explanatory purposes. For example, in some embodiments, both types can be provided by the same unitary or integral apparatus, or form part of the same method or step. Alternatively, in other embodiments, both types are provided via separate and discreet apparatus, methods, or steps.

1. Individuals Located at or in Proximity to the Facility in Lockdown

Some embodiments include a communicator that communicates initiation of the lockdown procedures to individuals located at or in proximity to the facility in lockdown. These embodiments are intended to include any type, location, orientation, or configuration of communicator that is able to perform this operation, i.e., to communicate the initiation of lockdown procedures to individuals located at or in proximity to the facility in lockdown. The embodiments are intended to include or otherwise cover any type or medium of recognizable or identifiable communication, including but not limited to audio, visual, vibratory, and/or other types of communications that can be recognized by an individual located at or in proximity to the facility in lockdown, including individuals who may be at risk of injury or death based on the circumstances warranting the lockdown.

a. Annunciator

Some of these embodiments include an annunciator that provides an audible signal that can be heard by individuals at or in proximity to the facility in lockdown. Embodiments are intended to include any type, disposition, orientation, or configuration of annunciator that communicates initiation of the lockdown procedures to individuals at or in the vicinity of the facility.

It may be beneficial for the annunciator to be configured, disposed and/or oriented to provide an audible signal that is easily recognizable or identifiable as indicating initiation of the lockdown. In other words, annunciation can be provided to enhance swift and effective recognition of facility occupants that a lockdown situation has been initiated and to avoid confusion. Thus, some embodiments provide a loud and/or otherwise distinctive audible alarm that facilitates recognition or identification by the facility occupants of the lockdown. Some embodiments accomplish this operation by providing an audible alarm that sounds very different as compared to other relevant sounds, such as a fire alarm. It may also be beneficial for the annunciators to be distinctive in other respects, such as by virtue of their disposition, orientation, etc., to enhance identification or recognition. However, as explained in other sections of the present disclosure, some embodiments include other or additional types or forms of indication of initiation of lockdown (such as visual indication), which may be especially advantageous in applications where some or all facility occupants find it challenging or impossible to recognize an audible annunciation, such as individuals who are hearing impaired.

Distinction from a fire alarm can be especially beneficial for other reasons. For example, as explained below and elsewhere in the present disclosure, fire alarms and lockdowns often require very different, and in some cases opposite, responses. Thus, it may be very beneficial for facility occupants to not mistake a lockdown for a fire situation, and vice versa, for safety reasons. In other words, and as explained in more detail below, participating in fire alarm procedures in a lockdown situation may place the facility occupants at greater risk of injury or death.

In accordance with many fire alarm procedures at certain facilities, such as schools, the building occupants are instructed to exit the facility in an orderly and methodical manner to ensure that all facility occupants have been evacuated, i.e., to reduce the likelihood that an occupant has erroneously failed to evacuate. In many cases, the students are lined up in the hallways, and marched out of the school. The students are then often instructed to wait outside of the school at a location on the school grounds until the fire procedure is completed, and typically are deposited at a location in the line of sight of the school or entrances/exits of the school. Although it may be beneficial for this evacuation to be performed in a swift of expedited manner, it typically is not necessary to evacuate all occupants from the school in an extremely short period, such as in a matter of seconds.

Contrarily, in many lockdowns, such as those involving an active shooter, under certain circumstances, it may be preferable to shelter in place and to not immediately evacuate the building. For example, it can be preferable in these situations to be disposed in a secure location, such as in a classroom with the door locked. It can be preferable to stay in that secured location until responding police or other emergency officials arrive and evacuate occupants from each location. Further, it can be preferable for facility occupants to ultimately evacuate to a location that is disposed a certain distance from the facility in lockdown, such as at a location that is not in the line of sight of the facility and/or entrances/exits thereof.

In some such embodiments, the annunciator provides a loud and continuous tone for a period, such as approximately 10 to 15 seconds, followed by a pre-recorded audio message of "lockdown, lockdown, lockdown," and then another period (such as 10 to 15 seconds) of the continuous tone. In some embodiments, this cycle repeats itself a number of times that is sufficient to ensure (or provide a high likelihood) of the individuals at or in the vicinity of the facility hearing the alarm and being quickly notified or otherwise understanding that the facility is in lockdown. In some of these embodiments, the cycle repeats itself three times, for a total duration of just over 60 to 90 seconds, before resetting itself, i.e., discontinuing the annunciation. It is beneficial that some embodiments reset or otherwise cease the audible alarm after a certain number of cycles so that the audible signal ceases before first responders arrive at the facility to enhance or at least not impede communications between the first responders and to otherwise avoid unwanted confusion. However, all of the above aspects of the annunciation are merely provided for exemplary purposes, and embodiments are intended to cover many additional and alternative types or aspects of annunciation.

It may also be beneficial for the annunciator to be configured, oriented and/or disposed to facilitate resiliency, such as to impede being tampered with or disabled as a direct or indirect result of the circumstances that warranted, are related to, or are otherwise the cause of, initiation of the lockdown. In some of these embodiments, the annunciator is configured, oriented and/or disposed to prevent or impede being tampered with or otherwise being disabled by an individual whose actions warrant, or are otherwise the cause of, the lockdown, such as an active shooter.

b. Visual Indicator

As an alternative or in addition to the annunciators disclosed above, some embodiments include a visual indicator. Embodiments are intended to include any type of visual indicator that communicates initiation of the lockdown procedures to individuals at, or in the vicinity of, the facility.

The visual indicators of some embodiments include a strobe that emits light to communicate the lockdown to individuals at, or in the vicinity of, the facility. It may be beneficial for the light, e.g., strobe, to be configured to provide light that is easily recognizable or identifiable as indicating initiation of the lockdown, such as very bright light. In other words, the light can be provided to enhance swift and effective recognition by facility occupants that a lockdown situation has been initiated and to avoid confusion. Thus, as with the annunciators, it may be beneficial for the strobes or other visual indicators to be visually distinctive as compared to other relevant lights, such as a fire alarm strobes. For example, since fire alarm strobes typically emit clear light, it may be beneficial for the lockdown strobes to emitted colored light. It may also be beneficial for the strobes to be distinctive in other respects, such as by virtue of their disposition, orientation, etc., to enhance identification or recognition.

In some such embodiments, the lockdown strobes emit light that matches or is otherwise coordinated with other colors used in conjunction with, or otherwise relevant to, various aspects of the lockdown system. For example, the color of the strobe lights can be the same, substantially the same, or similar to, the color of all or portions of the actuator. In an exemplary embodiment where all or portions of the actuator, such as the actuator button, is blue, then the strobe can emit blue light. Alternatively, in an embodiment where all or portions of the actuator, such as the actuator button, is green, then the strobe can emit green light.

It may be beneficial for some embodiments to adopt a color or a common color that is different from colors of apparatus used for other or similar purposes in the facility. For example, if all or portions of elements of the fire alarm in a certain facility are red and/or black, then it may be advantageous for the light emitted by the strobe to be a different color to avoid the confusion disclosed above. The same may be true for other features of the disclosed lockdown system, including but not limited to the actuator.

Adopting a common color scheme or theme may be beneficial for various reasons. For example, facility occupants can be trained and/or otherwise become familiar with the common color scheme or theme to enable them to more easily identify or recognize indication of a lockdown. As discussed above, it may be especially beneficial to enable facility occupants to distinguish a lockdown from a fire alarm.

It may also be beneficial for the visual indicator to be configured, oriented and/or disposed to facilitate resiliency, such as to impede being tampered with or disabled as a direct or indirect result of the circumstances that warranted, are related to, or are otherwise the cause of initiation of the lockdown. In some of these embodiments, the visual indicator is configured, oriented and/or disposed to prevent or impede being tampered with or otherwise being disabled by an individual whose actions warrant or are otherwise the cause of the lockdown, such as an active shooter.

Contrary to the annunciator, it may be beneficial for the visual indicator to not automatically reset itself. Continuing to emit light can be beneficial to communicate that the facility is still subject to lockdown procedures. However, the continued emission of light may not impede or significantly impede efforts or communications with and among responding authorities, or at least may only impede those efforts to a lesser degree than the annunciators. The continued emission of light, such as via the disclosed visual indicators, subsequent to cessation of the audible annunciations (audible alarms, warnings, etc.) may be beneficial by communicating to facility occupants, responding authorities, etc., that a lockdown has occurred and/or may still be occurring.

c. Other Mediums

As an alternative or in addition to the annunciators and visual indicators disclosed above, some embodiments include other types of indicators or modes of communication. Embodiments are intended to include any type of other indicator using any medium that directly or indirectly communicates or facilitates communication of initiation of the lockdown procedures to individuals at, or in the vicinity of, the facility.

For example, some embodiments include a vibration creation device that creates vibrations that can be perceived by individuals at, or in the vicinity of, the facility. These embodiments can be beneficial by providing another medium through which individuals can be alerted of the lockdown, which may speed up or otherwise expedite recognition or identification by those individuals of the lockdown. These embodiments may be especially beneficial for communicating initiation of lockdown procedures to individuals who have some sort of sensory impairment, such as those unable to recognize audible and/or visual alarms, or whose recognition of these alarms is impaired. In some of these embodiments, the vibration creation device generates vibrations in a form or code that helps to communicate the lockdown or sense of emergency. For example, the vibrations can be generated and transmitted in a code, such as Morse Code, to communicate the emergency, such as SOS, i.e., dot dot dot, dash dash dash, dot dot dot.

However, the above vibration creation device is merely provided for exemplary purposes, and embodiments are intended to include any type of other indicator or modes of communication that communicates or facilitates communication of initiation of the lockdown procedures to individuals at, or in the vicinity of, the facility. For example, a video image can be provided that communicates the initiation of lockdown procedures. The video image can be in any form that performs this operation, such as a video of sign language communicating the lockdown, which may be especially beneficial for hearing impaired facility occupants.

Thus, part of the communication of lockdown, in addition to the annunciation and lights, could be a video explaining that lockdown procedures have initiated, and even performing this communication with sign language to benefit hearing impaired facility occupants. Some embodiments automatically play videos on screens, including permanently installed screens in the facility, and mobile screens such as mobile communication devices in the possession of facility occupants, e.g., smart phones, etc., explaining lockdown procedures to facility occupants. For example, in some embodiments, the video communicates to facility occupants to stay in a secured room and that authorities will be arriving shortly.

Some of these embodiments can be supplemented to provide the facility occupants with information relevant to the actual lockdown situation, such as the time remaining until responding authorities arrive. This information, i.e., time remaining until authorities arrive, can be determined using various techniques. For example, the time for authorities to arrive after being first notified can be predetermined, such as 5.5 minutes. The system can include a timer that initiates timing upon first actuation of an actuator. The elapsed time since first actuation of the actuator can then be subtracted from the predetermined response time for responding authorities to arrive at the facility. For example, if the predetermined time for authorities to arrive after being first notified is 5.5 minutes, and 3 minutes have elapsed since first actuation, then it can be estimated that the responding authorities will arrive in approximately 2.5 minutes.

However, other embodiments determine response times differently. For example, some embodiments receive actual information from the responding authorities indicating their estimated time of arrival. For example, responding authorities can transmit to the system their estimated time of arrival to the facility, and the system can then provide this information to the facility occupants.

However, other embodiments allow responding authorities to communicate additional or alternative information to the facility occupants. For example, in some embodiments, the responding authorities can communicate their position in the facility to the facility occupants, such as via the screens or other communication devices disclosed herein. This information may be especially beneficial by allowing responding authorities to more fully inform facility occupants as to the state of the emergency, which may enable facility occupants to make better decisions that affect their safety.

Other information can be communicated to the facility occupants that may provide the facility occupants with helpful information that can be used to make enhanced decisions that affect their safety. For example, video data from areas within the facility can be communicated to the screens disclosed above to enable the facility occupants to become informed as to the status of the emergency. This feature may be especially beneficial for facility occupants in lockdown, i.e., disposed in a secured location, who otherwise would have access to either no information or a limited amount of information, such as based solely on sounds that they can hear from their secured areas.

It may also be beneficial for the vibration creation device and/or other devices for communication of initiation of lockdown procedures to be configured, oriented and/or disposed to facilitate resiliency, such as to impede being tampered with or disabled as a direct or indirect result of the circumstances that warranted, are related to, or are otherwise the cause of, initiation of the lockdown. In some of these embodiments, the vibration creation device is configured, oriented and/or disposed to prevent or impede being tampered with or otherwise being disabled by an individual whose actions warrant or are otherwise the cause of the lockdown, such as an active shooter.

d. Results of Communication

A significant purpose of communicating initiation of lockdown procedures is to inform facility occupants of the lockdown so that they can make enhanced decisions that affect their safety. For example, it will often be beneficial for facility occupants to travel to and remain in a secured location until cessation of the lockdown.

However, communication of the lockdown may provide other advantages. For example, in certain emergency situations, communicating initiation of lockdown procedures may expedite resolution of the circumstances warranting the lockdown. For example, in certain circumstances, such as those involving active shooters, the arrival of authorities at the scene often prompts the active shooters to terminate the violence, such as by fleeing or terminating themselves. Thus, under certain circumstances, communicating initiation of lockdown may itself illicit a response from the active shooters to terminate the violence, such as by fleeing or terminating themselves. In other words, the active shooters may recognize the urgency of their situation, i.e., that responding authorities are likely to arrive shortly, and terminate the violence.

In fact, some embodiments tailor the type or substance of the communication indicating initiation of lockdown procedures to illicit this response. For example, some embodiments communicate to all facility occupants, including the active shooter, that responding authorities will be arriving shortly. In fact, some embodiments may provide communications to the facility occupants, including the active shooter, that masquerade as communications from responding authorities or otherwise provide a false indication that authorities have already arrived at the facility, in order to illicit this response form an active shooter. However, it may be beneficial for these embodiments to tailor any such communications to avoid or reduce confusion on the part of innocent facility occupants that could cause them to make decisions that jeopardize their safety.

2. Individuals Not Located at or in Proximity to the Facility in Lockdown

Some embodiments include a communicator that communicates initiation of the lockdown procedures to individuals not located at or in proximity to the facility in lockdown, as an alternative or in addition to communicating initiation of the lockdown procedures to individuals located at or in proximity to the facility in lockdown. These embodiments are intended to include any type or configuration, orientation or disposition of communicator that is able to perform this operation, i.e., to communicate the initiation of lockdown procedures to individuals not located at or in proximity to the facility in lockdown. The embodiments are intended to include or otherwise cover any type or medium of recognizable or identifiable communication, such as communications that can be recognized by an individual not located at or in proximity to the facility in lockdown, including individuals who are directly or indirectly tasked with officially or unofficially addressing the circumstances warranting the lockdown, or otherwise taking action relevant to the lockdown.

Some of the apparatus or operations that communicate initiation of the lockdown procedures to individuals not located at or in proximity to the facility in lockdown, include electronics, software, telecommunications equipment, etc., that perform this operation via voice messaging, text messaging, SMS, etc., utilizing hard-wired, wireless, and/or other technologies. In accordance with some of these embodiments, individuals not located at or in proximity to the facility in lockdown, including individuals who are directly or indirectly tasked with officially or unofficially addressing the circumstances warranting the lockdown, are contacted via telecommunications. For example, appropriate authorities, such as police, fire and emergency responders, medical personnel and other healthcare providers, etc., can be contacted using a recorded or otherwise predetermined message indicating that a certain facility is in lockdown. Alternatively or additionally, other types of messages can be sent to the appropriate authorities to ensure receipt of the communication.

Some embodiments of the communicators include apparatus and methods for ensuring safe and effective transmission of the communication to the appropriate authorities. For example, as an alternative or in addition to using the phone wires or lines for the communication, wireless transmitters can be used that perform the communication wirelessly. Wireless transmission of the communication can be beneficial to thwart, address, or otherwise overcome certain attempts to impede transmission of the communication, such as by cutting or otherwise disabling transmission along the phone or telecommunications wires or lines. In fact, some of the embodiments utilizing wireless transmissions include apparatus and methods for preventing, addressing, or overcoming the unwanted, illegal or otherwise intentional jamming or impedance of the wireless transmissions.

As indicated above, some of the recipients of the communication can include appropriate authorities, such as police, fire and emergency responders, medical personnel and other healthcare providers, etc. Some or all of these appropriate authorities are tasked with addressing the circumstances warranting the initiation of the lockdown. For example, the police responders may be tasked with neutralizing the shooter in the context of an active shooter situation, while responding medical personnel may be tasked with treating or otherwise addressing injuries caused by the circumstances warranting the initiation of the lockdown.

However, some embodiments also provide communications to individuals not located at or in proximity to the facility in lockdown, and who are not directly or indirectly tasked with officially or unofficially addressing the circumstances warranting the lockdown. In other words, some of these embodiments provide a communication to individuals who, while not tasked with addressing these circumstances, can play a role in facilitating more favorable outcomes. For example, it may be beneficial to inform relevant transportation officials, such as bus drivers, of a lockdown at a school. Receipt of this communication could enable the bus drivers to make decisions that facilitate favorable outcomes, such as by not transporting students or other individuals to a school currently under lockdown, such as students on their way to school, returning to school such as from a field trip, sports teams traveling to the school to or from a sporting event, etc. These actions may be advantageous for various reasons, such as by preventing or reducing exposure of those affected students and other individuals to the potentially dangerous circumstances giving rise to the lockdown, and by isolating the facility under lockdown, which can be beneficial for other or additional reasons, such as by not impeding efforts of responding authorities.

It may be beneficial to provide communications to still others who are not tasked with addressing these circumstances, and who cannot even play a role in facilitating more favorable outcomes at the facility in lockdown. For example, it may be beneficial for off-site school administrators to be informed of a lockdown at a school under the administrator's jurisdiction, which may facilitate investigative efforts subsequent to resolution of the circumstances warranting the lockdown.

It may similarly be beneficial for facility occupants to be informed of a lockdown at a different but related facility. For example, it may be beneficial for teachers, staff members, and/or administrators at different schools to be informed of a lockdown at a nearby school. Informing individuals at schools that are located in the same region as the school in lockdown may not only facilitate isolation of the school in lockdown, but also may provide a warning that the other schools may be at greater risk of experiencing, or being subjected to, circumstances that are the same or similar to those warranting the lockdown. Thus, this operation may provide or form a part of an early warning system. As one example, this warning can be used by the other schools to enhance swift recognition or identification of similar incidents, such as coordinated attacks on multiple schools in a region.

However, the above embodiment directed to schools disposed in a common region is only provided for exemplary purposes, and embodiments are intended to include or otherwise cover other applications where it may be beneficial for facilities to be notified of a lockdown in a different facility. For example, this operation could be provided in the contexts of libraries, museums, malls, post offices, airports, bus terminals, train stations, similar state or federal governmental facilities, etc. In one such embodiment, all libraries within a certain region would be notified in the event of an incident at a library within the region.

C. Other Apparatus and Methods Effective at Lockdown Initiation

Some of the above and/or other embodiments include other methods and apparatus that are effective or otherwise implemented upon initiation of lockdown. Some of these other methods and apparatus are disclosed below for exemplary purposes, and the following is not intended to constitute an exhaustive listing of all such other methods and apparatus. In fact, embodiments are intended to include any beneficial methods and apparatus that are effective or otherwise implemented upon initiation of lockdown.

It may be beneficial in certain circumstances to lock certain doors upon initiation of lockdown. For example, locking facility entrance doors may be beneficial in order to prevent entry of a certain individual related to the circumstances giving rise to the lockdown, such as an active shooter. Preventing entry of an active shooter into the facility would obviously enhance the safety of facility occupants. It may also be beneficial to lock certain facility internal doors upon initiation of a lockdown, such as to isolate an active shooter within the facility from facility occupants. For example, in the context of a school, it may be beneficial to lock classroom doors, as well as other relevant internal doors, such as doors to music rooms, gymnasiums, offices, etc.

Thus, some embodiments include methods and apparatus to accomplish the locking of such doors. In some of these embodiments, certain facility occupants are instructed to manually lock the doors. However, other embodiments include methods and apparatus for automatically locking the doors. In some of these embodiments, upon initiation of lockdown, a signal is generated and transmitted to door locks that are configured to automatically lock upon receipt of the signal.

In some of these embodiments, including both the manually and automatically actuated locks, the locks are configured to allow occupants to exit, but are locked to prevent entry into the space. This feature may be especially beneficial in situations where occupants need to exit the space for various reasons (e.g., to enhance safety of the occupants) such as in the context of a fire. However, locking the doors to prevent entrance into the space enhances safety because it prevents an individual related to the circumstances warranting the lockdown, such as an active shooter, from entering the space.

In addition or as an alternative, other embodiments include other methods and apparatus that are effective or otherwise implemented upon initiation of lockdown. For example, some embodiments include doors that automatically close upon initiation of a lockdown. These doors can include, but are not limited to fire doors, i.e., doors that automatically close in case of fire to facilitate fire containment and mitigation. Some of the doors of these embodiments also include locks that automatically lock upon initiation of the lockdown ort shortly thereafter.

These embodiments may be especially beneficial for various reasons. For example, closing and in some cases also locking the doors helps to isolate facility occupants from an individual related to the circumstances warranting the lockdown, such as an active shooter. In fact, locking such an individual in a certain space may not only isolate the active shooter from all facility occupants, but may also detain the active shooter and thereby facilitate the responding authorities in neutralizing the active shooter.

In addition or as alternative to the above disclosures, some embodiments focus on further hardening or strengthening the facility entrances/exits. For example, some embodiments always maintain some or all of the entrances/exits in a locked condition, and require that individuals obtain authorization prior to entry. Embodiments are intended to include or otherwise cover any methods and apparatus for implementing this authorization requirement, such as via audio and/or visual equipment (i.e., camera, intercoms, etc.). Some other related embodiments only maintain some or all of the entrances/exits in a locked condition at certain times, such as periods in which the facility is deemed at risk. For example, in the context of a school environment, some of these embodiments unlock some or all of the entrances/exits for periods in which a large number of students enter and exit the school (such as at the beginning and end of the school day), and maintain the entrances/exits in a locked condition for the remainder of the school day, i.e., the period in which school is in session.

Still other embodiments provide additional or alternative hardening or strengthening techniques for the facility entrances/exits. For example, some embodiments provide bulletproof and/or blastproof facility entrances/exits for the purpose of impeding or preventing entry into the facility of unauthorized personnel, such as an active shooter. In fact, an entrance location such as a vestibule, can be provided that is surrounded by locked or otherwise hardened entrances/exits (such as bulletproof and/or blastproof entrances/exits), and the authorization process can be performed in the secured vestibule. Thus, if an individual fails the authorization process, then facility officials are provided with the opportunity to contact authorities who are tasked with the facility security.

II. Procedures Subsequent to Initiation/Communication of Lockdown

Embodiments are intended to include various methods and apparatus for facilitating procedures to be taken subsequent to initiation/communication of a lockdown situation, including the lockdown procedures themselves. A few exemplary methods and apparatus are summarized below for exemplary purposes, and are not intended to be construed as a mandatory or exhaustive listing of such methods and apparatus. Embodiments are intended to include all known, related art, and/or later developed technologies for implementing any and all of the operations disclosed below and elsewhere in the disclosure in the context of procedures to be taken subsequent to initiation/communication of a lockdown situation.

A few exemplary methods and apparatus are disclosed below in the contexts of: 1) individuals located at or in proximity to the facility in lockdown; and 2) individuals not located at or in proximity to the facility in lockdown. However, these characterizations are merely provided for exemplary purposes, and are not intended to be limiting in any way. For example, some of the methods and apparatus that are disclosed in the context of individuals located at one of the two locations can also, or alternatively, be applied to individuals located at the other location.

A. Individuals Located at or in Proximity to the Facility in Lockdown

Some of the embodiments include methods and apparatus that are directed to individuals located at or in proximity to the facility in lockdown. In other words, these methods and apparatus may be beneficial to individuals located at or in proximity to the facility in lockdown, such as by enhancing the safety and security of those individuals in a potentially dangerous situation, including but not limited to a situation warranting a facility lockdown. Some of the embodiments are disclosed below in the context of a school placed in lockdown, such as in the case of an active shooter situation. However, all or some of the disclosed methods and apparatus can be applied in other, and in some cases completely different, types of facilities and contexts.

1. Basic Lockdown Procedures

Some of the disclosed methods and apparatus directly or indirectly relate to facilitating procedures to be taken by facility occupants (or others located in the vicinity of the facility) subsequent to initiation/communication of a lockdown situation, including the lockdown procedures themselves. However, the following explanation of lockdown procedures is merely provided for exemplary purposes, and is not intended to be an exhaustive listing of all such procedures. In fact, embodiments are intended to include or otherwise cover apparatus and methods relating to any potentially beneficial procedures.

One aspect of lockdown procedures that is relevant to some of the disclosed embodiments involves the sheltering in place by facility occupants, and thus some embodiments include methods and apparatus for facilitating facility occupants to shelter in place. It is typically most beneficial in lockdown situations, such as those involving an active shooter, to shelter in place, which involves staying in a location that is not accessible, or at least not easily accessible, to the individual related to the circumstances giving rise to the lockdown, who for convenience is referred to below as an active shooter. However, as explained above, the disclosed methods and apparatus are applicable in other situations.

In many circumstances, such as those involving an active shooter, it may be beneficial to immediately shelter in place upon initiation of lockdown procedures. Time may be of the essence in these situations, and facility occupants may only have a very brief period to shelter in place and thereby avoid injury or death. Sheltering in place is often the only appropriate course of action, and other behavior, such as confronting an individual whose action prompted the lockdown, such as an active shooter, often results in injury or death. Investigating the cause of the lockdown, such as the sounds of firearms discharge that can be mistaken for firecrackers, can be misguided and expose the person performing the investigation to increased risk of injury or death. In the vast majority of situations, it is imperative to shelter in place immediately upon initiation of lockdown procedures in order to reduce, mitigate or avoid injuries to facility occupants.

It is often beneficial to shelter in place at a location or room proximate to the facility occupant at the time of initiation of the lockdown. For example, in the context of a school, it would be beneficial for individuals located in in or just outside of a classroom at the initiation of the lockdown to take refuge in the classroom. Once in the classroom, it is beneficial to secure the room against entry by the active shooter, such as by locking the classroom door. Locking the door enhances safety and/or security of the classroom occupants by isolating them from the active shooter.

It is possible that the active shooter may discharge a weapon, such as a firearm, at the door upon being denied entry based on its locked condition. Thus, while in the locked classroom, it may be beneficial for the classroom occupants to stay in a location that it not in the line of sight of the locked classroom door, or windows proximate the door, to avoid injuries resulting from the weapon's discharge at or around the door. In fact, it may be beneficial for the occupants to assume a position within the classroom away from or otherwise out of the line of sight from other locations that may be the target of weapon's discharge, or areas that can be penetrated by weapon's discharge such as drywall, etc.

Sheltering in place in a secure location, such as a locked classroom, can be the safest course of action in numerous circumstances, such as active shooter situations. Depending on the school location, responding authorities are typically able to arrive on the scene within a few minutes, such as within five to seven minutes. Contrary to popular belief, which is promulgated by fictional accounts, such as in movies, it is very difficult for an individual, such as an active shooter, to forcibly enter a classroom through a locked door. Discharging a firearm at a lock, hinge, or other portion of the door typically fails to achieve the desired result, i.e., to enable entry, and will often make entry even more difficult, such as by jamming the locking mechanism. Further, attempts at such forcible entry often take time, and in many cases responding authorities may be able to arrive on the scene before forcible entry can be achieved. In certain past incidents where active shooters were denied entry based on a locked door, they chose to not spend time discharging firearms and attempting to forcibly enter the locked room, and instead moved on to other parts of the facilities presumably based on the limited time available until arrival of the authorities tasked with addressing the lockdown.

It is beneficial to shelter in place as disclosed above until termination of the lockdown or other instructions provided by responding authorities. For example, following a lockdown, such as in the case of an active shooter situation, many responding authorities follow a procedure of evacuating each classroom in a piecemeal manner, such as by evacuating the classrooms one at a time. This procedure is implemented for various reasons, such as because it is easier for responding authorities to protect a smaller number of evacuating occupants through a controlled evacuation.

In accordance with this procedure, responding authorities identify themselves outside of the locked door of each classroom, and instruct the occupants to unlock the door and allow them entry. The authorities then instruct the occupants to evacuate the school, and may provide guidance and/or an escort through the evacuation.

In accordance with certain lockdown procedures, facility occupants are trained to not unlock the door or otherwise provide access to the classroom, even if the responding authorities identify themselves, to avoid situations where an active shooter provides a false identification and thereby gains access to the classroom. However, this trained procedure may not provide significant advantages because of the difficulty in misleading classroom occupants, which is supported by a lack of evidence of this situation actually ever occurring in an active shooter situation. In fact, this trained procedure may be disadvantageous because it forces responding authorities to forcibly enter each locked classroom, thereby causing property damage and delaying evacuation. In fact, the action of responding authorities forcibly entering classrooms increases the overall level of violence, potentially prompting the active shooter to also escalate the violence.

It may be beneficial to evacuate facility occupants to a location out of the line of sight of the facility (such as a school), and/or entrances/exits thereof. Evacuating to a more remote or otherwise less observable location, from the perspective of the school's entrances/exits, enhances safety by further isolating the facility occupants from the active shooter. For example, the facility occupants disposed at this location would be safer from weapons' discharges occurring within the facility, or from an active shooter exiting the school.

2. Response Time Versus Duration of Safety Zone

As disclosed above, depending on the facility location (such as a school), responding authorities are typically able to arrive on the scene within a few minutes, such as within five to seven minutes. Thus, in certain past incidents where active shooters were denied entry based on a locked door, they chose to not spend time discharging firearms and attempting to forcibly enter the locked room, and instead moved on to other parts of the facilities presumably based on the limited time available until arrival of the authorities tasked with addressing the lockdown, which as indicated above is typically five to seven minutes.

However, response time is often determined based on facility location, and thus some embodiments determine lockdown procedures based on a comparison between: 1) the response time of authorities, i.e., how long it takes responding authorities to arrive at a facility after being notified of the lockdown; and 2) predicted duration of safety for a facility occupant to shelter in place in a given location, such as a room with secured access. For example, it is important for facility occupants to be safe at the location in which they are to shelter in place for a period that is longer than the period for responding authorities to arrive at the facility upon being notified of the lockdown. Thus, some embodiments determine certain aspects of the lockdown procedures based at least in part on this comparison. Some of these embodiments include methods and apparatus for facilitating occupant safety by using the above comparison.

As one example, in some rural areas, it may take a relatively long period for responding authorities to arrive at the facility following lockdown notification, such as 30 minutes. In this case, it would be important for the facility occupants to shelter in place at a location where it would take an active shooter longer than 30 minutes to gain access. Thus, it may not be acceptable to shelter in place in a location that would only be acceptable for a shorter response time, such as in a locked school classroom that can only be expected to prevent forcible entry for approximately ten minutes.

Instead, other or additional procedures may need to be implemented to enhance facility occupant safety and/or security. For example, occupants may initially shelter in place at a location that may only provide temporary safety (i.e., safety for a period less than that necessary for responding authorities to arrive), and then follow additional procedures. For example, the classroom occupants may evacuate the classroom and ultimately the exit the facility through a back door or window. Alternatively, the classroom occupants may shelter in place at another secured location within the classroom, such as within a secured storage area, bathroom, etc., which may provide additional time for responding authorities to arrive.

As another alternative, procedures can be implemented where facility occupants in this situation do not shelter in place at more convenient or otherwise normally desirable locations, such as within classrooms. Instead, these convenient locations may be deemed too insecure, and the facility occupants may be directed to shelter in place at locations that are more secure, such as within a strengthened safe room. In some embodiments, the safe room is strengthened such that it would take longer for an active shooter to gain access to the occupants therein as compared to more convenient locations (such as standard classrooms), and thus provide safety for a sufficient period to enable responding authorities to arrive in time to impede, reduce or prevent casualties.

The above disclosures are merely provided for exemplary purposes, and embodiments are intended to include or otherwise cover any beneficial methods and apparatus that include or otherwise utilize the comparison between: 1) the response time of authorities, i.e., how long it takes responding authorities to arrive at a facility after being notified of the lockdown; and 2) predicted duration of safety for a facility occupant to shelter in place in a given location, such as a room with secured access. For example, some methods and apparatus relate to strengthening or otherwise isolating certain rooms, and base the level of strengthening on the predicted response time of authorities, while other or additional methods and apparatus can be used to delay an active shooter or other individual in still other ways.

3. Response Based on Immediacy and Context of Danger

Some embodiments include methods and apparatus provided in addition, or as an alternative, to the basic procedures disclosed above relating to procedures taken by facility occupants (or others located in the vicinity of the facility) subsequent to initiation/communication of a lockdown. However, the following explanation of additional or alternative lockdown procedures is merely provided for exemplary purposes, and is not intended to be an exhaustive listing of all such other additional or alternative procedures. In fact, embodiments are intended to include or otherwise cover any other apparatus and methods relating to any potentially beneficial additional or alternative procedures.

Some of the above embodiments determine procedures based on a comparison between: 1) the response time of authorities, i.e., how long it takes responding authorities to arrive at a facility after being notified of the lockdown; and 2) predicted duration of safety for a facility occupant to shelter in place in a given location, such as a room with secured access. However, alternatively or additionally to the above, other embodiments determine procedures based on other criteria, some of which are disclosed below for exemplary purposes. The below disclosure is merely provided for exemplary purposes, and is not intended to be an exhaustive listing of all such other criteria.

Some embodiments determine procedures based on the immediacy and context of danger to which certain facility occupants are exposed. The immediacy and context of such danger can be categorized into any number of groupings, and facility occupants can be trained or otherwise instructed to follow certain procedures depending on the grouping. In some of these embodiments, some or all of the instructed or trained procedures for each category are different.

As one such example, facility occupants can be categorized as being in one of three zones, i.e., hot zone, warm zone, and cold zone, that are each defined based on the immediacy and context of danger to which the facility occupants are exposed. These zones can be defined differently depending on the embodiment. In one exemplary embodiment, the hot zone can be defined as an area in which the facility occupants are in immediate or imminent danger of injury or death, such as within a short distance of an active shooter, e.g., within the same room as the active shooter or located close to the active shooter. Contrarily, the warm zone may be defined as an area in which the facility occupants are very likely to be in danger of injury or death within a relatively short period, such as within a few seconds. An exemplary warm zone may be an area located down the hall or around a corner from an active shooter. A cold zone may be defined as an area in which the facility occupants may be in danger of injury or death within a relatively longer period, such as a period longer than just a few seconds. An exemplary cold zone may be an area located on a different floor from an active shooter.

However, other embodiments define these zones differently. For example, some embodiments define these zones based on the type of emergency. In some of these embodiments that focus on active shooters, the zones are defined based on the range of the active shooter's weapons. For example, the hot zone can be defined as being within close or point blank range of the weapon, while the warm zone can be defined as being located at a distance that is basely in range, or at the edge of the range, of the active shooter's weapon. The cold zone may then be defined as outside of the range of the active shooter's weapon.

The above exemplary embodiment focuses on an active shooter situation, such as involving a firearm. However, other embodiments define the zones based on other types of weapons, including more powerful or devastating types of weapons, such as explosives. In embodiments that involve these types of more devastating weapons, the zones may be defined very differently than disclosed above with regard to firearms. For example, many or all occupants of a facility may be defined within the hot zone in the context of an explosive.

Some other embodiments define the zones based on a combination of the above or other criteria. For example, the zones can be defined based on both temporal issues (amount of time or immediacy of danger) and weapons' range issues.

As indicated above, some embodiments include or otherwise cover methods and apparatus where facility occupants are to follow certain procedures depending on the zone, i.e., where some or all of the procedures of the one zone are different from those of the other zones. A few such examples are provided below in the contexts of hot, warm, and cold zones.

For example, it may be beneficial for occupants in the hot zone to immediately flee from this zone, for the purpose of ultimately sheltering in place or evacuating from the facility. This response should occur immediately upon either: 1) initiation of the lockdown (e.g., upon communication of the lockdown situation); or 2) recognition of the circumstances warranting the lockdown. Immediately fleeing the hot zone may be the most effective procedure in many emergency scenarios, such as to quickly move away from an active shooter to increase chances of avoiding injury or death. It is typically preferable for a facility occupant to not confront an active shooter or attempt to neutralize the active shooter, and instead it is typically more beneficial to flee the hot zone. It is also typically preferable to not attempt to actuate an actuator to initiate the lockdown, unless able to do so safely and quickly, while in the hot zone, and instead as indicated above, it is typically preferable to flee the hot zone.

It may be beneficial for occupants in the warm zone to immediately shelter in place in accordance with the procedures outlined above in the context of basic lockdown procedures. Also, under certain circumstances, it may be sufficiently safe and otherwise appropriate to actuate an actuator to initiate the lockdown while in the warm zone. However, as indicated above, in the vast majority of situations, it is imperative to shelter in place immediately upon initiation of lockdown procedures in order to reduce, mitigate or avoid injuries to facility occupants. It is often beneficial to shelter in place at a location or room proximate to the facility occupant at the time of initiation of the lockdown. For example, in the context of a school, it would be beneficial for individuals located in in or just outside of a classroom at the initiation of the lockdown to take refuge in the classroom. Once in the classroom, it is beneficial to secure the room against entry by the active shooter, such as by locking the classroom door. Locking the door enhances safety and/or security of the classroom occupants by isolating them from the active shooter.

It may also be beneficial for occupants in the cold zone to shelter in place in accordance with the procedures outlined above in the context of basic lockdown procedures. It is typically sufficiently safe and otherwise appropriate to actuate an actuator to initiate the lockdown while in the cold zone. Similarly to the warm zone, it is important to shelter in place upon initiation of lockdown procedures in order to reduce, mitigate or avoid injuries to facility occupants, even though the requirement may not be as urgent in the cold zone as compared to the warm zone. It is still beneficial to shelter in place at a location or room proximate to the facility occupant at the time of initiation of the lockdown, although an occupant may be able to safely travel a longer distance to reach the shelter in place location as compared to the warm zone. For example, in the context of a school, it would be beneficial for individuals located in or reasonably near a classroom at the initiation of the lockdown to take refuge in the classroom. Once in the classroom, it is beneficial to secure the room against entry by the active shooter, such as by locking the classroom door. Locking the door enhances safety and/or security of the classroom occupants by isolating them from the active shooter.

The above embodiments are merely provided for exemplary purposes, and embodiments are intended to include or otherwise cover many other procedures, including any other number of zones, other characterizations of zones, different procedures to be followed in the zones, etc.

4. Communications During Lockdown

Some of the disclosed embodiments include methods and apparatus for enabling certain types of communications and/or communications between certain individuals upon initiation of lockdown procedures. Some embodiments provide these communication features in addition to some of the features and embodiments discussed above, while other embodiments provide these communication features as an alternative to some or all of the features and embodiments discussed above.

Some of these embodiments include methods and apparatus for enabling certain facility occupants to communicate with certain other individuals. Some such embodiments include methods and apparatus that enables certain facility occupants to communicate with authorities responding to the lockdown. Some of these embodiments provide a direct line of communication between certain facility occupants and responding authorities immediately after initiation of lockdown, or shortly thereafter. This direct line of communication can be provided automatically, or can be implemented manually, such as by the facility occupants and/or responding authorities. In some embodiments, this communication can be provided through a common line, such that all of the relevant facility occupants and responding authorities are privy to all of the information and have a common ability to add and receive information.

This direct line of communication may be beneficial because it expedites receipt of the information by the responding authorities, and provides the responding authorities with firsthand information, which may be more accurate than information provided through an intermediary. However, this direct line of communication may be confusing or unwieldy, such as may occur if too many individuals attempt to provide information at the same time. Thus, some embodiments do not provide such a direct line of communication, and instead provide an indirect line of communication between the facility occupants and the responding authorities. This indirect line of communication may be beneficial by enabling an intermediary, such as a police dispatcher, 911 operator, etc., to redact unnecessary or unhelpful information and thereby provide the responding authorities with more clear and helpful information.

In the context of a school, teachers and other school officials can be provided with methods and apparatus for communicating with responding authorities, and thus have the ability to provide information to the responding authorities that may be very helpful to facilitate them neutralizing the circumstances warranting the lockdown, such as information regarding an active shooter, i.e., description, location, disposition, etc. This communication may also be helpful to facilitate swift and/or effective evacuation of the facility. For example, as disclosed above, under certain circumstances, facility occupants sheltering in place may be uncertain as to whether they should unlock a door during the lockdown upon receiving instructions to do so from responding authorities.

In some such cases, the facility occupants are unable to verify whether the instructions to unlock the door are being provided by authorized personnel (e.g., responding authorities), or alternatively from an active shooter attempting to gain entry into the secured space. Thus, the communications disclosed above may be helpful in enabling the facility occupants in lockdown to verify that the instructions to unlock the door are actually being provided by authorized personnel, thereby allowing the facility occupants to more swiftly and efficiently unlock the door, and in some cases obviating the responding personnel from forcibly entering the space, such as by breaking down the door.

This communication may also be helpful by enabling the responding authorities to provide a variety of different types of relevant information to the facility occupants, such as information that may be helpful to facilitate their safety. For example, responding authorities can inform the facility occupants as to their estimated time of arrival at the facility so that the facility occupants understand how long they will need to shelter in place, which may affect their decisions as to acceptable locations for sheltering in place. The responding authorities can also provide the facility occupants with other types of information, such as instructions for sheltering in place, evacuating the facility, etc. Teachers and other school officials can be provided with similar methods and apparatus for communicating with relevant on-site personnel, such as security personnel assigned to the facility at issue.

Some of these and other embodiments include methods and apparatus for enabling certain facility occupants to communicate with other facility occupants. For example, in the school context, these embodiments enable teachers or other school officials to communicate with each other, which may be beneficial for a variety of reasons. For example, this communication may be helpful in enabling the teachers or other school officials to enhance efforts to safely shelter in place. Certain teachers or school officials may thereby direct other facility occupants to better locations to shelter in place depending on the circumstances of the lockdown, or may inform other facility occupants as to the location of an active shooter to thereby direct facility occupants located nearby to adopt a disposition to enhance their safety.

Embodiments are intended to include or otherwise cover any methods and apparatus for implementing the above types of communication. In some embodiments, these types of communication are implemented via communication devices that are statically disposed at certain locations in the facility, such as in the classrooms and front office of a school. These embodiments may be beneficial by avoiding confusion as to the location of the communication devices, i.e., facility occupants may be accustomed to the location.

In other embodiments, these types of communications are provided via wireless devices that are mobile. For example, the wireless devices can be dedicated to providing these types of communications, and thus have no other function. Some of these embodiments are configured to enable the wireless devices to be easily carried on the person of the facility occupants, such as by being worn around the neck as a necklace or around the wrist as a bracelet, clipped onto a belt or security card, etc. Alternatively, the wireless devices can form a part of another device, and thus constitute a multi-function device. In accordance with some of these embodiments, the wireless device is a smart phone, iPad, iPod, portable computer, or any other such device. In some of these embodiments, the communication ability can be provided via an application.

In some embodiments, any or all of the communication devices disclosed above can additionally be configured to facilitate communication of initiation of the lockdown. Thus, the communication device of these embodiments is configured to also operate as the first type of communication device disclosed in the preceding sections. In other words, these embodiments provide a dual-use communication device that not only notifies facility occupants of the initiation of the lockdown, but also enables any or all of the additional types of communication disclosed above.

The communication devices of still other embodiments includes any or all of the features and types of communications disclosed above, as well as other functionalities. For example, the communication device may also provide the facility occupants with information relating to the type or cause of the lockdown, status of the lockdown, and/or any other information that may be relevant to the facility occupants and/or the responding authorities. In addition, the communication device may also be configured to operate as an actuator. For example, the communication device may be configured to enable a facility occupant to initiate the lockdown, and thus also operate as either a static or mobile actuator.

B. Individuals Not Located at or in Proximity to the Facility in Lockdown

Some of the embodiments include methods and apparatus that are directed to individuals not located at or in proximity to the facility in lockdown, and these methods and apparatus may be beneficial for various reasons. For example, these apparatus and methods may be beneficial by facilitating the tasks of responding authorities in addressing the circumstances giving rise to the lockdown, such as by: 1) neutralizing an active shooter; 2) reducing, mitigating, or preventing facility occupant casualties; 3) enhancing the safety of the responding authorities, etc. These apparatus and methods may also be beneficial to individuals who are not directly or indirectly tasked with officially or unofficially addressing the circumstances warranting the lockdown, regardless of whether these individuals can play a role in facilitating more favorable outcomes at the facility in lockdown. Some of these individuals can facilitate more favorable outcomes at the facility in lockdown (including bus drivers who can be directed to avoiding transporting potential victims to the facility), while others cannot provide any benefit to the facility in lockdown (including occupants of other related facilities that may be subject to similar circumstances and thus should be placed on a heightened state of alert).

Some of the embodiments are disclosed below in the context of a school placed in lockdown, such as in the case of an active shooter situation. However, all or some of the disclosed methods and apparatus can be applied in other, and in some cases completely different, types of facilities and contexts.

1. Authorities Addressing Circumstances Giving Rise to Lockdown

Some of the embodiments include methods and apparatus for facilitating the tasks of responding authorities in addressing the circumstances giving rise to the lockdown and/or the aftermath thereof, such as by: 1) neutralizing an active shooter; 2) reducing, mitigating, or preventing facility occupant casualties; 3) enhancing the safety of the responding authorities, etc.

Some of these embodiments include any and all of the methods and apparatus disclosed above, such as those disclosed in the context of benefitting facility occupants, that may be used to perform this operation, i.e., facilitating the tasks of responding authorities in addressing the circumstances giving rise to the lockdown. For example, some of these embodiments include methods and apparatus that enable the responding authorities to address locked doors, including entrance and internal doors, which may have been either manually or automatically locked based upon the initiation of the lockdown. Some of these embodiments enable these doors to be unlocked, either directly by the responding authorities or by others to assist the responding authorities. In some such embodiments, the responding authorities are provided with an apparatus to easily unlock automatically locked doors, such as via electrical or electromagnetic actuators, security cards, etc. In some of these or other embodiments, certain of these doors can be automatically unlocked from a remote location, such as at a situation command center, at the request of the responding authorities.

Some of these embodiments include methods and apparatus for enabling the responding authorities to communicate with certain facility occupants, such as facility occupants sheltering in place, for a variety of reasons. For example, this communication may enable the facility occupants to provide the responding authorities with information that may be helpful in addressing the circumstances giving rise to the lockdown and/or the aftermath thereof. Some of these any/or other embodiments may provide the responding authorities with other helpful information or intelligence, such as video and/or audio data of certain relevant facility locations.

Some embodiments include any and all methods and apparatus that facilitate responding authorities to otherwise perform their tasks of addressing the circumstances giving rise to the lockdown and/or the aftermath thereof. A few such tasks and operations of responding authorities are provided below for exemplary purposes, but the below listing is not intended to be an exhaustive disclosure of all tasks and operations covered by or otherwise related to these embodiments.

In various types of emergencies, such as those involving an active shooter, the strategy of responding authorities involves immediate action and quick deployment to stop harmful or deadly actions by the perpetrator. Delaying such deployment in these situations may result in additional casualties. Thus, some embodiments provide methods and apparatus for facilitating this rapid and effective deployment.

Patrol officers of a local police department are often the first responders in these situations, and need to make a rapid assessment of the situation, communicate the problem to headquarters and other responding officers, establish command/control, and form up for the active shooter response and/or hasty emergency rescue response, if necessary. One officer at the scene needs to immediately assume command as an incident commander and maintain command until relieved by a higher authority.

Additional responding officers arriving at the scene fall under the control of the incident commander, start containing an inner perimeter, evacuate and carefully observe citizens leaving the facility, and direct them to an evacuation site, which needs to be immediately set up and supervised by police and school support personnel. Police at the evacuation site need to maintain communications with officers at the perimeter and officers who have formed up and entered the facility as active shooter teams or rescue teams.

Other support for the crisis will begin arriving shortly after the arrival of the first responders, and needs to assist and compliment the response and not interfere with the coordinated response. Emergency response protocols can then be implemented, including establishing a command post, outer perimeter, traffic control plan, staging area, and requesting resources.

The responding authorities in active shooter situations need to perform a number of critical tasks, including establishing common communications, which can be facilitated using any of the methods and apparatus disclosed herein. A "kill" or "frozen" zone also needs to be identified before an inner perimeter can be established, taking into account that the inner perimeter may change until the shooter is contained. An inner perimeter then needs to be established, and follow on officers need to reinforce the inner perimeter and assist in the evacuation of facility occupants to the evacuation site. An outer perimeter then needs to be established, such as to prevent unauthorized individuals (e.g., family members of facility occupants) from entering the facility or crisis site. The outer perimeter can also be used to include a traffic diversion capability to re-route traffic around the facility or crisis site, which may be beneficial in numerous respects, such as by preventing congestion that may delay emergency response. A command post should be established (even if temporary) to facilitate the beginning of organized command and control of the incident. The command post can be moved to different locations as the situation begins to stabilize. A staging area needs to be established at a location that is easy to access within the outer perimeter, and is a location where all responding resources are sent as soon as it is established. Additional resources that may be needed should be included in an emergency plan as a checklist, and may include: SWAT personnel, hostage negotiators, emergency trauma personnel, rapid deployment force personnel, prosecutors office assistance, fire service support, local BLS support, victim services personnel, media coordinators, evidence response personnel, etc.

It may be beneficial for responding authorities to implement the following steps in order when responding to active shooter situations: 1) communications center (in some cases headquarters) communicates to patrol units, advises of the problem with preliminary information, or the incident is observed by officers near the scene and communicated to headquarters; 2) first responding patrol officers arrive on the scene and make observations; 3) a patrol supervisor or senior patrol officer is designated as the incident commander and remains the incident commander until relieved; 4) the incident commander makes a preliminary assessment of the situation and advises headquarters; 5) notifications are made up the chain of command by headquarters personnel; 6) an active shooter plan is put into effect; 7) backup officers arrive, including mutual aid, and plain clothes personnel; 8) police personnel establish common communications; 9) the incident commander decides to form active shooter teams composed of three or four officers each, and assigns them to search for the active shooter, and advises headquarters; 10) additional officers are assigned to immediately establish an inner perimeter and assist with evacuation; 11) the incident commander evaluates the need for rescue teams to remove severely injured facility occupants from the kill zone to medical aid; 12) the incident commander calls for a hasty medical aid reception area to be set up in a safe location identified to all on the edge of the inner perimeter; 13) plain clothes personnel and support personnel move to the evacuation site to receive evacuees, and also maintain communications with the incident commander and active shooter teams; 14) the perimeter is supported by additional uniformed officers, traffic is controlled and rerouted, and an outer perimeter is formed; 15) command level officers establish a command post, and notify all personnel at the scene of the location; 16) and incident command is designated on the scene, and the on scene incident commander is responsible to direct all operations at the crisis site; 17) the staging area is established, and a staging area manager is assigned; 18) traffic re-routing is accomplished; 19) additional resources are requested; 20) additional support continues to arrive at the staging area, and is directed by the staging area manager; 21) additional resources arrive and a tactical communication system is established; 22) SWAT links up with the on-site commander and supports the active shooter teams; 23) injured facility occupants are rescued and moved to receive medical aid; 24) Mutual Aid Units (RFD) arrive and are deployed to relieve officers at the inner perimeter with evacuation and securing areas in the facility; 25) non-uniformed police personnel and nonessential uniformed personnel at the crisis site are moved to the staging area, debriefed, and re-assigned as necessary; 26) an increasing emphasis is placed on stabilization of the incident and constant attention is paid to accountability of people evacuated from the target site, and missing, injured and deceased are accounted for and released to the competent authority; 27) preparations are made for length of operation support, release, etc.; 28) preparations are made for continuity of normal operations; 29) preparations are made for crime scene processing and preliminary criminal investigation; 30) deadly violence is resolved; 31) the facility is continually swept by SWAT; 32) K-9 handlers, canines and bomb squad personnel sweeps the facility; 33) the local authority prepares for complete control of the facility as a crime scene; 34) a criminal and crime scene investigation begins, and the medical examiner is prepared for necessary follow-up; 35) personnel continues to work on accountability for all citizens; 36) and accounting is made for all emergency responders and equipment, relieving them as necessary; and 37) documentation regarding the incident is prepared.

The tactical response to active shooter situations by first responders is discussed in more detail below. With the initial response by patrol forces, and assessment is made by the on scene incident commander and a decision is made as to whether to form up and enter the facility as an active shooter team, a rescue team for the injured, or both. The tactical situation and the availability of personnel will dictate when and what type of response will be initiated. As part of the initial tactical response, securing the inner perimeter and continuing the controlled evacuation of citizens are both critical.

The active shooter team is generally composed of four uniformed police officers, or other officers including plainclothes officers. Plainclothes officers must be clearly identified to avoid being shot by being mistaken for the active shooter. Alternatively, in situations where there is a shortage of officers, the active shooter team may be formed of three officers. The three officer configuration for active shooter teams is an ink symmetrical wedge formed of three officers, with the senior officer in the right wing of the wedge. The configuration for the four officer active shooter team moving wedge is as follows: the point officer is at the front of the wedge, the right wing, the left-wing, and the rear of the wedge covers the outside.

The officers on the active shooter team form up in a secure area, and answer directly to the incident commander. These officers should be immediately equipped with the following equipment: patrol uniform or raid vest/jacket, communication equipment with chest microphone, body armor, and handgun with at least three loaded magazines. Additional optional support equipment can be sent to the scene, and include the following: fire extinguishers, first aid/trauma kits, ballistic shields, hasty/reeves stretchers, ballistic helmet, pistol belt with all accessories, patrol carbine with at least two loaded magazines, and basic forcible entry tools including Halligan bar and sledgehammer.

The active shooter team is directed to enter where necessary based on a careful analysis of the probable location of the active shooter. After the active shooter team is released by the incident commander, the team moves into the facility and makes an attempt to locate the active shooter based on available information, eyewitness accounts, noise, physical evidence, etc. The active shooter team must stay in constant communication with the incident commander and keep the instant commander advised of their location, status, etc. the active shooter team will skip areas unless they believed the active shooter to be present. The active shooter team will direct evacuees out of the facility, but cannot stop unless the active shooter is located. If an active shooter team finds a non-mobile severely injured person, they will call for a rescue team. The rescue team will assist and evacuate the injured person to medical aid, providing the location of the injured person, as well as the injured person's condition. The active shooter team will then continue to move through the facility.

As the active shooter team moves through the facility, they should make an attempt to coordinate their actions with other active shooter teams, if such teams are also operating in the building. The active shooter team must be constantly attempting to "collapse" the area used by the active shooter, thereby containing the active shooter to a smaller area and limiting the active shooter's freedom of action and access to innocent facility occupants. Once the active shooter team contains the active shooter to the smallest area possible, the team will make a reasonable analysis as to which options they have in dealing with the active shooter. The final decision to assault the active shooter's position will be made by the senior officer on the active shooter team. The active shooter team will prepare for entry, adhere to standard operating procedures, and use what forces necessary in handling the active shooter while reducing or minimizing danger to innocent facility occupants. The active shooter team will render the situation safe, and advise the incident commander of the contact and status. The active shooter will be handcuffed, searched, and secured, evacuees will be removed, de-briefed, and the active shooter will be taken into custody by other supporting officers. The active shooter team must then be prepared to continue searching the facility.

The active shooter team must be prepared to link up with supporting police units soon after the incident begins. The linkup will normally occur with the SWAT team, other active shooter teams, rescue or other forms of support. The supporting teams must be apprised of the presence of the active shooter teams were rescue teams in the area of operations and their approximate location. The incident commander must notify all units operating inside the Kill Zone of the entry of supporting SWAT or support services. Supporting units must have communication capability with the units inside the facility, and normally would make communication, and then achieve a physical link up with those units. When the SWAT team makes entry, the active shooter team will work closely with them to resolve the incident. The situation will dictate what tactics will be required for resolution; however, the SWAT commander will take charge of operations inside the facility.

In the case of non-SWAT supporting units, the incident commander will be in charge of all decisions relating to their entry into the target structure. Any supporting units entering the structure must be in communication with active shooter teams forward of their positions to prevent a crossfire situation. Any form of communication may be used as necessary depending on tactical situation.

Patrol personnel may be tasked with the responsibility of entering the target structure is a rescue team, and locate and evacuate facility occupants including injured facility occupants. The standard configuration for a rescue team includes the three or four member teams disclosed above. For example, the team will move as a wedge into the facility and be prepared to defend themselves and others. The team will direct evacuees out of the facility, and verify the position of injured people.

When the team locates and injured facility occupant, the cover officer places himself/herself between the injured facility occupant and the hostile area. To rescue officers carefully load the victim onto a stretcher and then removes the injured facility occupant from the facility. The team moves to the exit control point and brings the victim to medical aid, and then prepares to reenter the facility, if necessary on another rescue mission. If a rescue is undertaken without a suitable structure, two of the rescuing officers will move the victim using a two person carrying procedure. This method of transporting injured facility occupants should only be undertaken if no other alternative exists for safe evacuation.

The above tactics may be altered in situations responding to an active shooter situation in an open air environment, i.e., outside of the facility. Active shooters in these situations may be armed with a variety of firearms, including semiautomatic long guns capable of accurate fire over fairly long ranges. These types of active shooters tend to be highly mobile if they choose to live, with police officers using tactics in an attempt to contain and hold the active shooter within a limited area.

The tactics used in open air environments are different than tactics used in facilities, such as buildings, due to the large areas involved, lack of physical barriers, and lack of channeling structures. However, it can be difficult for an active shooter to hold innocent people in one place in these situations because the open environment rapid flight from the kill zone. The significant component in any response to an active shooter situation in an open air environment is to contain the active shooter in the smallest space possible, and denied the active shooter freedom of action. This strategy will both limit the active shooters movement and deny the active shooter targets of opportunity.

The initial patrol faced response to it active shooter and an open air environment is different to a response in the facility, such as the structure, due to the many movement options available to the active shooters, victims, and others present. The patrol based response to an open air active shooter involves collapsing the perimeter around the active shooter, while evacuating and/or protecting the innocent citizens. An incident commander must take charge at the scene immediately, and maintain effective communications with headquarters and responding units. A well-coordinated effort is necessary for patrol forces to contain an active shooter, and reduce or prevent continued violence or possible high-speed escape, such as in a vehicle. This type of incident may not allow for a more formal organization of officers responded to the prices, and thus they may need to be deployed immediately, and must work closely together. It is critical in these types of situations for all plainclothes police personnel to be clearly identified to prevent misidentification.

At the scene of an open air incident, the incident commander must make an immediate assessment of the situation, including the following: what is occurring, who are the actors, victims, and what type of weapons are involved; whether the incident commander can communicate with all police officers at the scene; where the incident is occurring and how large the kill zone is; where will the incident commander direct responding officers to start and collapse an inner perimeter; whether victims can be safely evacuated or sheltered in place; and whether a moving scenario can be prevented and/or contained. Once the active shooter is contained to the smallest physical space possible, a more formal command and control process can be put in place similar to more static active shooter situations. The organized process of incident command with support for the operation and services to victims would follow the standard procedures identified in the active shooter response in the facilities, such as buildings.

As indicated above, some embodiments include methods and apparatus for implementing any or all of the above procedures.

2. Individuals Facilitating Favorable Outcomes at Facility in Lockdown

Some of the embodiments include methods and apparatus that may be beneficial to individuals who are not directly or indirectly tasked with officially or unofficially addressing the circumstances warranting the lockdown, but who can facilitate more favorable outcomes at the facility in lockdown. Some such individuals may include people who may facilitate isolating the facility in lockdown, such as bus drivers who can be directed to avoid transporting potential victims to the facility. Other such individuals may include people who can otherwise prevent people from entering a region affected by the lockdown, such as personnel who can re-direct traffic patterns away from the region affected by the lockdown, which may help potential victims to stay away from the dangerous situation giving rise to the lockdown, and may also help responding authorities to swiftly and/or effectively arrive at the facility in lockdown.

Embodiments are intended to include or otherwise cover all methods and apparatus for implementing the above operations. For example, in the context of bus drivers being directed to avoid transporting potential victims to the facility in lockdown, embodiments are intended to include any known, related art, and/or later developed technologies for enabling this operation. Some such embodiments include communications apparatus that provides an appropriate warning to all relevant bus drivers that an incident has occurred at the relevant facility, i.e., the school that is the destination of the bus, and to thus not return to the facility in lockdown. This communication can be performed at the initiation of the lockdown, similarly to the communications transmitted to authorities, i.e., police responders.

Some of these and/or other embodiments include communications apparatus that provides an appropriate warning to other relevant individuals capable of facilitating beneficial outcomes at the facility. For example, at the initiation of the lockdown, a similar communication can be provided to other relevant school officials, such as teachers with students on a field trip or other off site location. These teachers could then be notified of the lockdown and advised to not return to the facility until the lockdown is terminated.

Still other embodiments include methods and apparatus for providing communications to other individuals, such as public bus drivers, train conductors, and others who have the capability of operating public vehicles in the vicinity of the facility in lockdown. In one such example, bus drivers and/or train conductors can receive communications to avoid or otherwise not stop at locations proximal the facility in lockdown to achieve benefits discussed above.

The same, similar or different communications can be provided to other relevant individuals. For example, communications can be transmitted to the officials responsible for traffic issues, such as crossing guards. In some of these embodiments, crossing guards are provided with a communication indicating that a nearby facility has been placed in lockdown and directed to implement appropriate procedures. For example, the crossing guards can redirect traffic away from the facility to reduce the number of potential victims and/or prevent traffic congestion to facilitate swift travel to the facility by authorized responders. The crossing guards can also direct pedestrians and others to otherwise stay away from the facility.

However, some of the above and/or other embodiments include methods and apparatus other than the communications disclosed above. For example, some of these embodiments include methods and apparatus for automatically redirecting traffic or others away from the facility in lockdown, and/or directing traffic in a manner that clears the way for responding authorities. As one example, at the initiation of a lockdown, a control signal can be transmitted to certain traffic lights to control the traffic patterns for purposes discussed above. As another example, toll booths, entrances to bridges, entrances to highways, etc., can be automatically blocked or opened to control the traffic patterns for these purposes.

3. Individuals Not Providing Benefit to Facility in Lockdown

Some of the embodiments include methods and apparatus that may be beneficial to individuals who are not directly or indirectly tasked with officially or unofficially addressing the circumstances warranting the lockdown, and who cannot even provide any benefit to the facility in lockdown. Some such individuals may include occupants of other related facilities that may be subject to similar circumstances and thus should be placed on a heightened state of alert.

Embodiments are intended to include or otherwise cover all methods and apparatus for implementing the above operations. For example, some embodiments include methods and apparatus for providing communications to occupants of facilities that are related or otherwise similar to the facility in lockdown. Some of these embodiments provide communications in the form of a warning that a related or otherwise similar facility has been placed in lockdown, and requesting that the recipient of the communication be placed in a state of alert to be watchful of circumstances similar to those giving rise to the lockdown at the other facility. This warning may therefore be beneficial by enabling the early identification of circumstances giving rise to a lockdown at the facility receiving the warning.

In the context of a school, a communication can be transmitted to all schools in a region upon the initiation of lockdown procedures at a certain school within that region. The school receiving the communication can then act accordingly to enhance the safety of the school occupants. Embodiments are intended to include or otherwise cover any or all forms and contents of such communications. For example, the communications of some embodiments may only include information that another school within the region has been placed in lockdown. Alternatively, the communications of other embodiments may include additional information, including but not limited to the type of lockdown, circumstances warranting the lockdown, status of the lockdown, exact location or specific facility of the lockdown, etc.

The communications of some embodiments include information other than or in addition to information directly related to the facility in lockdown. For example, the communications of some of these embodiments can provide the recipient facility with advice as to appropriate responses. In some such cases, the recipient facility may be instructed to itself immediately be placed in lockdown, which may be appropriate in situations where the recipient facility is very likely to be subjected to the circumstances warranting the lockdown at the facility originally placed in lockdown. Alternatively, the recipient facility may be instructed to merely be watchful for circumstances similar to those giving rise to the facility originally placed in lockdown. As yet another alternative, the recipient facility may be instructed to adopt lock—in procedures, wherein all students, teachers and other school officials are instructed to remain indoors with all entrances/exits locked, which may be appropriate in situations where a nearby but otherwise unrelated facility has been placed in lockdown.

As yet another alternative, relevant communications can be sent at the initiation of a lockdown to individuals who will ultimately be responsible for investigating the circumstances giving rise to the lockdown. It may be beneficial for these investigators to receive early notice of the lockdown to facilitate or otherwise enhance their investigative efforts.

However, the above embodiments are merely provided for exemplary purposes and are not intended to be an exhaustive listing of all communications covered by the various embodiments to individuals not located at the facility in lockdown and not tasked with providing a direct benefit to the facility in lockdown.

III. System Summary

A summary is provided below that constitutes a very brief overview of certain features of the disclosed embodiments. The features summarized below are merely provided for exemplary purposes, and are not intended to constitute an exhaustive listing of features of the various embodiments, and are not even intended to indicate significant or preferred aspects of the disclosed embodiments.

Some embodiments are directed to a lockdown apparatus for facilitating initiation of lockdown procedures at a facility that is configured for occupation by facility occupants and that includes a fire alarm. The fire alarm can include a fire alarm actuator and a fire alarm communicator configured to produce a fire alarm communication for communicating actuation of the fire alarm actuator. The lockdown apparatus can include a manually operated lockdown actuator disposed at the facility and configured to transmit a lockdown initiation signal upon being manually actuated, the manually operated actuator being configured to be recognizably distinguishable from the fire alarm actuator. The lockdown apparatus can also include a lockdown communicator configured to produce a lockdown communication for communicating initiation of lockdown procedures to the facility occupants and individuals not disposed proximate the facility upon transmission of the lockdown initiation signal, the lockdown communication being recognizably distinguishable from the fire alarm communication.

The actuator can include a mounting base configured for mounting to a static surface of the facility, and a depressible button disposed at the mounting base, the mounting base and button each defining a front exterior surface that is circular. The diameter of the circle of the button may be smaller than the diameter of the circle of the mounting base. The circular front exterior surfaces of the mounting base and button can be coaxial, and one of the front exterior surfaces can be labelled with indicia including "LOCKDOWN."

The actuator can include a mounting base configured for mounting to a static surface of the facility, and a depressible button disposed at the mounting base and defining a front exterior surface. The actuator can be configured to transmit the lockdown initiation signal upon application of a force between approximately 3 pounds and approximately 6 pounds to the button in a direction substantially perpendicular to the front exterior surface of the button. In some of these embodiments, the actuator can be configured to transmit the lockdown initiation signal upon application of a force between approximately 4.5 pounds and approximately 5.5 pounds, and in some of these embodiments, the actuation pressure is equal to approximately 5.0 pounds.

The actuator can include a mounting base configured for mounting to a static surface of the facility, a depressible button disposed at the mounting base and defining a front exterior surface, and a cover that covers at least the front exterior surface of the button. The cover can be at least one of transparent and semi-transparent, such that the button is viewable from an exterior of the actuator while the cover covers the button. The cover can be formed of a resilient material and rotatably mounted to at least one of the mounting base and the button. The cover can be rotatable between a covered position that covers at least the front exterior surface of the button, and an exposed position that exposes at least the front exterior surface of the button to enable manual application of pressure thereto.

Alternatively, the cover can define a front exterior surface and be formed of a material that undergoes a change in shape upon application of a force between approximately 3 pounds and approximately 6 pounds to the cover in a direction in a direction substantially perpendicular to the front exterior surface of the of the cover. In some of these embodiments, the change in shape occurs upon application of a force between approximately 4.5 pounds and approximately 5.5 pounds to the cover, and in some of these embodiments, the shape change occurs upon application of a force of approximately 5.0 pounds. The change in shape can expose the front exterior surface of the button to manual application of pressure thereto. The change in shape can include at least one of: 1) a portion of the cover exposed to the force deforms in a direction substantially parallel to a direction of application of the force, and 2) a portion of the cover exposed to the force breaks to form an aperture in the cover to expose the front exterior surface of the button to an exterior of the actuator.

The lockdown communicator can include an annunciator that communicates an audible annunciation to facility occupants upon transmission of the lockdown initiation signal, the audible annunciation being recognizably distinguishable from the fire alarm communication. The annunciator can include a casing that is configured for mounting to a static surface of the facility, and an audible generator disposed within the casing that generates the audible annunciation upon transmission of the lockdown initiation signal. The casing can define a front wall with multiple openings extending therethrough, the front wall defining a circular exterior surface.

The annunciation generated by the audible generator can include an alarm cycle, each alarm cycle including an initial distinctive sound, followed by the word "lockdown" repeated at least three times. The annunciation generated by the audible generator can include a predetermined number of alarm cycles upon transmission of the lockdown initiation signal, the audible generator ceasing to generate further alarm cycles subsequent to generation of the predetermined number of alarm cycles. The predetermined number of alarm cycles can include three alarm cycles. The audible generator can generate at least a portion of the audible annunciation in a range between approximately 90 to 120 decibels.

The lockdown communicator can include a visual indicator that communicates a visual indication to facility occupants upon transmission of the lockdown initiation signal, the visual indication being recognizably distinguishable from the fire alarm communication. The visual indicator can include a casing that is configured for mounting to a static surface of the facility, a light generator disposed at the casing that generates light upon transmission of the lockdown initiation signal, and a transparent cover attached to at least one of the casing and the light generator that covers at least a part of the light generator. The casing of the visual indicator can define a front wall having a circular exterior surface that is labelled with indicia including "LOCKDOWN," and the light generator can generate at least one of blue light and green light.

The light generator can be a strobe that generates light at an intensity of between approximately 75 candelas and approximately 200 candelas, and at a flash pattern of at least approximately 60 flashes per minute. The visual indicator can continue to communicate the visual indication to facility occupants upon transmission of the lockdown initiation signal until receiving a manually initiated override signal instructing the visual indicator to cease communication of the visual indication.

The lockdown apparatus can also include a controller. The actuator can transmit the lockdown initiation signal to the controller upon being manually actuated, and the controller, upon receipt of the lockdown initiation signal, can generate and transmit an activation instruction signal to the lockdown communicator instructing the lockdown communicator to produce the lockdown communication for communicating initiation of lockdown procedures.

DETAILED DESCRIPTION

Figure 1:
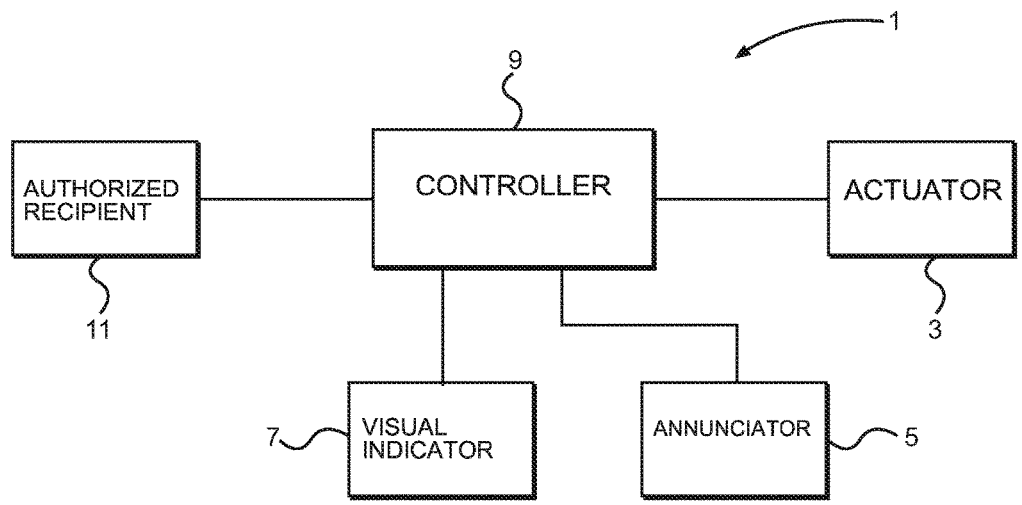
FIG. 1 is a schematic of a lockdown system in accordance with an exemplary embodiment.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. An index of topics is provided for convenience.

I. Definitions
  A. Facility
  B. Applicable Situation
  C. Object of Safety/Security
  D. Apparatus and/or Equipment
II. Methods and Apparatus for Initiating Lockdown Procedures
  A. Actuator
  B. Annunciator
  C. Visual Indicator
  D. Combination of System Components
  E. Controller
  F. Overall System
    1. Combined Annunciator and Visual Indicator—FIG. 6
    2. Alternative Controller—FIG. 7
    3. Actuator Transmits Activation Signal—FIG. 8
    4. Combined Actuator and Controller—FIG. 9
  G. Additional/Other Features
    1. Drill Mode
    2. Override Mode
    3. Automatic Actuators
III. Methods and Apparatus for Implementing Lockdown Procedures
  A. Exemplary Apparatus
    1. Overall System
    2. Automatic Locking Mechanisms and/or Status Indicators
    3. Video and/or Still Image Data
    4. Impeding or Addressing Circumstances Warranting Lockdow
  B. Exemplary Procedures
IV. Other Alternatives
I. Definitions
  A. Facility Various embodiments of the present disclosure are applicable to any type of facility, such as indoor or outdoor facilities, or combinations of both, including but not limited to: 1) buildings and/or grounds of buildings; 2) aircraft, ships and other types of transportation related vehicles; and 3) any other type of area that can be subjected to safety issues, such as underground or underwater facilities, offshore platforms such as oil rigs, outdoor gathering places such as outdoor malls, etc. In fact, unless indicated to the contrary, the term facility is used in the present disclosure in its broadest sense, and is not limited to the specific types of facilities identified in various sections of the present disclosure.

Facility should be considered as including a single or multiple locations. The multiple locations can be related in some way, such as by: 1) proximity to one another, 2) related function, 3) similarity in characteristics, etc. For example, the facility can include multiple buildings and areas surrounding the multiple buildings that are related in some way, such as in the case of a campus or compound, e.g., college campus or military compound. However, the multiple buildings do not necessarily have to be related to each other in any way other than proximity, such as in the case of multiple buildings only related to each other by being located near each other, e.g., a library located adjacent a school.

Some of the embodiments are also directed to separate but related facilities, such as the same or similar types of facilities located in a certain region, e.g., all public schools in a certain county. For example, it may be beneficial for certain related facilities to follow certain procedures if lockdown procedures are initiated in one of the related facilities.

As one such example, it may be beneficial for all schools in a certain region or county to follow lockdown procedures if one of the schools in that region or county is placed in lockdown. This procedure may be beneficial for various reasons, such as to provide an appropriate response to a coordinated attack, to isolate the school in lockdown by controlling related transportation issues (e.g., preventing students from other schools from being transported to the school in lockdown), etc.

As an alternative to placing all related schools into lockdown, it may be beneficial to adopt other procedures for the related schools that were not actuated to be in lockdown. For example, it may be beneficial for the related schools to operate in a way that isolates the school that was actuated into lockdown, such as by transmitting communications to relevant individuals to prevent students and other individuals from being transported to the school that was actuated into lockdown, such as by preventing sports teams from being transported to the affected school.

The above procedures may be beneficial for various reasons, such as by reducing the number of individuals exposed to the risks inherent in the circumstances warranting the lockdown, reducing chaos or confusion at the facility in lockdown, avoiding impeding efforts by authorities or others responding to the lockdown, etc.

B. Applicable Situations

Various of the disclosed methods and apparatus enhance safety and/or security in various types of potentially dangerous situations. Many of the embodiments are disclosed in the context of shootings and/or other types of violence at facilities, including but not limited to events referred to in the present disclosure as active shooter situations that warrant or otherwise involve lockdown situations or lockdown related procedures. In other words, these embodiments relate to situations where it may be beneficial to contain certain facility occupants to a secured area in order to restrict entry and/or exit from that area for the purpose of reducing exposure of the facility occupants to an active shooter.

However, many other embodiments are directed to, or otherwise applicable in the context of, other types of emergencies unrelated to active shooter situations. For example, some embodiments are applicable to placing facility occupants in lockdown in the context of weather related emergencies, including but not limited to situations involving tornadoes, hurricanes, floods, earthquakes, etc. Still other embodiments address types of situations other than those disclosed above that may place facility occupants at risk of injury or death.

However, other embodiments include methods and apparatus that are applicable in contexts in which facility occupants are not in direct or indirect risk of injury or death. For example, some of these embodiments are applicable in situations in which it may be beneficial to place the facility, or parts thereof, in lockdown for the purpose of conducting an investigation. Some of these embodiments address lockdown situations in which a search is conducted within this facility, including but not limited to searches for contraband, illegal narcotics, firearms, explosives, etc.

C. Object of Safety/Security

Many of the disclosed embodiments are directed to enhancing the safety and/or security of people disposed in and/or proximate to facilities. However, the various embodiments are intended to enhance the safety and/or security of anything, including but not limited to people, animals and other organisms, personal and real property, disposed in or proximate to the facility. In fact, some embodiments enhance the safety and/or security of people and things that are not disposed proximate to the facility that is the object of lockdown.

D. Apparatus and/or Equipment

Many of the disclosed embodiments include or otherwise involve various types of apparatus and/or equipment. For example, in the context of initiating and/or otherwise communicating a lockdown situation at a certain facility, some embodiments include at least one of the following types of apparatus: manually and/or automatically operated actuators to initiate the lockdown; communicators to communicate the lockdown including annunciators, strobes, etc.; and other types of communications or processing apparatus. For example, some of this communications or processing apparatus instructs the communicators (annunciators, strobes, etc.) to communicate the lockdown situation to individuals located at or proximate to the facility upon actuation of the actuators. In addition or as an alternative, the communications or processing apparatus of some embodiments communicates the lockdown situation to individuals not located at or proximate to the facility upon actuation of the actuators.

Any and all of the above apparatus, including but not limited to the above communications or processing apparatus, may include or otherwise involve processors, software, and/or other known, related art, or later developed electronics, fiber optics, or other technologies. Some of these processors may include at least one of: 1) central processing unit(s), such as a processing unit, in Von Neumann computer architecture, that contains an arithmetic logic unit (ALU) and processor registers; 2) microprocessor(s), such as those including a silicon chip, containing one or more CPUs, as part of a microcomputer, e.g., a multipurpose, programmable device that accepts digital data as input, processes it according to instructions stored in its memory, and provides results as output, and thereby utilizes sequential digital logic based on its inclusion of internal memory; 3) application-specific instruction-set processor(s), such as a component used in system-on-a-chip design; 4) graphics processing unit(s) (GPU/VPU), such as a dedicated graphics rendering device for a personal computer, game console, etc.; 5) physics processing unit(s) (PPU), such as a dedicated microprocessor designed to handle the calculations of physics; 6) digital signal processor(s), such as a specialized microprocessor designed specifically for digital signal processing; 7) network processor(s), a microprocessor specifically targeted at the networking application domain; 8) front end processor(s), such as a helper processor for communication between a host computer and other devices; 9) coprocessor(s); 10) floating-point unit(s); and data processing system(s), such as a system that translates or converts between different data formats.

Exemplary embodiments are intended to include or otherwise cover all software or computer programs usable with any of the above processors and thereby capable of performing the various disclosed operations, determinations, calculations, etc., for the purpose of initiating and/or communicating lockdown. For example, exemplary embodiments are intended to cover all software or computer programs capable of enabling the processors disclosed above to implement the disclosed processes. In other words, exemplary embodiments are intended to cover all systems and processes that configure a document operating system to implement the disclosed processes.

Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or subnetworks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Some of the disclosed communications systems are configured to exchange electronic communications, by inclusion of a mobile device, a service provider, and a communication device, wherein the service provider facilitates communications between the mobile device and the communication device over a network. The network is configured to enable exchange of electronic communications between devices connected to the network. For example, the network may be configured to enable exchange of electronic communications between the mobile device, the service provider, and the communication device. The network may include, for example, one or more of the Internet, Wide Area Networks (WANs) Local Area Networks (LANs), analog or digital wired and wireless telephone networks (e.g., a PSTN Integrated Services Digital Network (ISDN), a cellular network, and Digital Subscriber Line (xDSL)), radio, television, cable, satellite, and/or any other delivery or tunneling mechanism for carrying data. Network 210 may include multiple networks or subnetworks, each of which may include, for example, a wired or wireless data pathway. The network may include a circuit-switched voice network, a packet--switched data network, or any other network able to carry electron communications. For example, the network may include networks based on the Internet protocol (IP) or asynchronous transfer mode (ATM) and may support voice using, for example, VoIP, Voice-over-ATM, or other comparable protocols used for voice data communications. In one implementation, the network 210 includes a cellular telephone network configured to enable exchange of text or SMS messages.

The mobile device is configured to exchange electronic communications with the communication device through service provider. The mobile device may be any mobile device configured to exchange electronic communications over a network. For example, the mobile device may be a wireless phone, a cellular phone, a mobile personal digital assistant (PDA) with embedded cellular phone technology, a smart phone, etc.

II. Methods and Apparatus for Initiating Lockdown Procedures

FIG. 1 is a schematic of a lockdown system in accordance with an exemplary embodiment. As shown in FIG. 1, the lockdown system 1 includes at least one actuator 3, at least one annunciator 5, at least one visual indicator 7, and a controller 9. The at least one actuator 3, annunciator 5, and visual indicator 7 are located at or proximate to the facility. The controller 9 can be located at or proximate to the facility, or alternatively disposed away from the facility.

In accordance with this embodiment, manual actuation of the actuator 3 results in transmission of a lockdown initiation signal to the controller 9. Upon receipt of the lockdown initiation signal, the controller 9 transmits an activation signal to the at least one annunciator 5 and visual indicator 7. The at least one annunciator 5 and visual indicator 7 communicate initiation of lockdown procedures to individuals at or in proximity to the facility upon receipt of the activation signal. Upon receipt of the lockdown initiation signal, the controller 9 also transmits a communication signal to at least one authorized recipient 11. In many embodiments, the at least one authorized recipient 11 includes a centralized facility of authorized personnel for responding to emergencies, including but not limited to a police station, fire station, medical dispatch unit, etc.

A. Actuator

The at least one actuator 3 can be manually operated and include any possible configuration that results in transmission of the lockdown initiation signal to the controller 9. The actuator 3 can be statically mounted to an object in the facility at issue, such as to a wall of the facility.

It may be especially beneficial for the actuator 3 to be configured so as to be easily recognizable or identifiable as compared to a fire alarm pull station or other switches or apparatus. For example, easy recognition or identification facilitates swift actuation upon the occurrence of circumstances warranting initiation of lockdown procedures. Easy recognition or identification will also reduce the likelihood of unintended actuation of a fire alarm pull stations upon the occurrence of circumstances warranting lockdown procedures, and vice versa. These benefits are especially relevant in circumstances that may cause individuals, who may need to actuate the actuator 3, to experience high amounts of stress, making it more difficult for these individuals to recognize or identify the actuator 3. In other words, the circumstances warranting lockdown are typically very stressful, making certain decisions, such as identification/recognition of the lockdown actuator more difficult, and thus it is especially beneficial in these situations to enable these individuals to easily distinguish the lockdown actuator from a fire alarm actuator. Various aspects of the actuator configuration that facilitate recognition and identification include, but are not limited to, size, shape, color, texture, location, disposition, orientation, method of operation, etc.

It may similarly be beneficial for the actuator 3 to be configured so as to be easily and intuitively actuated, while also reducing, impeding, or avoiding unintended actuation. For example, it may be beneficial for the actuator 3 to have a configuration so that it can be actuated by individuals with minimal training, including children, and who may be subjected to high amounts of stress. However, it is also beneficial for the actuator to have a configuration that also reduces, impedes, or avoids unintended actuation, such as could occur by unintended contact, e.g., accidental contact with a person or object. The likelihood of such unintended contacts is increased in various applications, such as in a facility occupied by children, a facility undergoing construction, etc.

The actuators 3 of many of the disclosed embodiments utilize a button or button-like actuation mechanism, wherein application of pressure at a surface of the actuator initiates actuation. In many of these embodiments, this pressure is effective or most effective for actuation if applied generally perpendicular to an exterior surface, such as a front surface, of the actuator 3. It may be especially beneficial for the actuator to clearly identify the area or region to which pressure is to be applied, for reasons disclosed above, e.g., to facilitate ease of actuation, etc.

Figure 2A:
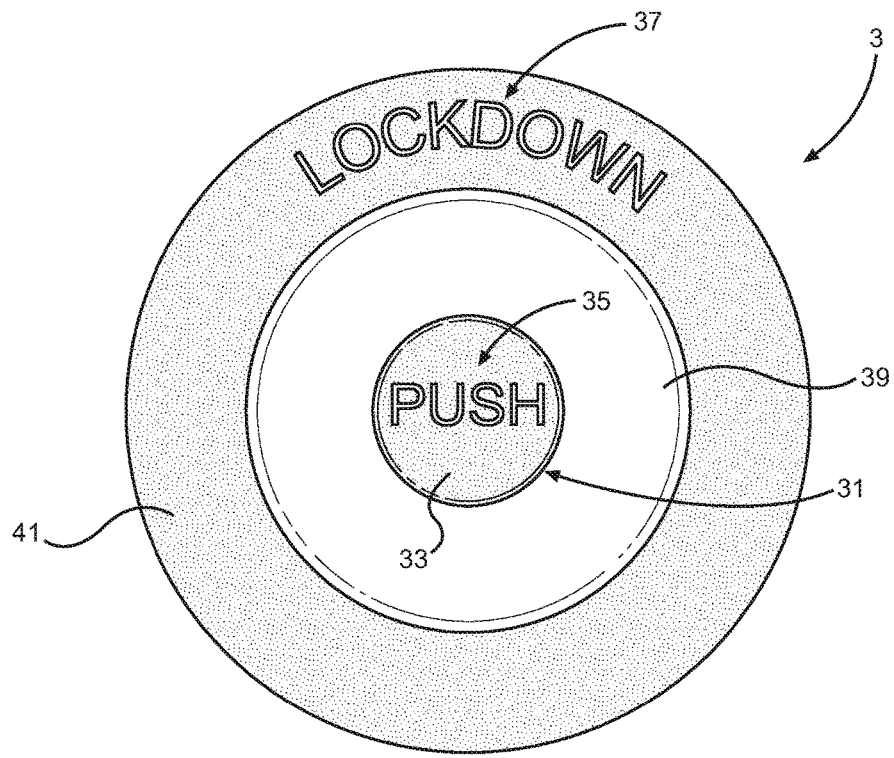
FIG. 2A is a schematic of an actuator in accordance with one exemplary embodiment.

FIG. 2A is a schematic of an actuator in accordance with one exemplary embodiment. The actuator 3 of the embodiment of FIG. 2A is circular in shape, or at least is viewed as circular from the perspective of an individual who is positioned to actuate the actuator 3. This circular shape may be beneficial because it is easily distinguishable from fire alarm actuators, such as fire alarm pull stations, which are rectangular or square in shape.

The actuator 3 of FIG. 2A includes an inner circular button 31 that actuates the actuator 3 upon receipt of pressure applied by a user. Embodiments are intended to include or otherwise involve any actuation mechanism to perform this operation, such as spring-based mechanisms. For example, the actuation mechanism can actuate the actuator 3 upon the button 31 being depressed by a certain distance as a result of the application of pressure, such as pressure being applied to a front exterior surface 33 of the button 31.

In some of these embodiments, the amount or distance of depression that causes actuation can only be achieved by application of a fairly significant force or amount of pressure, such as an amount of pressure resulting from application of more than one pound of force applied to the front exterior surface 33 of the button 31. In some of these embodiments, this amount of force is in the range of between approximately 3 pounds of pressure and approximately 6 pounds of pressure. In some of these embodiments, this amount of force is in the range of between approximately 4.5 pounds of pressure and approximately 5.5 pounds of pressure. In some of these embodiments, this amount of force is equal to approximately 5.0 pounds of pressure. However, some actuators are configured to require application of more than approximately six pounds of force for actuation.

The embodiments that include buttons 31 that only provide actuation upon application of a fairly significant force or amount of pressure may be beneficial by impeding or avoiding unintended actuations. For example, application of a fairly significant amount of force implies an intention on the part of a user to depress the button 31 for the purpose of actuating the actuator. In other words, requiring a fairly significant amount of force avoids unintended actuations that would result from application of a lesser amount of force, such as might occur upon a person or object accidently contacting the button 31.

The amount of force or pressure applied to the exterior front surface 33 of the button 31 that is required for actuation may be determined based on a balancing of multiple issues. For example, a lesser amount of force is beneficial by facilitating ease and swiftness of actuation, which may be especially beneficial in certain circumstances, such as where the actuation is performed by a child or person suffering from an injury. Contrarily, a greater amount of force is beneficial by impeding or avoiding unintended actuations. In fact, the amount of force that is required for actuation may be determined based on a balancing of multiple issues that may be relevant to a particular facility or actuator location. For example, it may be beneficial for actuation to result from application of a relatively lower amount of force in certain facilities or locations, such as where unintended actuations are less likely (e.g., the front office of a school), or locations where actuation may need to be performed by young children (e.g., proximate a kindergarten classroom, etc.). Alternatively, it may be beneficial for actuation to result from application of a relatively higher amount of force in certain facilities or locations, such as where unintended actuations are more likely (e.g., the hallway of a school) or where actuation is more likely to be performed by a healthy adult (e.g., in an office building).

In addition or as an alternative to the amount of force disclosed above, some embodiments include a structure that only allows the button 31 to be depressed upon application of a force to the front exterior surface 33 in a direction perpendicular or substantially perpendicular to that surface 33. For example, some of these embodiments include a structure such that a force only results in depression of the button 31 sufficient for actuation upon being applied in a direction in the range of between 60 degrees and 120 degrees relative to the front exterior surface 33. In some of these embodiments, this force needs to be applied in the range between 80 degrees and 100 degrees relative to the front exterior surface 33 in order to depress the button 31 a certain distance to result in actuation. In some of these embodiments, this direction of force needs to be in the range between 85 degrees and 95 degrees relative to the front exterior surface 33 for actuation. Still further, some of these embodiments need the force to be 90 degrees to result in actuation.

The preciseness of the direction of force or pressure applied to the exterior front surface 33 of the button 31 that is required for actuation may be determined based on a balancing of multiple issues. For example, a less precise direction of force is beneficial by facilitating ease and swiftness of actuation, which may be especially beneficial in certain circumstances, such as where the actuation is performed by a child or person suffering from an injury. Contrarily, a more precise direction of force or pressure is beneficial by impeding or avoiding unintended actuations. In fact, the preciseness of the direction of force or pressure that is required for actuation may be determined based on a balancing of multiple issues that may be relevant to a particular facility or actuator location. For example, it may be beneficial for actuation to result from application of a relatively less precise direction of force in certain facilities or locations, such as where unintended actuations are less likely (e.g., the front office of a school), or locations where actuation may need to be performed by young children (e.g., proximate a kindergarten classroom, etc.). Alternatively, it may be beneficial for actuation to result from application of a relatively more precise direction of force in certain facilities or locations, such as where unintended actuations are more likely (e.g., the hallway of a school) or where actuation is more likely to be performed by a healthy adult (e.g., in an office building).

In addition or as an alternative to the amount and/or direction of force disclosed above, some embodiments include a structure that only allows actuation upon the button 31 being depressed by a certain distance for a certain amount of time. For example, some of these embodiments include a structure such that the button 31 needs to be depressed for a period in the range of approximately 1 second to approximately 3 seconds in order to result in actuation. In some of these embodiments, this force needs to be applied for a period in the range of approximately 1.5 seconds to approximately 2.5 seconds. In some of these embodiments, this period needs to be between 1.8 seconds and 2.2 seconds relative to the front exterior surface 33 for actuation. Still further, some of these embodiments require a force to be applied for 2 seconds to result in actuation.

The period of force or pressure applied to the exterior front surface 33 of the button 31 that is required for actuation may be determined based on a balancing of multiple issues. For example, a shorter period is beneficial by facilitating ease and swiftness of actuation, which may be especially beneficial in certain circumstances, such as where the actuation is performed by a child or person suffering from an injury. Contrarily, a longer period of force or pressure is beneficial by impeding or avoiding unintended actuations. In fact, the period of force or pressure that is required for actuation may be determined based on a balancing of multiple issues that may be relevant to a particular facility or actuator location. For example, it may be beneficial for actuation to result from application of a relatively shorter period of force in certain facilities or locations, such as where unintended actuations are less likely (e.g., the front office of a school), or locations where actuation may need to be performed by young children (e.g., proximate a kindergarten classroom, etc.). Alternatively, it may be beneficial for actuation to result from application of a relatively longer period of force in certain facilities or locations, such as where unintended actuations are more likely (e.g., the hallway of a school) or where actuation is more likely to be performed by a healthy adult (e.g., in an office building).

The actuator 3 may include features or structures that facilitate actuation, such as by enabling a user to more easily or intuitively understand how to actuate the actuator. For example, the button 31 can be raised or otherwise outwardly offset in a direction perpendicular to its front exterior surface 33, which helps a user to understand that depression of the button is required for actuation. However, raising or offsetting the button 31 may increase the likelihood of unintended actuations, because the button 31 may be more prone to unintended contacts. In other words, making the button 31 flush or even indented (inwardly offset) relative to other portions of the actuator, such as portions defining the actuator perimeter, may reduce the likelihood of unintended actuations, because the button 31 may be less prone to unintended contacts. The determination as to whether to raise or indent the button 31, or to make the button 31 flush, can be determined by balancing the issues disclosed above in the contexts of amount, angle, and period of force necessary for actuation.

As an alternative or in addition to the above button offset features, the actuator 3 may include other or additional features or structures that facilitate actuation, such as by enabling a user to more easily or intuitively understand how to actuate the actuator. For example, the button 31 can include identifying indicia or markings to facilitate a user's understanding of where to apply pressure for actuation. In the embodiment of FIG. 2A, the exterior front surface 33 of the button 31 includes indicia 35 in the form of the words "PUSH" to facilitate a user's understand that pushing the button 31 results in actuation. The actuator 3 can include other indicia or words to further facilitate the user's understanding that applying pressure to the button 31 results in actuation and thus initiation of lockdown procedures. For example, in the embodiment of FIG. 2A, the actuator 3 includes additional indicia 37 in the form of the words "LOCKDOWN" to help users to understand that actuation of the actuator 3 results in initiation of lockdown procedures.

The actuator 3 may include other or additional features or structures that: 1) facilitate actuation (such as by enabling a user to more easily or intuitively understand how to actuate the actuator), and/or 2) facilitate identification or recognition of the actuator 3. These additional features or structures that enable identification or recognition may be especially beneficial for facility occupants who are not familiar with the actuator location, are experiencing heightened stress levels, etc. In the embodiment of FIG. 2A, the actuator includes a series of concentric circles, such as in the general form of a target. For example, a base is provided that includes an intermediate circle 39 immediately surrounds the button 31, and an outer circle 41 surrounds the intermediate circle 39. In this embodiment, one or more portions of the base are connected to a static object, such as a wall of the facility at issue.

Each of the adjacent circular areas disclosed above, i.e., button 31, intermediate circle 39, and outer circle 41, can be visually distinguishable. For example, in the embodiment of FIG. 2A, the intermediate circle 39 is visually distinguishable from both the button 31 and outer circle 41, and in particular, the intermediate circle 39 is white (or light in color), while the button 31 and outer circle 41 are dark in color. It may be especially beneficial for the button 31 and outer circle 41 to be the same color, and in particular a color that is used with other elements of the lockdown system, to enhance recognizability and identification of the system.

For example, it may be beneficial for these and other elements of the lockdown system to be a color that is distinguishable from colors used to identify fire alarm pull stations, which are often red and/or black, or other systems that are unrelated to the lockdown system. Thus, in some embodiments, the button 31 and outer circle 41, as well as other elements of the lockdown system, are colored blue or green. Blue may be especially beneficial because identification lights on many police cars are blue, and thus adopting that color may help facility occupants to recognize or identify the actuator 3 because, as explained in other sections of the present disclosure, actuating the actuator 3 results in communication of the lockdown to responsible authorities, including local law enforcement tasked with addressing the circumstances warranting the lockdown. In other words, adopting blue may be beneficial by enabling facility occupants to consciously or unconsciously relate the lockdown actuator 3 to authorized responding authorities, including police officers.

Embodiments are intended to include or otherwise cover additional or alternative structures to those disclosed above. For example, in addition or as an alternative to the features disclosed above that may be beneficial to impeding, reducing or preventing unintended actuations, a cover can be provided to cover the front exterior surface 33 of the button 31. In other words, the cover can be provided as an alternative to the structures disclosed above for impeding, reducing or preventing unintended actuations, or alternatively the cover can be provided in addition to these structures to provide additional protection against unintended actuations.

Figure 2B:
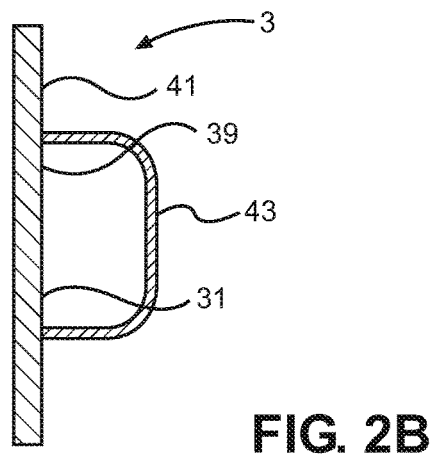
FIG. 2B is a schematic of an actuator that includes a static cover in accordance with one exemplary embodiment.

FIG. 2B is a schematic of an actuator that includes a cover in accordance with one exemplary embodiment. As shown in FIG. 2B, the cover 43 extends over the front exterior surface 33 of the button 31, which thereby provides some shielding effect to the button 31. In other words, the cover 43 shields the button 31 from being accessed, and thus a facility occupant cannot access the button without first addressing the cover 43. Embodiments are intended to include any cover 43 to ultimately provide access to the button 31, i.e., any structure that provides some impediment to accessing the actuator for the purpose of impeding, reducing or preventing unintended actuation. For example, the cover 43 needs to be an impediment to unintended actuation, while at the same time needs to enable intended actuation, and most beneficially, to enable intended actuation without undue burden or with a reduced or minimum burden.

The robustness of the cover 43, i.e., the amount of effort required to overcome the cover 43 and thereby actuate the button 31, may be determined based on a balancing of multiple issues. For example, a less robust cover 43 is beneficial by facilitating ease and swiftness of actuation, which may be especially beneficial in certain circumstances, such as where the actuation is performed by a child or person suffering from an injury. Contrarily, a more robust cover 43 is beneficial by impeding or avoiding unintended actuations. In fact, the robustness of the cover 43, i.e., the amount of effort required to overcome the cover 43 and thereby actuate the button 31, may be determined based on a balancing of multiple issues that may be relevant to a particular facility or actuator location. For example, it may be beneficial to provide a less robust cover 43 in certain facilities or locations, such as where unintended actuations are less likely (e.g., the front office of a school), or locations where actuation may need to be performed by young children (e.g., proximate a kindergarten classroom, etc.). Alternatively, it may be beneficial to provide a more robust cover 43 in certain facilities or locations, such as where unintended actuations are more likely (e.g., the hallway of a school) or where actuation is more likely to be performed by a healthy adult (e.g., in an office building).

In the embodiment of FIG. 2B, the cover only extends over a portion of the actuator 3. For example, the cover 43 shown in FIG. 2B extends over the intermediate circle 39 and the button 31. In some of these embodiments, the cover 43 is circular and sized to be aligned or otherwise conform with an outer perimeter of the intermediate circle 39. However, covers of other embodiments may be different shapes and sizes. For example, the cover 43 of some embodiments is larger than the cover 43 of FIG. 2B, and in some of these embodiments the larger cover covers the outer circle 41. In some of these embodiments, the larger cover is circular and is aligned or otherwise conforms with an outer perimeter of the outer circle 41. Contrarily, in other embodiments, the cover 43 is smaller than the cover of FIG. 2B. For example, the cover can be sized to only cover the button 31, such as to be aligned or otherwise conform with an outer perimeter of the button 31. However, other smaller cover embodiments may be slightly larger, and may cover a portion of the intermediate circle 39.

In some embodiments, the cover 43 is clear or semi-transparent, enabling a facility occupant to view the button 31 and other portions of the actuator 3 that are covered by the cover 43. Allowing a facility occupant to view the button 31 may be beneficial by facilitating its actuation, i.e., enabling a facility occupant to identify the location of the button 31 so that pressure/contact can be applied thereto. Many embodiments provide this feature, especially in situations where all facility occupants are authorized to actuate the actuator. However, other covers can visually shield certain or all portions of the actuator 3. For example, in some embodiments, the cover can shield view of the button 31 from individuals who are not intended to have authorization for actuating the actuator 3, such as in the context of the actuator being installed in a prison, i.e., where prison inmates may not be authorized to actuate the actuator 3.

In the embodiment of FIG. 2B, the cover 43 is static. Thus, in some of these embodiments, access to the button 31 is achieved by breaking or otherwise deforming the cover 43. For example, the cover 31 can be formed of glass or some other transparent or semi-transparent brittle or other material that can be broken by a facility occupant. In some of these embodiments, the cover 43 is configured to enable a facility occupant to break the cover 43, and thereby gain access to the button 43, by solely using the facility occupant's hand. For example, the facility occupant can apply sufficient pressure to break the cover 43 using a fist, a single or multiple fingers, etc. These embodiments may be beneficial based on simplicity, which facilities ease, intuitiveness and swiftness of use. In fact, some embodiments are configured to further guide or prompt facility occupants as to how to access the button. For example, in some of these embodiments, indicia is provided on or adjacent to the breakable cover 43 indicating that the cover 43 is breakable and needs to be broken to provide access to the button 31, e.g., break glass to enable actuation.

In other embodiments, additional structures are provided to facilitate or aid a facility occupant in breaking the cover 43 to obtain access to the button 31. For example, a rigid member, such as a small hammer, can be provided proximate the actuator that can be used to break the cover 43. In some of these embodiments, the rigid member is secured to a chain to impede or prevent the rigid member from being separated from the actuator 3 to impede or prevent it from being lost, stolen, etc.

However, other static covers 43 do not necessarily need to be broken to provide access to the button 31. For example, some static covers 43 can deform upon the application of a sufficient amount of pressure. In some of these embodiments, the cover 43 beds or otherwise deforms generally in the direction of the application of force. Thus, a facility occupant applied a certain amount of pressure to the exterior surface of the cover 43, which then deforms inwardly such that the continued application of pressure is transferred to the button, thereby resulting in actuation thereof.

The covers of other embodiments are not static. Thus, in accordance with these embodiments, the covers are movable to provide access to the button 31. Embodiments are intended to include or otherwise cover any mechanisms for enabling the covers to be movable to provide access to the button 31. A few such embodiments a disclosed below for exemplary purposes, but these disclosures are not intended to constitute an exhaustive listing of structures covered by the various embodiments.

Figure 2C:
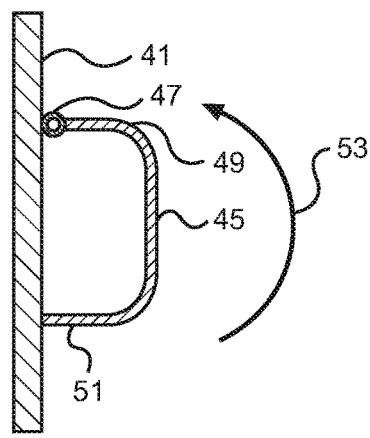
FIG. 2C is a schematic of an actuator that includes a movable cover in accordance with one exemplary embodiment.

FIG. 2C is a schematic of an actuator that includes a movable cover in accordance with one exemplary embodiment. As shown in FIG. 2C, an alternative cover 45 is attached to, or otherwise communicates with, a hinge 47 that enables the cover 45 to be rotated about an axis of the hinge 47. In this embodiment, the hinge 47 is provided at a location to connect an upper end 49 of the cover 45 to a relevant portion of the base, i.e., at the intermediate circle 39 and/or outer circle 41. The opposite lower end 51 of the cover 45 is not permanently attached to the base to enable the cover 45 to be rotated about the hinge 47, such as in a counterclockwise direction shown in arrow 53.

In some of these embodiments, the lower end 51 of the cover 45 is configured to merely rest against or otherwise be disposed proximate the base, which facilitates ease of manual rotation of the cover 45. However, other alternative embodiments include structure(s) to hold the lower end 51 of the cover 45 in place against the base, which can be beneficial to ensure or otherwise decrease the likelihood of the cover 45 being rotated in situations where actuation of the button 31 is not intended. In addition, these structure(s) can provide other benefits, such as by forming a tighter seal between the cover 45 and the base so as to impede or prevent debris, dust, etc., from entering the space defined between the cover 45 and the button 31. In these embodiments, the structure(s) should form a sufficient seal between the cover 45 and the base to accomplish any of the above benefits, however the seal should not be overly strong to unnecessarily impede manual rotation of the cover 45. In other words, the connection between the bottom end 51 of the cover 45 and the base should not be overly robust so as to significantly impede rotation of the cover 45 and thus access to the button 45.

However, the robustness of the connection between the bottom end 51 of the cover 45 and the base can be determined based on application, and/or may be determined based on a balancing of multiple issues. For example, a less robust connection is beneficial by facilitating ease and swiftness of rotation of the cover 45 and thus access to the button 31, which may be especially beneficial in certain circumstances, such as where the actuation is performed by a child or person suffering from an injury. Contrarily, a more robust connection is beneficial by impeding or avoiding unintended actuations, or achieving other benefits, such as by blocking an increased amount of dust, debris, etc. In fact, the robustness of the connection may be determined based on a balancing of multiple issues that may be relevant to a particular facility or actuator location. For example, it may be beneficial to provide a less robust connection in certain facilities or locations, such as where unintended actuations are less likely (e.g., the front office of a school), or locations where actuation may need to be performed by young children (e.g., proximate a kindergarten classroom, etc.). Alternatively, it may be beneficial to provide a more robust connection in certain facilities or locations, such as where unintended actuations are more likely (e.g., the hallway of a school) or where actuation is more likely to be performed by a healthy adult (e.g., in an office building).

Figure 2D:
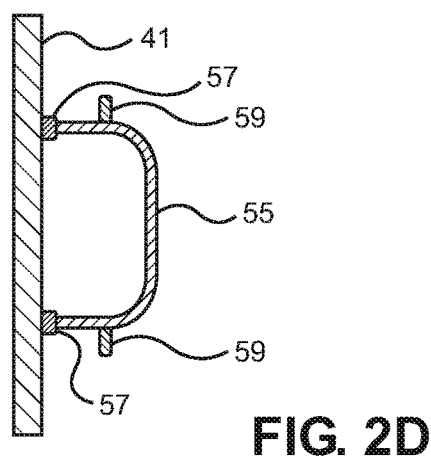
FIG. 2D is a schematic of an actuator that includes a movable cover in accordance with another exemplary embodiment.

However, embodiments are intended to include or otherwise cover other alternative mechanisms for enabling the covers to be movable to provide access to the button 31. FIG. 2D is a schematic of an actuator that includes a movable cover in accordance with another exemplary embodiment. As shown in FIG. 2D, a cover 55 is attached to the base by a connector 57. The connector 57 may be a single contiguous structure that extends around the entire periphery of the cover 55 so as to form a connection between the entire surface of the cover 55 and the base. Alternatively, the connector 57 may connect less than the entire periphery of the cover 55 to the base, such as at one discrete location. As another alternative, multiple connectors 57 may be provided to connect multiple spaced apart portions of the periphery of the cover 55 to the base.

Embodiments are intended to include or otherwise cover any type of connector 57 that enables the cover 55 to be removably connected to the base. In some of these embodiments, the connector 57 is sufficiently robust to hold the cover 55 in place during normal operation, but becomes completely detached from the base (intermediate circle 39 and outer circle 41) upon application of a certain force. For example, in some of these embodiments, a force applied to the cover 55 in a direction away from the base, such as perpendicular to the base, accomplishes this detachment.

As one example, a facility occupant (using his or her hand) can grasp and pull the cover 55 away from the base to separate the cover 55 from the base. In some of these embodiments, the cover 55 is structured to facilitate a facility occupant grasping and pulling the cover. For example, the cover can include one or more contact portions 59 that can be used by the facility occupant as leverage, i.e., enabling the facility occupant being able to maintain a sufficient grip with the cover 55 to apply the requisite pulling force to achieve separation of the cover 55. Embodiments are intended to include or otherwise cover contact portions 59 having any structure to performs the above operation. For example, in the embodiment of FIG. 2D, the contact portions 59 include convex extensions extending from top and bottom surfaces of the cover 55. However, these convex extensions can be provided at other locations of the cover. In fact, instead of convex extensions, the contact portions can include concavities that enable one or more of a facility occupant's fingers to grasp the cover 55 with the requisite force to enable separation of the cover 55 form the base.

Figure 2E:
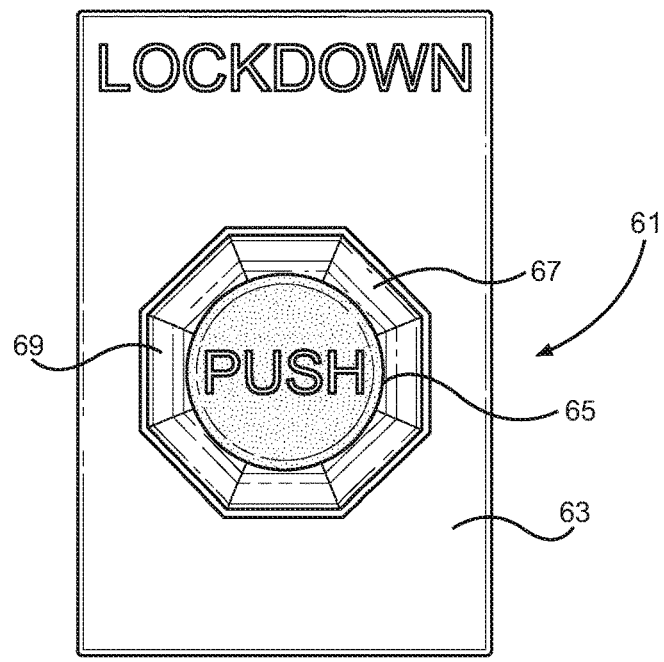
FIG. 2E is a schematic of an actuator in accordance with an alternative exemplary embodiment.

As indicated above, embodiments are intended to include any type or configuration of actuator that enables manual actuation resulting in transmission of the lockdown initiation signal to the controller 9. FIG. 2E is a schematic of an actuator in accordance with an alternative exemplary embodiment. The actuator 61 shown in FIG. 2E includes a rectangular base 63 that is connectable to a static object, such as a wall of the facility at issue. The base 63 can include indicia that facilitates recognition or identification of the actuator. For example, in the embodiment of FIG. 2E, the base 63 is provided with the word "LOCKDOWN" to facilitate a facility occupant's recognition that actuation of the actuator 61 results in initiation of lockdown procedures.

A button 65 is provided within an indention defined in the base 63. In the embodiment of FIG. 2E, the button defines a circular surface, and the indentation 67 is octagonal. These shapes may be beneficial for numerous reasons. For example, the circular shape of the button 65 is easily distinguishable from standard fire alarm pull stations, which are typically rectangular or square in shape. In addition, the octagonal shape of the indentation 67 may be beneficial by inherently communicating a sense of urgency, caution, significance, etc. by virtue of its similarity to the shape of stop signs that are prolifically provided at highways. In other words, many facility occupants will analogize the octagonal shape with the urgency, caution, significance, etc., typically experienced upon encountering a stop sign on a highway. The button can include other structures to facilitate a user's ease in operating the actuator 61. For example, in the embodiment of FIG. 2E, the surface of the button 65 is provided with the indicia "PUSH" 69.

The base 63 may be attached to an exterior of a static surface, such as a wall of the facility, such that a thickness of the base 63 projects from the exterior surface of the wall. Alternatively, the base 63 can be mounted into a recess of the wall, such that the exterior surface of the base 63 is flush with the exterior surface of the wall. In this case, an exterior surface of the button 65, which is disposed in the indentation 67 of the base 63, may also be flush with the exterior surface of the wall and the exterior surface of the base 63, relative to a direction perpendicular to the exterior surfaces.

Alternatively, the button 63 may be disposed and configured such that its exterior surface is spaced outwardly from one or both of the exterior surface of the wall and the exterior surface of the base 63, which may enhance the button's visibility to facility occupants. Alternatively, the button may be recessed within the concavity of the indentation 67, which may impede or prevent unintentional actuation.

Figure 2F:
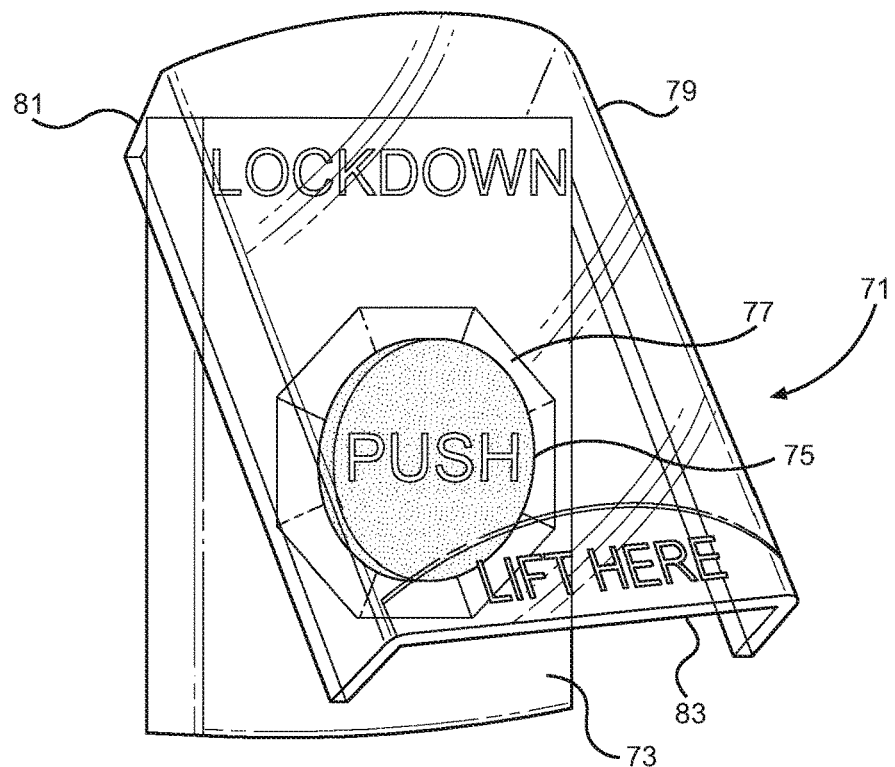
FIG. 2F is a schematic of an actuator in accordance with another alternative exemplary embodiment.

FIG. 2F is a schematic of an actuator in accordance with another alternative exemplary embodiment. The structure of the actuator 71 of FIG. 2F is similar in some respects to the structure of the actuator of FIG. 2E. For example, the actuator 71 includes a rectangular base 73 and an octagonal button 75 disposed in an indentation 77 formed in the base 73.

However, a cover is provided to shield access to the button 75. As shown in FIG. 2F, the cover 79 is transparent and thereby enables a facility occupant to view the button 75 even when the cover 79 is disposed to shield the button 75. The cover is attached to the base 73 by a pair of pins 81 at opposing upper sides of the base 73 and cover 79, which enables the cover 79 to be manually rotated upward/downward about the axis of each pin 81.

The cover 79 includes a lower gripping portion 83 that is configured to facilitate a facility occupant gripping the cover 79 to rotate the cover upward to access the button 75. In the embodiment of FIG. 2F, the lower gripping portion 83 extends between upper surfaces of the sides of the cover to provide access to a rear surface of the lower gripping portion 83. In other words, the lower gripping portion 83 is disposed and configured to enable a facility occupant to place one or more fingers under the lower gripping portion 83 and thereby grasp the lower gripping portion 83 to rotate the cover 79 upward to provide access to the button 75. The lower gripping portion can include structures to facilitate a facility occupant's understanding as to how to rotate the cover 79 to expose the button 75. In some of these embodiments, the lower gripping portion 83 includes indicia to facilitate this operation, such as "LIFT HERE."

Many of the actuators disclosed above are statically or otherwise permanently mounted, and in particular mounted on static objects. Providing the actuators at permanent or semi-permanent locations may be beneficial because it provides the facility occupants with the opportunity to be aware of the actuator locations, so that the facility occupants can efficiently locate the actuators when needed.

It may be especially beneficial to dispose the permanently or semi-permanently mounted actuators at numerous locations throughout the facility to enable the facility occupants to efficiently, easily, and quickly access the actuators if necessary. In some of these embodiments, these benefits are further enhanced by disposing the actuators at locations that are easily accessed by large numbers of facility occupants, such as at along common hallways, hubs of hallways, areas frequented by large numbers of facility occupants, etc. The actuators can be dispersed throughout the facility so that adjacent actuators are spaced apart by a maximum distance. For example, the actuators can be distributed throughout the facility so that the maximum distance separating adjacent actuators is 50 feet, which increases the likelihood of swift and easy access to an actuator.

As disclosed above, the actuators can be configured to facilitate swift and easy identification and recognition by facility occupants, and to be distinguishable from other apparatus, such as fire alarm pull stations. As one example, portions of the actuators can be colored to enhance identification and recognition. For example, portions of the actuator, such as the button, can be colored bright green and/or blue. In addition, various indicia can be provided on the actuator, such as "LOCKDOWN" or "LOCKDOWN ALARM" to identify the actuator, and "PUSH" to identify the button. It would be beneficial to provide the indicia with lettering of a sufficient size to enhance identification, such as using uppercase letters that are at least 2 inches high. It would also be beneficial to provide the indicia in a color that enhances its recognizability. For example, if the indicia is provided on a base or button that is dark in color, then the indicia should be light in color, such as white.

It would also be beneficial for the button of the various embodiments to be a sufficient size to facilitate its identification as well as its operation. In other words, the button should be large enough so that it is easily recognizable by facility occupants, and is easy to push even under circumstances where the facility occupant is subjected to high stress. In some of these embodiments that include a circular button, the button has a diameter of four to seven inches. In some of these embodiments that include a rectangular button, each side of the button has a length of four to seven inches.

Actuation of some of the actuator disclosed above require or otherwise involve all or portions of the actuator moving, such as in a direction perpendicular to a front exterior surface of the actuator. However, embodiments are intended to include or otherwise cover other types of actuators or actuating mechanisms. For example, some actuators may include electronic actuation mechanisms, such as touch screen displays. For example, a virtual button can be provided on a display, such that touching the virtual button constitutes actuation, i.e., results in transmission of the lockdown initiation signal. However, still other embodiments include similar but different actuators, including all known, related art and later developed actuation mechanisms. It may be beneficial for any or all of these electronic and/or other actuation mechanisms to be complimented by a cover or other mechanism to impede, reduce or prevent unintended actuations. For example, some of the actuators that transmit the lockdown initiation signal via a touch screen display may include a cover, such as any of the covers disclosed above, to impede, reduce or prevent unintended actuations.

The actuators are disclosed above in the context of being permanently and statically mounted. However, actuators of other embodiments can be configured to be mobile. In many of these embodiments, the actuators are configured to be carried by facility occupants. Embodiments are intended to include or otherwise cover any configuration that facilitates or makes convenient the carrying of the mobile actuators. For example, the mobile actuator can be configured as a pendant and thus hung around the neck of a facility occupant, or as a bracelet hung around the wrist. In still other embodiments, the mobile actuator is configured to be clipped or otherwise attached to the facility occupant's cloths, attached to a facility occupant's key chain, etc. In many of these embodiments, the actuator is small in size, such as a size defined by a 3 inch diameter in the case of circular actuators, or 3 inches by 3 inches in the case of square actuators.

In addition to being configured to make it easy and convenient for facility occupants to carry the mobile actuators, they may also be configured to impede or prevent unintentional actuations. For example, the mobile actuators may include some or all of the structures, or similar structures, disclosed above to impede or prevent unnecessary actuations in the context of static actuators. For example, the mobile actuators may only transmit the lockdown initiation signal following application of a sufficient amount of force, application of force for a sufficient period, application for force in a sufficiently perpendicular direction, etc. In addition or as an alternative to the above structures, the mobile actuators can be configured to include other mechanisms to avoid unintentional actuations, such as multiple buttons. In some of these embodiments, the mobile actuators only transmit the lockdown initiation signal if two separate buttons are pressed simultaneously. In some of these embodiments, the two buttons are disposed on opposite sides of the mobile actuator to reduce the likelihood of inadvertent actuations as well as to enhance the ease of intended actuations. In other embodiments, one of the buttons is disposed on a side of the mobile actuator, and the other button is disposed on a front or rear face.

As another alternative to the embodiments that include buttons that must be simultaneously pressed for actuation, other embodiments include two separate mechanisms that include a safety mechanism and an actuation mechanism. For example, the mobile actuators of some of these embodiments can include a safety switch that must be toggled or otherwise moved into an active state. In the active state, pressing or otherwise actuating the actuation mechanism, such as a button, will only cause the mobile actuator to transmit the lockdown initiation signal if the safety switch is in the active state. Contrarily, pressing or otherwise actuating the actuation mechanism, such as a button, will not cause the mobile actuator to transmit the lockdown initiation signal if the safety switch is in an inactive state. Some of these embodiments include safety mechanism similar to those included in weapons, such as guns.

Various aspects of the mobile actuators can be configured to facilitate ease of use, etc. For example, the separate buttons or mechanisms can include indicia, different colors, etc., to make them more recognizable or their operation more understandable to facility occupants. The mobile actuations are also intended to include or otherwise cover any of the other structures, mechanisms, etc., disclosed above in the context of static actuators, including colors, indicia, etc.

Some embodiments include or otherwise cover selectively providing mobile actuators to only certain facility occupants, or types of facility occupants. Determining the facility occupants or types of facility occupants who are to be provided with the mobile actuators can be based on a balancing of multiple issues, such as tendency for unintentional actuations, likelihood of intended actuations, speed or ease of actuating a static/permanently mounted actuator, etc.

For example, in the context of a school, typical students may not be provided with mobile actuators to impede, reduce or prevent unintended actuations. However, in some embodiments, certain students may be provided with mobile actuators, such as students who are disabled or otherwise unable to access static/permanently mounted actuators. In some of these embodiments, all teachers and/or other adult school officials may be provided with mobile actuators to enhance the speed and ease with which intended actuations can be performed. In some other embodiments, only certain teachers or school officials may be provided with mobile actuators to impede, reduce or prevent unintended actuations. In other words, the likelihood of unintentional actuations is decreased by reducing the number of mobile actuators.

The determination as to which teachers or school officials are to be provided with mobile actuators can be based on various factors. For example, a certain number of teachers per region of the school can be provided with the mobile actuators, which will provide the ability to transmit the lockdown initiation signal if the static/permanently mounted actuators in that region of the school cannot be accessed or if such access becomes difficult. As another example, teachers who are not located proximate static/permanently mounted actuators can be provided with mobile actuators, such as teachers who are outside of the school, e.g., at recess, physical education, etc.

B. Annunciator

The at least one annunciator 5 can include any structure or configuration to perform the operation of communicating initiation of lockdown procedures to individuals at or in proximity to the facility upon receipt of the activation signal. It may be especially beneficial for the audible communication of lockdown procedures to be distinguishable from the audible communication of other conditions, such as a fire alarm, for reasons disclosed above. It may also be beneficial for the annunciator to be structurally distinguishable from other annunciators, such as fire alarm annunciators, to enhance the facility occupants' ability to distinguish the lockdown audible annunciation from other audible annunciations, such as a fire alarm audible annunciation.

Figure 3A:
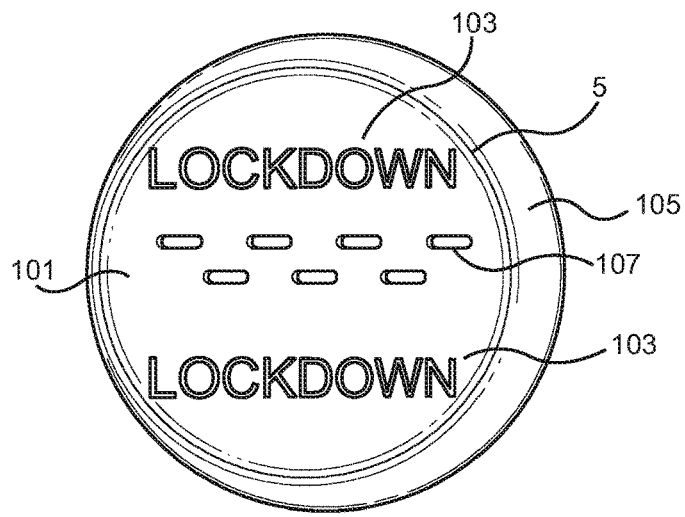
FIG. 3A is a schematic of an annunciator in accordance with one exemplary embodiment.

FIG. 3A is a schematic of an annunciator in accordance with one exemplary embodiment. The annunciator 5 of FIG. 3A defines a circular front exterior face 101, which may be beneficial based on its similarity in shape to the exemplary actuator 3 shown in FIG. 2A. For example, sharing the same circular shape may enhance the facility occupants' ability to more easily recognize that the source of the audible annunciation, i.e., the annunciator 5, communicates initiation of lockdown procedures, as opposed to other procedures, such as a fire alarm. The annunciator 5 may also share the same or similar color (such as blue) as the actuator 3 or other components of the lockdown system for the same reason, i.e., to facilitate the facility occupants' recognition of the audible communication of the lockdown procedures as opposed to other procedures, such as a fire alarm. In fact, providing any or all of the components of the lockdown systems disclosed herein with the same or similar shapes, colors, etc., may also provide these benefits.

In addition or as an alternative to the above physical characteristics of the annunciator 5 that make it more easily distinguishable for other facility systems, such as a fire alarm, the annunciator 5 can include indicia identifying it as part of the lockdown system. For example, in the embodiment of FIG. 3A, the annunciator includes the indicia "LOCKDOWN" 103 at the top and bottom of its front exterior face 101 to enhance the ability of facility occupants to recognize that the source of the audible annunciation is the lockdown annunciator 5.

Embodiments are intended to include or otherwise cover any known, related art, or later developed technologies for enabling, facilitating, and/or causing the communication of the audible lockdown annunciation upon receipt of the activation signal. In many embodiments, some of all of the components that generate the audible annunciation, including but not limited to speakers, electronics, etc., are disposed within a body or casing 105 of the annunciator 5. This configuration may be beneficial by shielding or protecting the audio generating components from damage. In fact, in some embodiments, some or all of these components can be reinforced to prevent damage, such as may result from the intentional actions of an individual whose actions create the circumstances warranting the lockdown. For example, some embodiments include shielding or other protective mechanisms to reduce, minimize or avoid damage to these components that could result from fire arms or other intentional external forces.

The body or casing 105 can include structure(s) to facilitate communication of the audible annunciation that are generated by the components disposed within the body or casing 105 to the facility occupants. For example, the embodiment of FIG. 3A includes slits 107 that extend through the front face 101 that facilitate the travel of sound waves that are generated within the body or casing 105 to outside of the body or casing 105. The embodiment of FIG. 3A includes multiple slits, however embodiments are intended to include or otherwise cover any number of slits (including only a single slit). The slits do not need to be defined in the front face 101, and instead can be defined in any of the other surfaces of the body or casing 105, such as in the sides thereof, which may be beneficial in certain circumstances, such as where the annunciator 5 is mounted on the wall of a hallway or other elongated space, which may facilitate the travel of the sound waves along the hallway or elongated space. Other embodiments do not include elongated slits, and instead include non-elongated holes defined in any of the walls of the body or casing 105, such as circular shaped holes.

The body or casing 105 can be configured for mounting to any relevant surface, such as a static surface. In some of these embodiments, the body or casing 105 is configured for mounting to a wall of the facility. In many such embodiments, it may be preferable to mount the annunciator 5 sufficiently high on the wall to reduce the likelihood of the annunciator being subjected to intentional tampering or accidental contacts. In other embodiments, the body or casing 5 is configured for mounting to a ceiling of the facility, which may be beneficial for various reasons, such as reducing the likelihood of the annunciator being subjected to intentional tampering or accidental contacts, enhancing the travel of sound waves, ease of wiring at installation, etc.

Figure 3B:
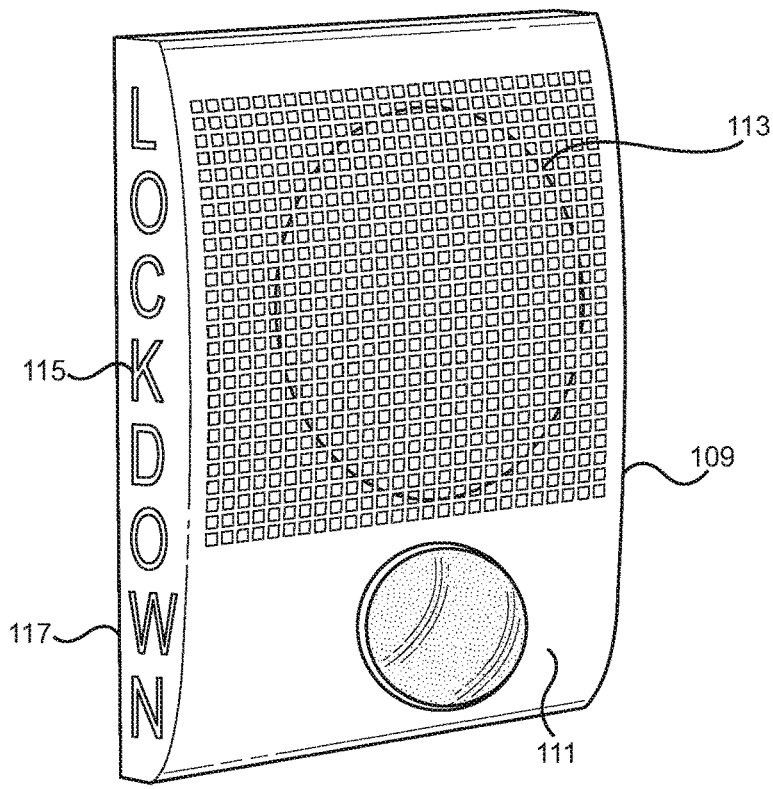
FIG. 3B is a schematic of an annunciator in accordance with an alternative exemplary embodiment.

FIG. 3B is a schematic of an annunciator in accordance with an alternative exemplary embodiment. The alternative annunciator 109 of FIG. 3B includes a rectangular casing 111, and circular holes 113 extending through the exterior face of the casing 111. In this embodiment, the holes 113 are arranged in a circular configuration which may be beneficial for reasons disclosed above with regard to the circular casing 101 of FIG. 3A. Specifically, sharing the same circular shape as the actuator 3 may enhance the facility occupants' ability to more easily recognize that the source of the audible annunciation, i.e., the annunciator 109, communicates initiation of lockdown procedures, as opposed to other procedures, such as a fire alarm.

The annunciator 109 of FIG. 3B can include any of the other structures and/or operations disclosed above with regard to the annunciator 5 of FIG. 3A. For example, the annunciator 109 can include indicia, such as the word "LOCKDOWN" 115, for reasons of identification disclosed above with regard to the embodiment shown in FIG. 3A. In the embodiment shown in FIG. 3B, this indicia is provided on each side 117 of the rectangular casing 111.

The annunciator 109 can include still other structures and operations not disclosed above. In the embodiment shown in FIG. 3B, an indicator 114 is included to provide additional indication or confirmation to the facility occupants of initiation of lockdown procedures, which may be beneficial for a variety of reasons. For example, this additional indication may supplement the content of the annunciation (such as "LOCKDOWN, LOCKDOWN, LOCKDOWN") to further facilitate facility occupants to distinguish the lockdown alarm from another system, such as a fire alarm. In other words, actuation of the indicator 114 enables facility occupants to better understand that the audible annunciation communicated by the annunciator 109 relates to lockdown procedures, especially based on the indicia "LOCKDOWN" 115 provided on the sides 117 of the rectangular casing 111.

Embodiments are intended to include or otherwise cover any indicator 114 that is configured to generate or otherwise provide any type or form of additional indication that supplements or is in some way different from the audible annunciation. In some of these embodiments, the additional indication is in the form of light, such as light generated by any of the disclosed visual indicators disclosed herein. In some other embodiments, the additional indication constitutes a form or type of indication other than light, including but not limited to indications that help to draw the attention of facility occupants to the annunciator 109 and to more clearly understand or recognize the message provided thereby.

In operation, it may be beneficial for the audible annunciation that is generated by any of the embodiments to easily and quickly obtain the attention of facility occupants, while also being distinguishable from other communications, such as a fire alarm, other announcements made over an intercom system, etc. Embodiments are intended to include or otherwise cover any audible annunciations that satisfy the above characteristics.

In some embodiments, the audible annunciation initiates with a loud and distinctive sound, such as an electronically generated siren, monotone, bell, chime, whoop, or other noise that obtains the attention of facility occupants. In some of these embodiments, this initial noise is brief and continuous, such as for a duration of approximately one to five seconds, and is followed by the word "lockdown," which communicates to the facility occupants that the alarm signifies the initiation of lockdown procedures. In many of these embodiments, the word "lockdown" is repeated any number of times to enhance the facility occupants' recognition of the initiation of lockdown procedures. In some of these embodiments, the word "lockdown" is communicated three times in rapid succession. In addition, in many embodiments, the word "lockdown" is communicated in a tone to express urgency. These embodiments are especially beneficial because they quickly communicate the initiation of lockdown procedures to facility occupants, because the initial noise obtains the facility occupants' attention, and once the attention is obtained, the word(s) lockdown communicates to the facility occupants that they need to follow lockdown procedures. In some embodiments, the initial noise is generated again following communication of the word(s) "lockdown."

The initial noise followed by the word(s) lockdown, and then in some embodiments a repetition of the initial noise, constitutes a single alarm cycle. In some embodiments, the alarm cycle is repeated any number of times, such as three or four times, to enhance the facility occupants' recognition of the initiation of lockdown procedures. It may be especially beneficial for total duration of the alarm, including all repeated cycles, to be tailored to be sufficiently long to provide enhanced recognition by the facility occupants of initiation of lockdown procedures, but to not be unduly long and thereby reduce negative impacts, i.e., creating additional chaos and/or confusion, negatively impacting positive communications, such as communications between emergency responders, facility officials, etc. Thus, the total duration of the alarm, including all repeated cycles, of many embodiments is less than approximately 90 seconds, and in some of these embodiments is between approximately 60 seconds to approximately 90 seconds. Embodiments that reset the alarm after a limited number of cycles are also beneficial because they obviate the responding authorities resetting or turning off the alarm, enabling the responding authorities to focus on the circumstances warranting the lockdown.

C. Visual Indicator

The at least one visual indicator 7 can include any structure or configuration to perform the operation of communicating initiation of lockdown procedures to individuals at or in proximity to the facility upon receipt of the activation signal. It may be especially beneficial for the visual indication of lockdown procedures to be distinguishable from the visual indication of other conditions, such as the lights of a fire alarm strobe, for reasons disclosed above. It may also be beneficial for the visual indicator itself to be structurally distinguishable from other visual indicators, such as fire alarm visual indicators (strobes), to enhance the facility occupants' ability to distinguish the lockdown visual indication from other visual indications, such as the fire alarm strobe.

Figure 4A:
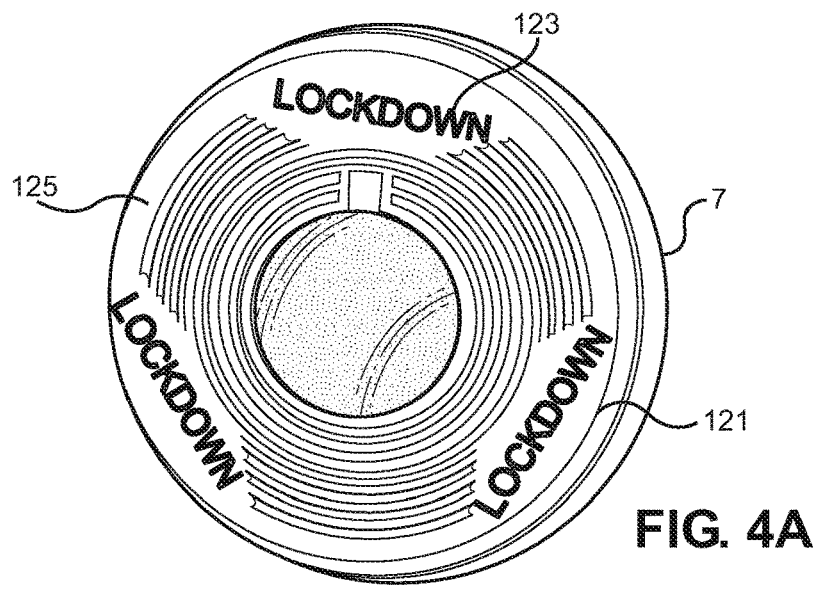
FIG. 4A is a schematic of a visual indicator in accordance with one exemplary embodiment.

FIG. 4A is a schematic of a visual indicator in accordance with one exemplary embodiment. The exemplary visual indicator 7 of FIG. 4A includes a casing 121 defines a circular front exterior face, which may be beneficial based on its similarity in shape to the exemplary actuator 3 shown in FIG. 2A and annunciator shown in FIG. 3A. For example, sharing the same circular shape may enhance the facility occupants' ability to more easily recognize that the source of the visual indication, i.e., the visual indicator 7, communicates initiation of lockdown procedures, as opposed to other procedures, such as a fire alarm. The visual indicator 7 may also share the same or similar color (such as blue) as the actuator 3, annunciator 5, or other components of the lockdown system for the same reason, i.e., to facilitate the facility occupants' recognition of the visual indication of the lockdown procedures as opposed to other procedures, such as a fire alarm. In fact, providing any or all of the components of the lockdown systems disclosed herein with the same or similar shapes, colors, etc., may also provide these benefits.

In addition or as an alternative to the above physical characteristics of the visual indicator 7 that make it more easily distinguishable for other facility systems, such as a fire alarm, the visual indicator 7 can include indicia identifying it as part of the lockdown system. For example, in the embodiment of FIG. 4A, the visual indicator 7 includes the indicia "LOCKDOWN" 123 at the top of its front exterior face to enhance the ability of facility occupants to recognize that the source of the visual indication is the visual indicator 7.

Embodiments are intended to include or otherwise cover any known, related art, or later developed technologies for enabling, facilitating, and/or causing the generation and communication of the visual indication of lockdown upon receipt of the activation signal. In many embodiments, the visual indicator 7 includes a light generating device 125 provided under a transparent or semi-transparent cover that enables light generated within the visual indicator to be transmitted through the cover for viewing by facility occupants. The transparent or semi-transparent cover may be beneficial by protecting or shielding the light generating device 125 from damage, dirt, debris, etc.

It may be especially beneficial for the light that is generated and communicated by the light generating device 125 to be distinguishable from light generated by other systems, such as fire alarm systems for reasons discussed above. For example, light generated by fire alarms is typically clear or not colored, and thus it may be beneficial for the light generated and communicated by the light generating device 125 to be colored. It may be especially beneficial if this colored light is consistent with color(s) used with other components of the lockdown system to facilitate the facility occupants' recognition of the visual indication of the lockdown procedures as opposed to other procedures, such as a fire alarm. For example, the light that is generated and communicated through the cover can be the same or a similar color (such as blue) as the actuator 3, annunciator 5, exterior of the visual indicator 7, or other components of the lockdown system for the same reason, i.e., to facilitate the facility occupants' recognition of the visual indication of the lockdown procedures as opposed to other procedures, such as a fire alarm. Other exemplary colors for the light and components of the lockdown system include yellow, bright green, etc.

As an alternative to generating light of different colors, the light that is generated by the light generation device 125 can be clear and the transparent or semi-transparent cover can be colored so that the light transmitted therethrough adopts the color of the cover. This feature may be especially beneficial for product manufacturing and/or distributing purposes. For example, the same light generating device for different systems, i.e., lockdown system, fire system, etc., can be used, and ultimately installed under different covers. For example, the light generating device can be installed with a colored cover for a lockdown system, and a clear cover for a fire alarm.

It may be beneficial for the light generated and communicated by the light generation device 125 to be relatively bright to enhance recognition by facility occupants of initiation of lockdown procedures. For example, the light generation device 125 can be a strobe that utilizes Xenon with a minimum of approximately 75 candelas and a maximum of approximately 200 candelas. In addition, it may be beneficial for the light generating device to generate and communicate flashing light to enhance the facility occupants' recognition of initiation of lockdown procedures. The flash pattern of some embodiments is especially designed to obtain the attention of facility occupants. Some of these embodiments provide a flash pattern of approximately 60 flashes per minute.

As indicated above, the annunciator of some embodiments is reset and thus ceases providing an audible annunciation after a certain period to reduce chaos, reduce interruption of communications between emergency responders, etc. However, generation of light by the light generation device 125 does not cause the same level of disruption and/or chaos as the audible annunciation. Thus, the light generation device 125 of many embodiments continues to generate and communicate light, even after the audible annunciation resets, to continue communicating that lockdown procedures are in effect. Facility occupants are thereby notified of the continuation of lockdown procedures until the lockdown is officially ended, and the visual indication manually reset or turned off.

Figure 4B:
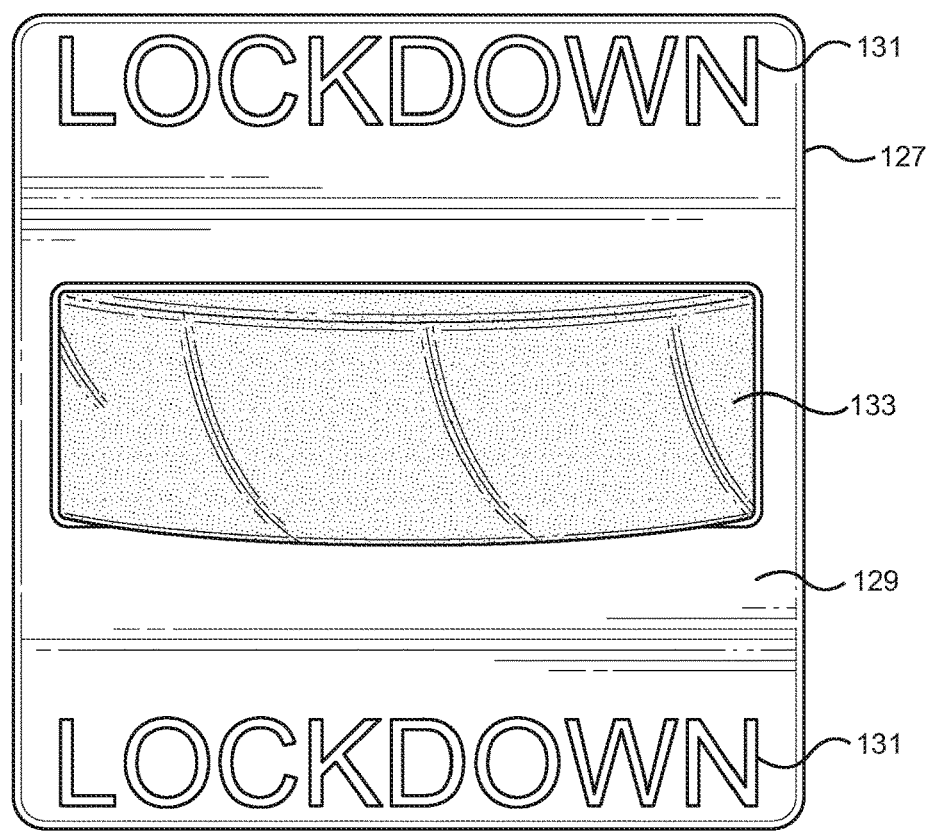
FIG. 4B is a schematic of a visual indicator in accordance with an alternative exemplary embodiment.

FIG. 4B is a schematic of a visual indicator in accordance with an alternative exemplary embodiment. The visual indicator 127 of FIG. 4B includes a square housing 129 that is mountable to a static surface, such as a wall or ceiling of the facility. In this embodiment, the top and bottom of the front exterior surface of the housing 129 include the indicia "LOCKDOWN" to facilitate the facility occupants' recognition of the visual indicator 127 being a component of the lockdown system, as opposed to a different system, such as a fire alarm. The visual indicator 127 also includes a light generation device 133 provided under a cover to generate and communicate light upon initiation of lockdown procedures. Any or all of the aspects and features discussed above with regard to the visual indicator 7 of FIG. 4A are also application to the visual indicator of FIG. 4B.

Figure 4C:
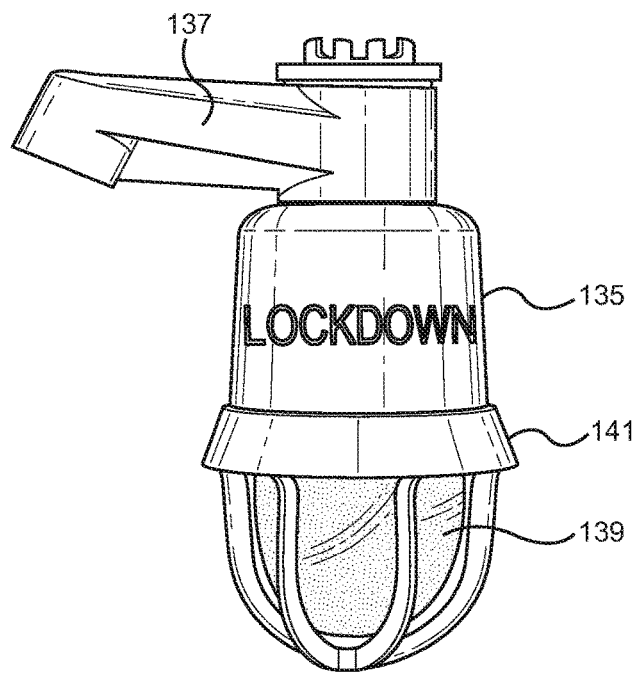
FIG. 4C is a schematic of a visual indicator in accordance with another alternative exemplary embodiment.

FIG. 4C is a schematic of a visual indicator in accordance with another alternative exemplary embodiment. The visual indicator 135 of FIG. 4C includes an attachment bracket 137 that facilitates attachment of the visual indicator 135 to a static surface, such as a wall, beam, etc. The visual indicator 135 also includes a light generation device 139 provided within a casing 141 that protects or shields the light generation device 139 from damage, debris, dirt, etc. In fact, the casing 141 can be sufficiently resilient or robust to enable the visual indicator 135 to be mounted in challenging locations, such as outdoors, in factories, industrial facilities, prisons, etc. Any or all of the aspects and features discussed above with regard to the visual indicator 7 of FIG. 4A and the visual indicator 127 of FIG. 4B are also applicable to the visual indicator 135 of FIG. 4C.

D. Combination of System Components

The embodiments are disclosed above in the context of the actuator, annunciator, and visual indicator constituting separate and discrete components. However, any or all of these components can be combined. For example, all three of these components can be combined into a single integrated apparatus, or any two of these components can be combined. Combining some or all of these components can be beneficial for various reasons, including but not limited to ease in manufacturing, distribution, and/or installation.

Figure 5A:
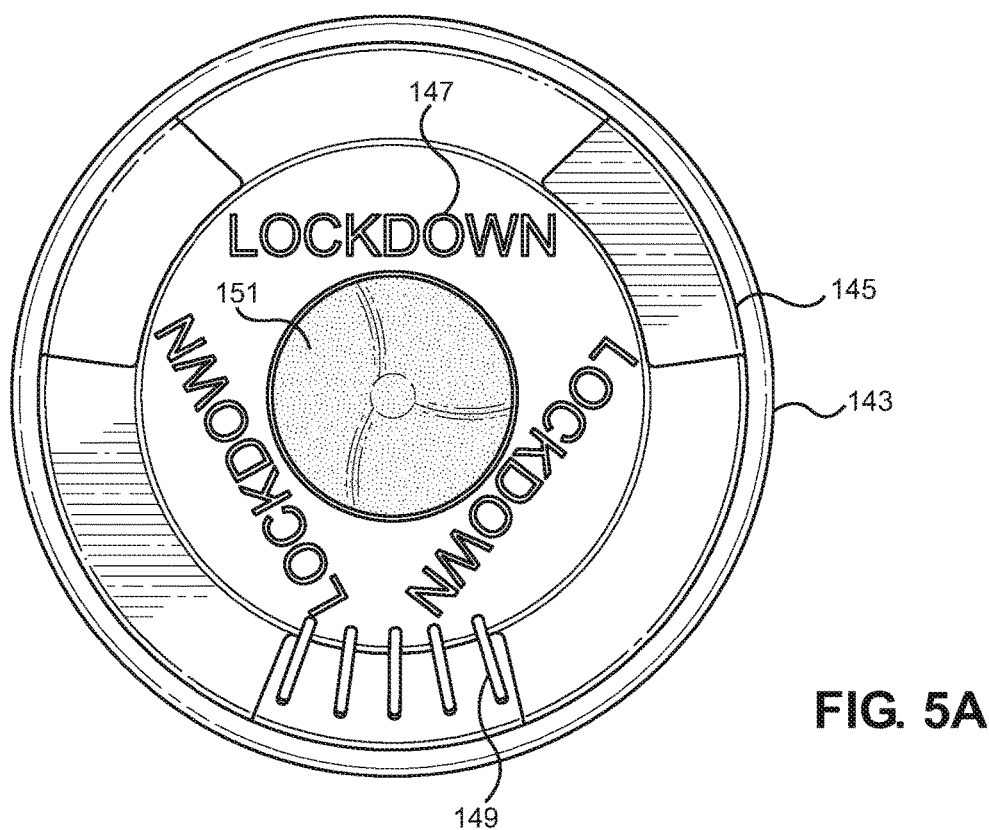
FIG. 5A is a schematic of a combined annunciator and visual indicator in accordance with one exemplary embodiment.

FIG. 5A is a schematic of a combined annunciator and visual indicator in accordance with one exemplary embodiment. The combined annunciator and visual indicator is intended to include any and all of the features of those devices disclosed above.

The combined device 143 of FIG. 5A includes a circular common casing 145, which includes the indicia "LOCKDOWN" 147. The circular shape of the casing 145 and "LOCKDOWN" indicia may be beneficial for reasons identified above. The casing 145 can be configured for mounting on a static surface of the facility, such as on a wall or ceiling.

As disclosed with some of the above embodiments, components for generating an audible annunciation (such as speakers, electronics, etc.) are disposed within the casing 145. The casing 145 can include structure(s) to facilitate communication of the audible annunciation that are generated by the components disposed within the body or casing 145 to the facility occupants. For example, the embodiment of FIG. 5A includes slits 149 that extend through the front face that facilitate the travel of sound waves that are generated within the body or casing 145 to outside of the body or casing 145. The embodiment of FIG. 5A includes multiple slits, however embodiments are intended to include or otherwise cover any number of slits (including only a single slit).

In the embodiment of FIG. 5A, a light generating device 151 is provided at the front exterior face of the casing 145 under a transparent or semi-transparent cover that enables light generated to be transmitted through the cover for viewing by facility occupants. The transparent or semi-transparent cover may be beneficial by protecting or shielding the light generating device 151 from damage, dirt, debris, etc.

Figure 5B:
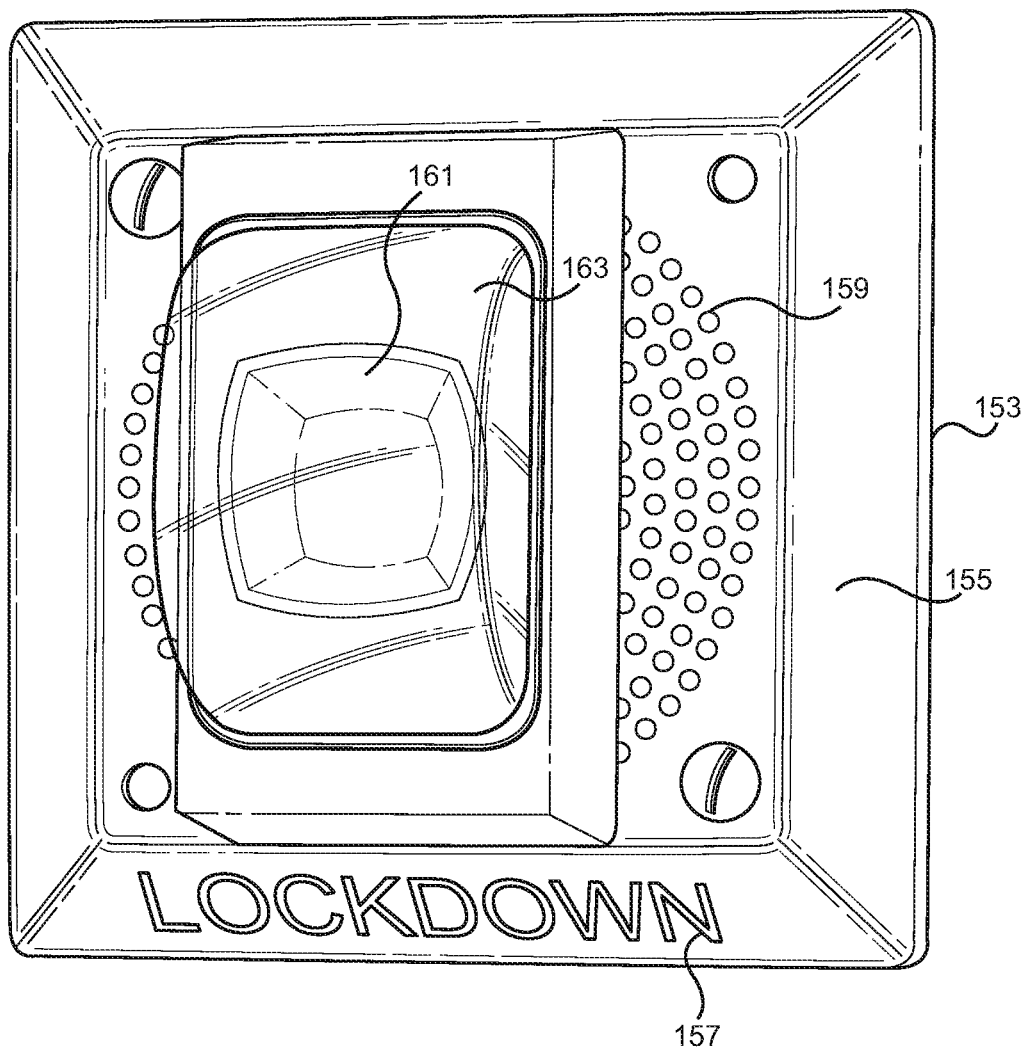
FIG. 5B is a schematic of a combined annunciator and visual indicator in accordance with another exemplary embodiment.

FIG. 5B is a schematic of a combined annunciator and visual indicator in accordance with another exemplary embodiment. The combined annunciator and visual indicator is intended to include any and all of the features of those devices disclosed above.

The combined device 153 of FIG. 5B includes a square common casing 155, which includes the indicia "LOCKDOWN" 157. The "LOCKDOWN" indicia may be beneficial for reasons identified above. The casing 155 can be configured for mounting on a static surface of the facility, such as on a wall or ceiling.

As disclosed with some of the above embodiments, components for generating an audible annunciation (such as speakers, electronics, etc.) are disposed within the casing 155. The casing 155 can include structure(s) to facilitate communication of the audible annunciation that are generated by the components disposed within the body or casing 155 to the facility occupants. For example, the embodiment of FIG. 5B includes slits 159 that extend through the front face that facilitate the travel of sound waves that are generated within the body or casing 145 to outside of the body or casing 145. In the embodiment of FIG. 5B, the slits are formed in a circular pattern, which may be beneficial for reasons identified above. The embodiment of FIG. 5B includes multiple circular slits, however embodiments are intended to include or otherwise cover any number of slits (including only a single slit).

In the embodiment of FIG. 5B, a light generating device 161 is provided at the front exterior face of the casing 155 under a transparent or semi-transparent cover 163 that enables light generated to be transmitted through the cover 163 for viewing by facility occupants. The transparent or semi-transparent cover 163 may be beneficial by protecting or shielding the light generating device 161 from damage, dirt, debris, etc. The light generating device 161 and cover 163 are disposed on the slits 159 defined in the front exterior face of the casing 155, which may be beneficial for various reasons, such as to address space constraints.

E. Controller

The controller 9 can include any structure or configuration to perform the operation(s) of: 1) transmitting the activation signal to the at least one annunciator 5 and/or visual indicator 7 upon receipt of the lockdown initiation signal from the actuator 3; and/or 2) transmitting the communication signal to the at least one authorized recipient 11 upon receipt of the lockdown initiation signal from the actuator 3. The controller 9 can include any structure or configuration to perform any of the operations, determinations, decisions, communications, etc., disclosed above in the context of any of the system components, including but not limited to the actuator, annunciator, and visual indicator. Embodiments are intended to include or otherwise cover any and all known, related art, and/or later developed technologies for performing these operations.

The controller 9 can be disposed at any location. For example, the controller 9 can be disposed at the facility, proximate the facility, or at a location that is not proximate the facility. In embodiments where the controller 9 is disposed at the facility, it may be beneficial for the controller 9 to be disposed at a secured location to reduce the likelihood of intentional tampering as well as unintentional damage, such as in an electrical closet, a facility official's office, etc. In many of these embodiments, the controller 9 may be disposed proximate other similar apparatus, such as fire alarm control panels, security system panels, HVAC controllers, electrical panels, etc. In addition, the controller 9 may be disposed within a protective cabinet, such as a locked or otherwise sealed container, to reduce the likelihood of tampering, damage, etc.

Contrarily, the control panel can be disposed at any location not proximate the facility, such as at a central monitoring station, police station, etc. In fact, the control panel can be cloud based, and/or processing can be performed by a remotely disposed server.

Embodiments are intended to include or otherwise cover any known, related art, or later developed technologies for signal transmission to and/or from the controller 9, regardless of the location of the controller 9 For example, the signals to and/or from the controller 9 can be transmitted via wires, wirelessly, via a network, via the Internet, etc.

F. Overall System

As disclosed above with regard to FIG. 1, upon receipt of the lockdown initiation signal from the actuator 3, the controller 9 transmits an activation signal to the at least one annunciator 5 and an activation signal to the visual indicator 7. The at least one annunciator 5 and visual indicator 7 constitute separate and discrete components that separately communicate initiation of lockdown procedures to individuals at or in proximity to the facility upon receipt of the activation signal.

1. Combined Annunciator and Visual Indicator—FIG. 6

Figure 6:
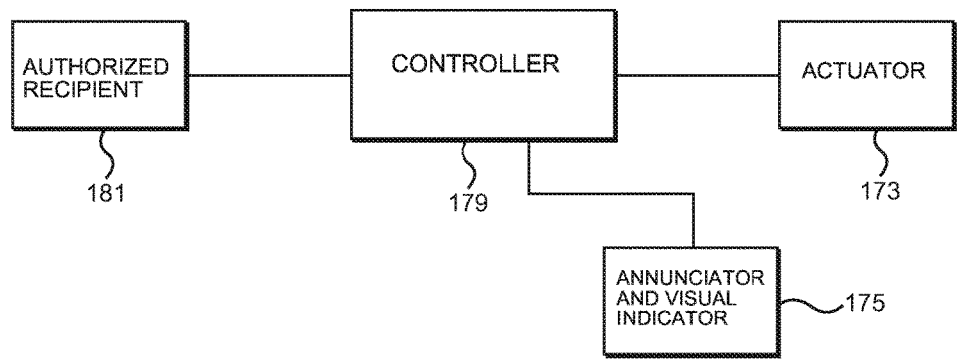
FIG. 6 is a schematic of a lockdown system in accordance with an alternative exemplary embodiment that includes a combined annunciator and visual indicator.

However, the annunciator and visual indicator can be combined, as disclosed in the context of FIGS. 5A and 5B. In that case, the controller only needs to send a single activation signal to the combined annunciator and visual indicator. FIG. 6 is a schematic of a lockdown system in accordance with an alternative exemplary embodiment that includes a combined annunciator and visual indicator.

As shown in FIG. 6, manual actuation of an actuator 173 results in transmission of a lockdown initiation signal to a controller 179. Upon receipt of the lockdown initiation signal, the controller 179 transmits an activation signal to the combined annunciator and visual indicator 175. The combined annunciator and visual indicator 175 communicate initiation of lockdown procedures to individuals at or in proximity to the facility upon receipt of the activation signal. Upon receipt of the lockdown initiation signal, the controller 179 also transmits a communication signal to at least one authorized recipient 181. It is intended that the modified system of FIG. 6 include any and all of the alternative and additional features and operations that are disclosed with regard to the system shown in FIG. 1, as well as the components separately shown in the other figures.

2. Alternative Controller—FIG. 7

Figure 7:
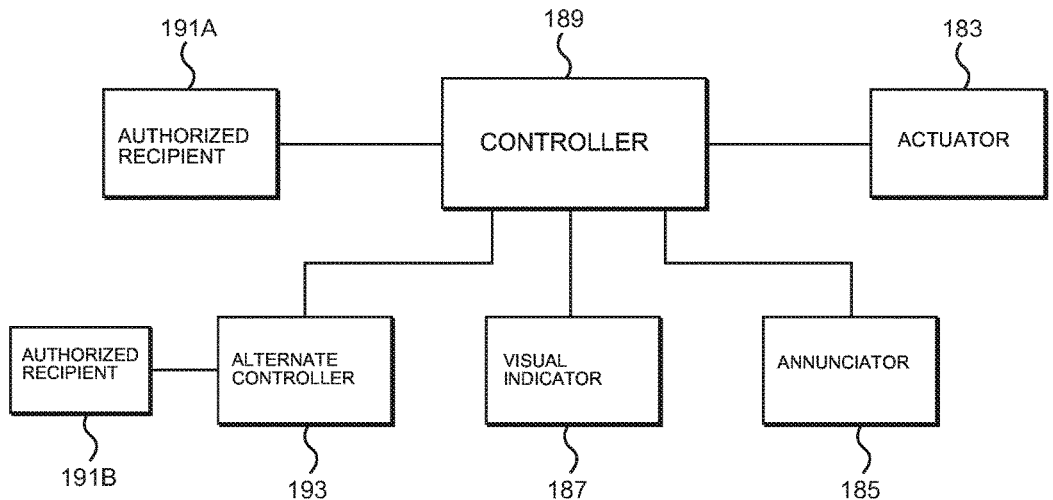
FIG. 7 is a schematic of a lockdown system in accordance with an alternative exemplary embodiment that is integrated, or otherwise communicates, with another system.

As an alternative, or in addition to any of the above features, the controller of some embodiments can be integrated with, or otherwise be in communication with, other systems, controllers, and/or processors. FIG. 7 is a schematic of a lockdown system in accordance with an alternative exemplary embodiment that is integrated with, or is otherwise in communication with, another system. Embodiments are intended to include or otherwise cover any type of system, controller, or processor, including but not limited to a fire alarm system, security system, telephone system, etc.

The lockdown system of FIG. 7 includes at least one actuator 183, at least one annunciator 185, at least one visual indicator 187, and a controller 189. The at least one actuator 183, annunciator 185, and visual indicator 187 are located at or proximate to the facility. The controller 189 can be located at or proximate to the facility, or alternatively disposed away from the facility.

In accordance with this embodiment, and similarly with the embodiment of FIG. 1, manual actuation of the actuator 183 results in transmission of a lockdown initiation signal to the controller 189. Upon receipt of the lockdown initiation signal, the controller 189 transmits an activation signal to the at least one annunciator 185 and visual indicator 187. The at least one annunciator 185 and visual indicator 187 communicate initiation of lockdown procedures to individuals at or in proximity to the facility upon receipt of the activation signal.

Some of these embodiments are similar to the FIG. 1 embodiment, in that, upon receipt of the lockdown initiation signal, the controller 189 transmits a communication signal to at least one authorized recipient 191A. In many embodiments, the at least one authorized recipient 191A includes a centralized facility of authorized personnel for responding to emergencies, including but not limited to a police station, fire station, medical dispatch unit, etc.

However, contrary to the FIG. 1 embodiment, the controller 189 of the FIG. 7 embodiment can transmit/receive a signal, or otherwise be in communication with, another system, such as alternative controller 193. As indicated above, this alternative controller 193 can be a component of a fire alarm system, security system, telephone system, access control system, etc. Embodiments are intended to include or otherwise cover any type of signals or communications transmitted between the controller 189 and alternative controller 193, such as data that may be relevant to either or both systems. In fact, the signals transmitted can include things other than data, such as the transmission of electrical power, including but not limited to a back-up power supply.

In some of these embodiments, the controller 189, upon receipt of the lockdown initiation signal, transmits a communication signal indicating initiation of lockdown procedures to the alternative controller 193, which then transmits the appropriate signal to the at least one authorized recipient 191B. In many of these embodiments, the controller 189, contrary to the FIG. 1 embodiment, would therefore not directly transmit the communication signal to the at least one authorized recipient because this signal would be duplicative of the communication signal transmitted by the alternative controller 193. However, in some embodiments, both the controller 189 and the alternative controller 193 transmit communication signals indicating initiation of lockdown procedures. In some of these embodiments, the communication signals that are transmitted are different, i.e., include different data or different messaging, and/or are transmitted to different authorized recipients. However, in other embodiments, both the controller 189 and the alternative controller 193 transmit the same communication signal to the same authorized recipient, such as to ensure or otherwise enhance the chances of receipt thereof.

3. Actuator Transmits Activation Signal—FIG. 8

As disclosed above with regard to FIG. 1, upon receipt of the lockdown initiation signal from the actuator 3, the controller 9 transmits an activation signal to the at least one annunciator 5 and an activation signal to the visual indicator 7. In some embodiments, the at least one annunciator 5 and visual indicator 7 constitute separate and discrete components that separately communicate initiation of lockdown procedures to individuals at or in proximity to the facility upon receipt of the activation signal. However, as with the embodiment of FIG. 6, these components can be combined to form a single combined annunciator and visual indicator 175, and thus the controller 179 only transmits a single activation signal to the combined annunciator and visual indicator 175.

Figure 8:
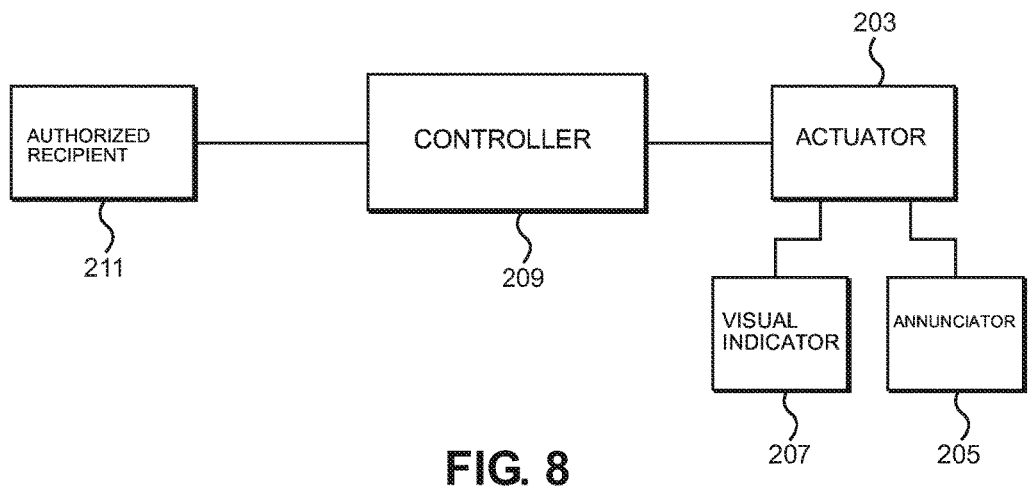
FIG. 8 is a schematic of a lockdown system in accordance with an alternative exemplary embodiment, wherein the actuator directly transmits the activation signal to the annunciator and visual indicator.

However, the controller of some embodiments does not transmit the activation signal to the annunciator and the visual indicator, and instead these activation signal(s) can be transmitted directly from the actuator. FIG. 8 is a schematic of a lockdown system in accordance with an alternative exemplary embodiment, wherein the actuator directly transmits the activation signal to the annunciator and visual indicator.

The lockdown system of FIG. 8 includes at least one actuator 203, at least one annunciator 205, at least one visual indicator 207, and a controller 209. The at least one actuator 203, annunciator 205, and visual indicator 207 are located at or proximate to the facility. The controller 209 can be located at or proximate to the facility, or alternatively disposed away from the facility.

In accordance with this embodiment, manual actuation of the actuator 203 results in transmission of a lockdown initiation signal to the at least one annunciator 205 and visual indicator 207. The at least one annunciator 205 and visual indicator 207 communicate initiation of lockdown procedures to individuals at or in proximity to the facility upon receipt of the activation signal. It is intended that the actuator 203, annunciator 205, and visual indicator 207 of these embodiments include any and all components, such as electronics, processors, etc., to perform these operations, including certain components of the controller 9 of the FIG. 1 embodiment.

Manual actuation of the actuator 203 also results in transmission of a lockdown initiation signal to the controller 209. Upon receipt of the lockdown initiation signal, the controller 209 transmits a communication signal to at least one authorized recipient 211. In many embodiments, the at least one authorized recipient 211 includes a centralized facility of authorized personnel for responding to emergencies, including but not limited to a police station, fire station, medical dispatch unit, etc.

The embodiment of FIG. 8 may be especially beneficial for various reasons. For example, directly transmitting the lockdown initiation signal from the actuator 203 to the annunciator 205 and visual indicator 207 may enhance or otherwise simplify installation, such as in situations where the actuator 203 is located proximate or relatively near the annunciator 205 and visual indicator 207. In addition, this configuration may enhance overall simplicity of the system, as well as other related benefits, including reliability.

4. Combined Actuator and Controller—FIG. 9

Figure 9:
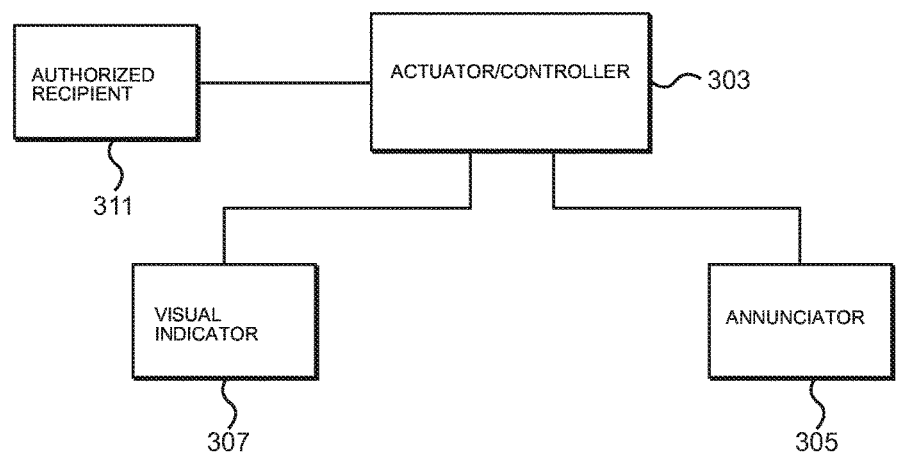
FIG. 9 is a schematic of a lockdown system in accordance with an alternative exemplary embodiment, which combines the actuator and the controller.

FIG. 9 is a schematic of a lockdown system in accordance with an alternative exemplary embodiment, which combines the actuator and the controller. The lockdown system of FIG. 9 includes at least one combined actuator/controller 303, at least one annunciator 305, and at least one visual indicator 307. The combined actuator/controller 303, annunciator 305, and visual indicator 307 are located at or proximate to the facility.

In accordance with this embodiment, manual actuation of the combined actuator/controller 303 results in transmission of a lockdown initiation signal to the at least one annunciator 305 and visual indicator 307. The at least one annunciator 305 and visual indicator 307 communicate initiation of lockdown procedures to individuals at or in proximity to the facility upon receipt of the activation signal. Manual actuation of the combined actuator/controller 303 also results in transmission of a communication signal to at least one authorized recipient 311. In many embodiments, the at least one authorized recipient 311 includes a centralized facility of authorized personnel for responding to emergencies, including but not limited to a police station, fire station, medical dispatch unit, etc. It is intended that the actuator 303, annunciator 305, and visual indicator 307 of these embodiments include any and all components, such as electronics, processors, etc., to perform these operations, including components of the controller 9 of the FIG. 1 embodiment.

The embodiment of FIG. 9 may be especially beneficial for various reasons. For example, combining the actuator and controller may enhance or otherwise simplify installation, such as in situations where only a single actuator is needed. In addition, this configuration may enhance overall simplicity of the system, as well as other related benefits, including reliability.

G. Additional/Other Features

Embodiments are intended to include or otherwise cover numerous other features, as alternatives or in addition to, those features disclosed above. A few such features are provided below for exemplary purposes, and are not intended to constitute a complete listing of other alternative or additional features provided by certain embodiments.

1. Drill Mode

Some embodiments include a drill mode, which simulates in certain respects an actual lockdown situation, but is in fact provided for reasons other than conducting an actual lockdown, such as for training or other purposes. Embodiments are intended to include or otherwise cover any and all methods and apparatus for initiating and performing a lockdown drill.

Embodiments are intended to include any methods and apparatus for initiating the drill mode. For example, in some embodiments, instructions can be entered into the controller, such as via a user interface, to initiate the drill mode. The user interface can be in any form, such as a keypad proximate the controller, a wireless device, etc. The drill mode can be initiated via the user interface in any manner, such as by entry of a certain code.

Alternatively, one or more selected actuators can include an input device, such as a separate button or switch, that enables manual actuation of the drill mode. It may be preferable that only certain actuators include this feature to reduce the likelihood of a facility occupant unintentionally initiating the drill mode in situations where an actual lockdown is desired. For example, it may be preferable that the actuators having the drill initiation feature only be disposed proximate a specially trained facility occupant, i.e., specifically trained in drill procedures, such as a school principal. In other words, it may be preferable to dispose these special actuators in areas that are only accessible by, or otherwise under the control of, facility occupants with authorization to initiate lockdown drills.

In some embodiments, the annunciation and visual indication performed in the drill mode is identical to that performed in an actual lockdown. This feature may be beneficial by providing the facility occupants with a very realistic lockdown drill, which may enhance training procedures. In other embodiments, the annunciation and/or visual indication performed in the drill mode is different, such as slightly different than, that performed in an actual lockdown drill. For example, the audible annunciation of the drill mode may include a voice communicating the words "LOCKDOWN DRILL," instead of the word "LOCKDOWN" that is annunciated during an actual lockdown situation. This difference may be beneficial by communicating to the facility occupants that the instructed lockdown procedures are merely instructed as part of a drill, which may be helpful for various reasons, such as to reduce panic, alarm, etc., experienced by the facility occupants, to enhance training procedures, etc.

In addition, many of these embodiments include a feature to cease the lockdown drill, and communicate to the facility occupants that no actual lockdown is in effect and that the procedures were merely initiated for training or other purposes. This feature can be executed via any methods and apparatus, including the same apparatus used for initiating the lockdown drill.

In fact, some embodiments are configured to provide a "drill verbal alert" that will communicate that the event is only a drill. This "drill verbal alert" communication can be provided prior to annunciation of the lockdown tone/communication. Some embodiments are configured to also provide an "all clear verbal message" for activation in "drill mode" to communicate that the drill is over, which may be beneficial for efficiently and effectively ending the lockdown drills. In many embodiments, the all clear communication can only be provided while the alarm is in drill mode to prevent its erroneous annunciation in actual lockdowns.

In many of these embodiments, the controller does not communicate initiation of a lockdown situation to the authorities upon initiation of the lockdown drill. This procedure is beneficial by avoiding negative effects of responding authorities responding to a facility that is not actually subject to circumstances warranting an actual lockdown.

2. Override Mode

Some embodiments include an override mode that overrides communication of lockdown procedures subsequent to actual initiation. This feature may be beneficial in situations where lockdown procedures were initiated in error, such as via the accidental actuation of an actuator, to reduce disruption caused thereby.

Embodiments are intended to include or otherwise cover any methods and apparatus for performing this override. For example, in some embodiments, instructions can be entered into the controller, such as via a user interface, to override the lockdown. The user interface can be in any form, such as a keypad proximate the controller, a wireless device, etc. The override can be initiated via the user interface in any manner, such as by entry of a certain code. Alternatively, one or more selected actuators can include an input device, such as a separate button or switch, that enables actuation of the override.

It may be especially beneficial for the override to be initiated or otherwise performed in a manner to impede or prevent the unauthorized override of the lockdown, such as by an individual whose actions warranted the lockdown. For example, it may be preferable that only certain actuators include this override feature to reduce the likelihood of the override being performed under improper circumstances. For example, it may be preferable that the actuators having the override feature only be disposed proximate a specially trained facility occupant, i.e., specifically trained in override procedures, such as a school principal. In other words, it may be preferable to dispose these special actuators in areas that are only accessible by, or otherwise under the control of, facility occupants with authorization to override lockdowns.

3. Automatic Actuators

Some embodiments include actuators other than the manually operated actuators disclosed above, in addition to, or as an alternative to, the manual actuators. Embodiments are intended to include or otherwise involve any type of other actuator that may be beneficial.

For example, some of these other actuators include actuators that automatically transmit a lockdown initiation signal, such as to any of the controllers disclosed above for the purpose of initiating a lockdown, upon sensing a certain event or condition. Some of these embodiments include actuators that transmit the lockdown initiation signal upon sensing a firearms discharge, such as a gunshot. For example, some of these actuators include acoustic sensors that sense acoustic aspects of such a firearms discharge. In addition or as an alternative, some actuators sense smoke or other gases resulting from a firearms discharge.

However, other such actuators transmit the lockdown initiation signal upon sending or receiving information relating to conditions or events other than a firearms discharge. For example, some actuators transmit the lockdown initiation signal upon receipt of data relating to immediate threats, such as dangerous weather conditions (e.g., tornado, flash floods, etc.), explosions, hazardous materials conditions (HAZMAT), etc.

III. Methods and Apparatus for Implementing Lockdown Procedures

Embodiments are intended to include or otherwise cover various methods and apparatus for implementing lockdown procedures, or otherwise addressing the circumstances warranting initiation of the lockdown procedures subsequent to initiation. Some embodiments are described below for exemplary purposes, but these embodiments are not intended to constitute an exhaustive listing of all such methods and apparatus covered by the invention. In fact, some of the embodiments are described below in a very specific and limiting manner, however not all embodiments are intended to include these specific features and limitations.

Various aspects of each of the apparatus and procedures disclosed below provide significant inventive benefits. However, other inventive aspects arise through the interaction or combination of the apparatus with the disclosed procedures. For example, certain of the disclosed procedures are integrated with the apparatus to provide enhanced outcomes, including but not limited to training of relevant facility occupants as to usages of the apparatus. The exemplary apparatus and procedures are disclosed below.

A. Exemplary Apparatus

1. Overall System

As disclosed above in the context of initiation of lockdown procedures, some embodiments of the apparatus constitute an emergency notification alarm, and in particular a lockdown alarm. The lockdown alarm mimics in certain respects, but is operationally separate from, the facility's existing fire alarm. The alarm is intended to immediately notify individuals within the facility and surrounding area of a potential or real violent threat. The alarm can be manually activated via actuators strategically located throughout the school. The actuators transmit a signal to a controller, which then activates annunciators and strobes installed throughout the facility. The controller also sends notifications to the jurisdictional police and/or monitoring station(s).

Although the system can be customized for each facility, it may be beneficial for the apparatus to include certain basic features. It may be beneficial for stationary actuators to be disposed at reception areas, points of entry, administrative offices, common areas, security stations and hallways, similarly in many cases to locations of fire alarm pull stations.

It may be beneficial for the actuator structure to facilitate simple and swift actuation (such as by a child), but to also impede accidental actuation. Based on the above, it may be beneficial for the actuator to include a push button design that is covered with a transparent resilient cover (such as made of glass or plastic) attached to a base plate via a spring-loaded hinge to allow access to the button. It may be beneficial for the actuators to be labeled "LOCKDOWN," and shaped and colored to be easily distinguishable from fire alarm pull stations. For example, it may be beneficial for the actuator to be bright green or blue and the button circular, to distinguish over fire alarm pull stations and to enhance swift recognition and identification. It may also be beneficial for the button to be at least approximately two inches in diameter (to facilitate ease of actuation), but also require approximately five pounds of pressure for actuation (to impede accidental actuation).

It may be beneficial for each of the actuators be designated with an identifiable code that is specific to that actuator, and for the actuator to communicate that code with the lockdown initiation signal to the controller upon being actuated. The controller may then be able to determine the identity of the actuator that was actuated, and this information may be beneficial for a variety of reasons, such as those disclosed above.

The lockdown annunciators should also be distinguishable from fire annunciators. It may be beneficial for the annunciators to include speakers, which are separate from existing intercoms, and support 90 to 120 decibels to provide a distinct and abrasive sound. In accordance with some embodiments, a loud and continuous tone sounds for approximately 10 to 15 seconds, followed by a pre-recorded audio message of "lockdown, lockdown, lockdown," and then another 10 to 15 seconds of the continuous tone. In some embodiments, this cycle repeats itself three or four times, for a duration of just over 60 to 90 seconds, before resetting itself. This annunciation may enhance swift recognition of facility occupants that a lockdown situation has been initiated and may avoid confusion as to whether the facility is in lockdown. In addition, ceasing the annunciation after the above period of 60 to 90 seconds reduces the likelihood that the annunciation will interfere with communications with responding authorities.

However, the verbal message that is communicated to place the facility in lockdown can be customized for the facility or type of facility. For example, certain verbal messages may be appropriate to place certain types of facilities in lockdown, while other messages may be more effective in other types of facilities.

Annunciators can be provided outside of the facility, in areas such as playgrounds, sports fields, parking lots, etc. The outdoor annunciators may be beneficial by notifying individuals outside of the facility to immediately flee the area proximate the facility.

Occupants in a fire situation typically have time to evacuate a facility in a methodical and orderly manner. However, in a lockdown situation involving an active shooter, time is of the essence, and occupants may only have a split second to respond, increasing the necessity that the lockdown annunciator be immediately recognizable. It is also important for the lockdown alarm to reset itself to avoid interfering with internal communications between school personnel and police responders. In other words, the annunciation of many embodiments shuts down so that emergency responders can listen and communicate with other responders, such as via radio. This procedure also enables responding authorities to hear sounds that may be helpful in order to combat a potential threat, e.g., gunfire (the source of which may be difficult to determine within a facility), sounds of victims calling for help, etc.

Some embodiments include strobe lights or other visual indicators to indicate or otherwise communicate the lockdown condition to facility occupants. The strobes may provide a minimum of approximately 15 candelas with a flash pattern of approximately 60 flashes per minute, and otherwise comply with ANSI and NFPA regulations. In order to differentiate from fire alarms and be most recognizable, the strobes or other visual indicators of some embodiments emit bright green or blue light. In fact, it may be beneficial for the color of the light to match or otherwise coordinate with the color of the actuator to enhance swift recognition of the lockdown condition and to avoid confusion. The strobes may continue to flash (after the annunciators have reset following the approximately 60 to 90 second cycle) to continue indicating the lockdown condition without disrupting internal communications, such as with responding authorities. Strobes can also be disposed outside of the facility, which may be beneficial for communicating the lockdown situation to individuals approaching the facility in lockdown.

The disclosed system includes numerous flexibilities. For example, the system can be predominantly or entirely wireless, including wireless stationary actuators, which may dramatically reduce installation costs. In fact, as an alternative or in addition to stationary actuators, wireless mobile actuators can be provided to certain facility occupants. The wireless system may be a viable solution in many applications based on the enhanced reliability of current wireless technology and advances in battery technology that increase battery life. Alternatively, the stationary actuators and annunciators can be hard wired to the controller, and even be wired pursuant to fire code to enhance proper signal transmission.

Any controller can be used to support the above basic system of actuators, annunciators and strobes/visual indicators, while also notifying the police and/or monitoring station(s). In some embodiments, the lockdown controller is combined with the fire alarm controller or panel. It may be beneficial for the lockdown controller to be powered through an uninterrupted power source and connected to the telephone lines, but also be provided with battery and cellular backups.

As discussed above, some embodiments of the lockdown controller support elements and functionalities beyond the above basic system, including: i) door hardware on interior and exterior doors to automatically lock upon activation, ii) electronic blueprints to show origination of the activation, for viewing by police responders via smart phone, tablet, etc., iii) real time status indicators for each room within the facility showing doors that are closed and locked, and the status of the occupants of each room, iv) integration with surveillance cameras and access control systems to view live feeds in hallways/rooms, and to lock and unlock doors remotely so that the responding authorities can move freely and quickly throughout the facility, and v) two-way speakers in rooms from which authorities can listen in and/or communicate directly with facility occupants.

However, the above listing of other components and functionalities is merely provided for exemplary purposes, and is not intended to constitute an exhaustive listing of components and functionalities. For example, some embodiments include applications, such as implementing software and hardware, which enables facility occupants to communicate among themselves and/or with law enforcement officials including first responders. In addition, some embodiments include software and/or hardware enabling communication with individuals not located at the facility, such as enabling parents/guardians of students to be notified of a lockdown condition in their child's school, such as by text messaging, email, voice notification, and/or any other medium.

Many embodiments of the system are beneficial based on their scalability, and flexibility with regard to customization. For example, some embodiments include a very basic system covering manual actuators and audible and visual notification devices within the facility. This basic system can expanded to include numerous other apparatus and features, such as: i) door hardware on interior and exterior doors to automatically lock upon activation; ii) communication devices to notify local authorities directly upon activation; iii) processors for providing electronic blueprints to provide various types of relevant information, such as the actuator that initiated the lockdown, which in some embodiments can be viewed by the police department and responding authorities via smart phones, tablets, etc.; iv) processors for providing real time status of each room within the facility, such as doors status, i.e., closed, open, locked, unlocked, etc., and the status of the occupants of each room, i.e., injured, dead, etc.; v) electronics enabling integration with surveillance cameras, access control systems, etc., to provide live feeds in hallways, rooms, etc., and/or to lock and unlock doors remotely so that the responding authorities can move freely and quickly throughout the facility; and vi) communications equipment providing one or two way communications between facility occupants and responding authorities, which may be beneficial for a variety of reasons, such as to enable responding authorities to understand the status of certain areas of the facility, to enable responding authorities to provide instructions to facility occupants that may enhance their safety, etc.

2. Automatic Locking Mechanisms and/or Status Indicators

Some embodiments include other methods and apparatus that are not directly related to communicating initiation of lockdown procedures. In fact, embodiments are intended to include or otherwise cover a variety of apparatus that enhance outcomes upon initiation of lockdown other than merely communicating initiation of lockdown procedures to facility occupants.

For example, some embodiments include mechanisms that impede or prevent entry into or traversal through certain areas of the facility upon initiation of lockdown procedures. Some of these embodiments automatically or remotely close and/or lock certain doors upon initiation of the lockdown. Embodiments are intended to include or otherwise cover any known, related art, or later developed technologies for performing these operations. These embodiments may be beneficial for a variety of reasons, such as to contain an individual whose actions warranted the lockdown, such as an active shooter, to a discrete location to minimize further damage caused by such an individual, assist in efforts, such as by responding authorities, to apprehend such an individual, etc.

Figure 10:
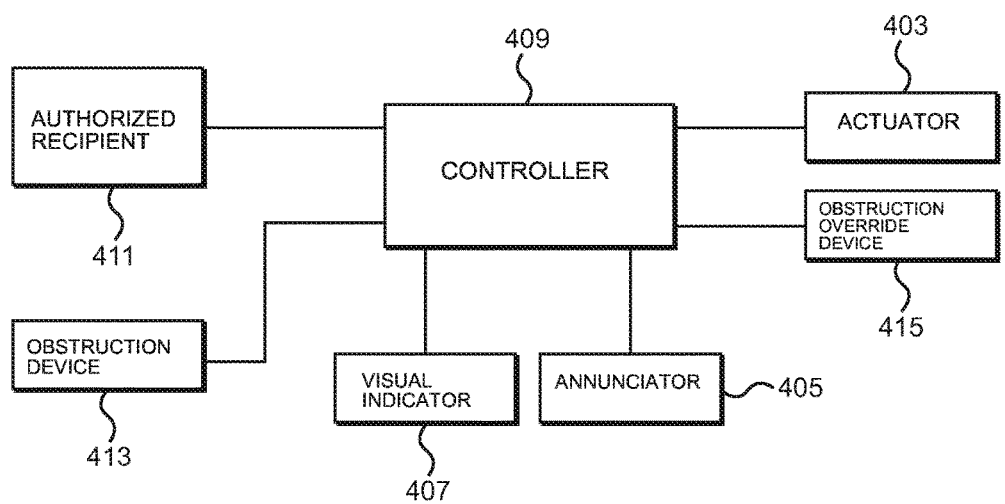
FIG. 10 is a schematic of a lockdown system in accordance with an alternative exemplary embodiment that includes mechanisms for impeding or preventing entry into or traversal through certain areas of the facility upon initiation of lockdown procedures.

FIG. 10 is a schematic of a lockdown system in accordance with an alternative exemplary embodiment that includes mechanisms for impeding or preventing entry into or traversal through certain areas of the facility upon initiation of lockdown procedures. As shown in FIG. 10, the lockdown system 401 includes at least one actuator 403, at least one annunciator 405, at least one visual indicator 407, and a controller 409. The at least one actuator 403, annunciator 405, and visual indicator 407 are located at or proximate to the facility. The controller 409 can be located at or proximate to the facility, or alternatively disposed away from the facility.

In accordance with this embodiment, manual actuation of the actuator 403 results in transmission of a lockdown initiation signal to the controller 409. Upon receipt of the lockdown initiation signal, the controller 409 transmits an activation signal to the at least one annunciator 405 and visual indicator 407. The at least one annunciator 405 and visual indicator 407 communicate initiation of lockdown procedures to individuals at or in proximity to the facility upon receipt of the activation signal. Upon receipt of the lockdown initiation signal, the controller 409 also transmits a communication signal to at least one authorized recipient 411. In many embodiments, the at least one authorized recipient 411 includes a centralized facility of authorized personnel for responding to emergencies, including but not limited to a police station, fire station, medical dispatch unit, etc.

The features of this embodiment disclosed above are similar to the corresponding features of the embodiment of FIG. 1. However, in the embodiment of FIG. 10, the controller 409, upon receipt of the lockdown initiation signal from the actuator 403, transmits a control signal to a mechanism for impeding or preventing entry into or traversal through certain areas of the facility (obstruction device) 413. The obstruction device 413 performs its obstruction operation upon receipt of the control signal from the controller 409.

In some embodiments, the obstruction device 413 includes electronic door locking mechanisms or door strikes that automatically lock certain doors of the facility to achieve the benefits disclosed above, e.g., to contain an individual whose actions warranted the lockdown, such as an active shooter, to a discrete location to minimize further damage caused by such an individual, assist in efforts, such as by responding authorities, to apprehend such an individual, etc. In other words, activation of the obstruction device 413, e.g., electronic door locking mechanisms or door strikes, automatically locks certain doors of the facility thereby providing safe havens for facility occupants.

In some of these embodiments, certain individuals, such as designated facility occupants, emergency responders, etc., can affect the operation of the obstruction device 413. For example, as shown in FIG. 10, an obstruction override device 415 can be provided to enable these individuals to override the obstruction device 413 for various reasons. For example, responding authorities can override each obstruction device 413 in order, such as sequentially, as they search a facility to address the circumstances warranting the lockdown. Alternatively, responding authorities can override all obstruction devices 413 at once in order to evacuate a facility, or to resume normal facility operations following termination of lockdown procedures. In fact, embodiments are intended to include or otherwise cover any methods and apparatus for facilitating entry of responding authorities to the facility and facilitating movement of the responding authorities within the facility.

Embodiments are intended to include or otherwise cover any method or apparatus for performing this override operation. For example in some embodiments, the obstruction override device 415 can include apparatus for entering the override instructions into the controller, such as via a user interface, to override the obstruction device 413. The user interface can be in any form, such as a keypad proximate the controller, a wireless device, etc. The override can be initiated via the user interface in any manner, such as by entry of a certain code. Alternatively, one or more selected actuators can include an input device, such as a separate button or switch, that enables actuation of the override.

It may be especially beneficial for the override to be initiated or otherwise performed in a manner to impede or prevent the unauthorized override of the obstruction device 413, such as by an individual whose actions warranted the lockdown. For example, it may be preferable that only certain actuators include this override feature to reduce the likelihood of the override being performed under improper circumstances. For example, it may be preferable that the actuators having the override feature only be disposed proximate a specially trained facility occupant, i.e., specifically trained in override procedures, such as a school principal. In other words, it may be preferable to dispose these special actuators in areas that are only accessible by, or otherwise under the control of, facility occupants with authorization to override the obstruction device 413.

Some embodiments include additional or alternative methods and apparatus that enhance outcomes upon initiation of lockdown other than merely communicating initiation of lockdown procedures to facility occupants. Some of these methods and apparatus are usable with some of the features disclosed above. For example, some embodiments provide certain status information relevant to the circumstances warranting the lockdown, or issues relevant to addressing these circumstances, to certain facility occupants, responding authorities, etc.

Some of these embodiments provide status information in the form of data indicating the status of obstructions, such as doors, including but not limited to information relating to door's condition, e.g., open, closed, locked, unlocked, etc. Embodiments are intended to include or otherwise cover any manner or form of presentation of this data to the designated facility occupants, responding authorities, etc. For example, this information can be provided in the form of an electronic rendering of the facility, such as electronic blueprints. In some of these embodiments, the electronic blueprints identify the status of each door in the facility, such as open, closed, unlocked, locked, etc.

Embodiments are intended to include or otherwise cover any methods and apparatus for communicating the electronic blueprints (which identify the status of each door in the facility, such as open, closed, unlocked, locked, etc.) to the designated facility occupants, responding authorities, etc. In some such embodiments, the system can be configured so that the recipients (e.g., responding authorities) receive the electronic blueprints on mobile wireless devices, such as smart phones, iPods, iPads, computers in police cars, etc., which may be especially beneficial because it provides the responding authorities with this relevant information as they search or perform other activities in the facility, such as activities for addressing the circumstances warranting the lockdown.

The above system can be further configured to provide the responding authorities with other highly relevant information, or to hi-light certain relevant information. For example, certain information relating to relevant portions of the facility can be transmitted or communicated to the mobile wireless devices of the responding authorities. In some of these embodiments, detailed blueprints of the region of the facility proximate an actuator that was actuated to initiate lockdown procedures can be transmitted or communicated to the mobile wireless devices.

Some of the above embodiments include additional features. For example, the system can be configured so that the electronic blueprints can be used to enable communication between facility occupants, or between facility occupants and others, such as responding authorities. For example, clicking on a certain room of the electronic blueprint displayed on a responding officer's mobile device can initiate communications between that responding officer and occupants of that room.

These embodiments are intended to include or otherwise cover any type of communication, including verbal communications, written communications, communications using symbols, etc. These communications can be either one-way or two-way. Thus, in some embodiments, the responding officer verbally communicates with the facility occupants, while in other embodiments the facility occupants merely electronically transmit words or symbols to the responding officer, such as words or symbols communicating the status of the room that they occupy. For example, the room occupants may transmit words or symbols indicating that they are safe, under attack or threatened, etc. In addition, the room occupants can communicate the existence of injuries, death, etc.

Some of these embodiments also transmit the above information to other entities in addition to the responding officer and facility occupants. For example, some embodiments transmit this information to other responding authorities, such as authorities arriving at or traveling to the facility, authorities disposed at centralized locations, such as at a police station, hospital, fire station, etc. This information can be transmitted or otherwise communicated using any known, related art, or later developed technologies, including over the internet, via a network, such as a secured network, etc.

3. Video and/or Still Image Data

Embodiments are intended to include or otherwise cover any methods and apparatus for determining status or location of an individual whose actions warranted initiation of the lockdown procedures, such as an active shooter. For example, some embodiments are intended to include or otherwise cover any methods and apparatus for collecting, transmitting, using, and/or storing video or still image data, including known, related art, or later developed technologies. A few such embodiments are provided below for exemplary purposes, and they are not intended to constitute an exhaustive listing of all such uses of video or still image data covered by the various embodiments.

In some embodiments, video or still image cameras are provided at, on or proximate the actuators. In some of these embodiments, the cameras are integral to the actuator so as to form a combined camera/actuator assembly. These embodiments may be beneficial by providing a video or still image record of the circumstances resulting in initiation of lockdown procedures.

For example, video or still images of the individual actuating the actuator, as well as circumstances occurring before and/or after the actuation, can be beneficial for numerous reasons. This information may be helpful in investigations following the lockdown, as well as to certain facility occupants and others, such as responding authorities, during the lockdown. Although the image data captured by the combined camera/actuator assembly that was actuated to initiate the lockdown may be especially beneficial, other image data captured by other sources may also be beneficial. In fact, dispersing combined camera/actuator assemblies throughout the facility may be beneficial, such as to responding authorities, by providing image data of the entire facility.

This data may also be helpful to facility occupants who are sheltering in place, and thus it can be transmitted to these facility occupants. In some of these embodiments, the video or still image data is transmitted to screens accessible to the facility occupants sheltering in place, such as for display on permanently installed screens in the rooms where the occupants are sheltering in place, or alternatively or additionally on mobile communication devices.

4. Impeding or Addressing Circumstances Warranting Lockdown

Embodiments are intended to include or otherwise cover other apparatus and methods for impeding or otherwise addressing the circumstances warranting the lockdown. Some of these apparatus and methods are disclosed below for exemplary purposes, but are not intended to constitute an exhaustive listing of all such methods and apparatus.

Some embodiments include apparatus for subduing, incapacitating, or otherwise making less effective an individual whose actions warranted the lockdown. For example, some embodiments include apparatus that performs this operation be generating acoustic or optical transmissions directed to subduing, incapacitating, etc. such as individual. Some such embodiments are configured to automatically or remotely deploy such apparatus upon initiation of lockdown procedures. As one such example, actuation of an actuator can deploy acoustic or optical transmissions designed to subdue or confuse an active shooter. Some of these embodiments deploy such apparatus at locations proximate estimated locations of the active shooter, such as at locations proximate an actuator that was actuator to initiate lockdown procedures.

Alternatively, or in addition to the above, some embodiments include apparatus for helping to secure locations where facility occupants shelter in place. For example, in areas that are appropriate for sheltering in place, such as rooms with doors that lock, apparatus can be provided to make these areas more secure. For example, after initiation of lockdown procedures, apparatus can be manually added to locked doors, such as by facility occupants who are sheltering in place therein, that impede efforts by the individual whose actions warranted the lockdown to obtain access to the secured room or otherwise cause harm therein.

For example, an obstruction can be disposed along all or portions of the locked door to perform this operation. Some of these embodiments include a mechanism to impede the door from being forced open, such as a support that provides resistance to forced entry, e.g., a member that extends from the back surface of the door to the floor. Some of these and/or other embodiments include a cover that extends across all or portions of the door to provide an obstruction, such as from firearms. For example, a bullet resistant material can be draped across the door to impede entry of discharges of firearms. Similar material can be used to provide obstructions across other relevant surfaces, such as across windows or other areas that are likely targets of active shooters.

B. Exemplary Procedures

Some embodiments relate to or otherwise involve lockdown procedures, including critical response training to enhance the overall security posture of a facility by training certain facility occupants, such as facility staff, to properly use the apparatus disclosed above. For example, in the context of a school, students and staff members (including teachers and school administrators) are trained as to the proper circumstances for actuating the system, and to follow procedures designed to safeguard the students and staff members once the lockdown alarm has been activated. For example, staff members are trained to spot potential threats and unusual behavior, and to identify sounds consistent with violent incidents.

Training seminars can be performed independent of the apparatus disclosed above, such as in facilities that do not include a lockdown system or other apparatus, to enable facility occupants to follow procedures designed to enhance their safety in dangerous situations, including active shooter incidents. The training seminars can be implemented in various ways, such as by providing on-site lectures and training seminars. Alternatively or additionally, the training seminars can be implemented via webinars to facilitate reaching a wider audience, or even implemented as application based videos.

In some embodiments directed to schools, webinar participants can include students and staff members from a large number of schools around the country. Webinars can also be used to effectively reach others who are impacted by or utilizing functionalities that are beyond the basic system. For example, webinars can be directed to parents/guardians of students who are notified of a lockdown condition in their child's school, to ensure that the parents/guardians follow proper procedures, such as to gather at appropriate locations that are safe and that do not impede law enforcement operations.

The training seminars of many embodiments include the concept of sheltering in place upon initiation of lockdown procedures, which is disclosed in more detail above. As previously disclosed, sheltering in place is very different from evacuating a facility, such as in the context of a fire alarm, which is typically not appropriate in many lockdown situations, such as those involving an active shooter. Sheltering in place may be especially beneficial by enhancing the safety of facility occupants for a certain amount of time until responding authorities can address the circumstances warranting the lockdown. The training seminars of some embodiments also covers disadvantages in investigating certain potentially dangerous situations, as opposed to immediately sheltering in place.

In some embodiments, facility occupants are trained as to the proper situations for sheltering in place (creating a barrier between the facility occupant and the dangerous condition, i.e., the individual whose actions warranted the lockdown, such as an active shooter) versus fleeing the facility (creating a distance between the facility occupant and the dangerous condition, i.e., the individual whose actions warranted the lockdown, such as an active shooter). Some embodiments train facility occupants as to the proper and improper locations to shelter in place. For example, it may not be appropriate to shelter in place in an unsecured location that can be accessed by the individual whose actions warranted the lockdown, such as an active shooter. In fact, some embodiments include apparatus, such as identifiers or signs that are posted at or proximate entrances of unsecured areas or spaces, such as restrooms, reinforcing the disadvantages of sheltering in place in an unsecured location during a lockdown.

As discussed above, the lockdown training can constitute a preplanned, rehearsed, and coordinated response carried out by facility occupants within a defined area that is designed to create time through the use of barriers and distance. The time provided by these procedures is designed to be greater than the time it will take responding authorities to enter the area and address the circumstances warranting the lockdown.

IV. Other Alternatives

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A processor based lockdown controller for use with a lockdown system configured to facilitate implementation of lockdown procedures at a facility that is configured for occupation by facility occupants and that includes a fire alarm, the fire alarm including a fire alarm actuator and a fire alarm communicator configured to produce a fire alarm communication for communicating actuation of the fire alarm actuator, the lockdown system including a lockdown actuator disposed at the facility and configured to transmit a lockdown initiation signal upon being actuated, the lockdown actuator being configured to be recognizably distinguishable from the fire alarm actuator, the lockdown system also including a lockdown communicator configured to produce a lockdown initiation communication for communicating initiation of lockdown procedures to the facility occupants and emergency responders not disposed proximate the facility upon transmission of the lockdown initiation signal, the lockdown initiation communication being recognizably distinguishable from the fire alarm communication, the lockdown communicator including an annunciator that communicates an audible lockdown initiation annunciation to facility occupants upon transmission of the lockdown initiation signal so as to instruct facility occupants to adopt the lockdown procedures, the lockdown communicator including a visual indicator that communicates a visual indication to facility occupants upon transmission of the lockdown initiation signal so as to inform the facility occupants of the initiation of the lockdown procedures, the lockdown controller also being usable with an actuable traffic signal that instructs a flow of traffic in an area proximate the facility, the lockdown controller being operated by software so as to be capable of performing the following operations:

receiving the lockdown initiation signal transmitted by the lockdown actuator;

upon receipt of the lockdown initiation signal, instructing the annunciator to communicate the audible lockdown initiation annunciation, and instructing the visual indicator to communicate the visual indication; and upon receipt of the lockdown initiation signal, instructing the actuable traffic signal to instruct the flow of traffic away from the facility so as to facilitate travel of the emergency responders to the facility.

2. The processor based lockdown controller of claim 1, wherein the lockdown communicator is also configured to produce a lockdown procedure communication, which is different from the lockdown initiation communication, for communicating to the facility occupants a predetermined lockdown procedure for adoption by the facility occupants subsequent to the initiation of the lockdown procedures, and the predetermined lockdown procedure communicated to facility occupants via the lockdown procedure communication includes instructions for facility occupants to remain within a secured area of the facility, the lockdown controller being operated by software so as to be capable of, subsequent to instructing the annunciator to communicate the audible lockdown initiation annunciation, and subsequent to instructing the visual indicator to communicate the visual indication, instructing the lockdown communicator to communicate the lockdown procedure communication so as to communicate to the facility occupants the predetermined procedure for adoption by the facility occupants.

3. The processor based lockdown controller of claim 2, wherein the predetermined lockdown procedure communicated to facility occupants via the lockdown procedure communication includes an estimation of at least one of: the duration of the lockdown procedures, and a time when responding authorities will be arriving at the facility.

4. The processor based lockdown controller of claim 2, wherein the lockdown communicator includes a display at the facility that is configured, upon receipt of instructions, to communicate the lockdown procedure communication to the facility occupants so as to advise the facility occupants of the predetermined lockdown procedure subsequent to the initiation of the lockdown procedures.

5. The processor based lockdown controller of claim 4, wherein the lockdown procedure communication is in the form of a video, and the lockdown communicator is configured, upon receipt of instructions, to cause the display of the video via the display so as to be viewed by the facility occupants.

6. The processor based lockdown controller of claim 5, wherein the video includes content at least in part in the form of sign language for communicating with facility occupants who are hearing impaired.

7. The processor based lockdown controller of claim 5, wherein the lockdown communicator includes a speaker that is configured, upon receipt of instructions, to provide audio signals that complement the displayed video.

8. The processor based lockdown controller of claim 4, wherein the display is configured, upon receipt of instructions, to also communicate the lockdown initiation communication so as to inform the facility occupants of the initiation of the lockdown procedures upon transmission of the lockdown initiation signal.

9. The processor based lockdown controller of claim 8, wherein the display is configured, upon receipt of instructions, to communicate the lockdown initiation communication prior to communicating the lockdown procedure communication, so as to initially inform the facility occupants of the initiation of the lockdown procedures, and to subsequently advise the facility occupants of the predetermined lockdown procedure.

10. The processor based lockdown controller of claim 2, wherein the lockdown system is for use with mobile devices that each have a display, the mobile devices being disposed at the facility, and the lockdown communicator is configured, upon receipt of instructions, to communicate the lockdown procedure communication to the mobile devices so as to advise the facility occupants of the predetermined lockdown procedure subsequent to the initiation of the lockdown procedures.

11. The processor based lockdown controller of claim 10, wherein the lockdown procedure communication is in the form of a video, and the lockdown communicator is configured, upon receipt of instructions, to cause the display of the video via the mobile devices so as to be viewed by the facility occupants.

12. The processor based lockdown controller of claim 11, wherein the video includes content at least in part in the form of sign language for communicating with facility occupants who are hearing impaired.

13. The processor based lockdown controller of claim 11, wherein the mobile devices each have a speaker that is configured, upon receipt of instructions, to provide audio signals that complement the displayed video.

14. The processor based lockdown controller of claim 10, wherein the lockdown communicator is configured, upon receipt of instructions, to also communicate the lockdown initiation communication to the mobile devices so as to inform the facility occupants of the initiation of the lockdown procedures upon transmission of the lockdown initiation signal.

15. The processor based lockdown controller of claim 14, wherein the lockdown communicator is configured, upon receipt of instructions, to communicate the lockdown initiation communication to the mobile devices prior to communicating the lockdown procedure communication to the mobile devices, so as to initially inform the facility occupants of the initiation of the lockdown procedures, and to subsequently advise the facility occupants of the predetermined lockdown procedure.

16. The processor based lockdown controller of claim 1, wherein the actuable traffic signal includes at least one of a traffic light, a signal controlling entrance and/or exit from a toll booth, a signal controlling entrance and/or exit from a bridge, and a signal controlling entrance and/or exit onto or from a highway.

17. The processor based lockdown controller of claim 1, further including, upon receipt of the lockdown initiation signal, transmitting the lockdown initiation communication to at least one transportation operator responsible for transporting individuals to and/or from the facility, the lockdown initiation signal communicating to the at least one transportation operator to not transport the individuals to the facility until cessation of the lockdown procedures.

18. The processor based lockdown controller of claim 17, wherein the at least one transportation operator receives the lockdown initiation communication via a mobile device, the at least one transportation operator being a bus driver.

19. The processor based lockdown controller of claim 1, further including, upon receipt of the lockdown initiation signal, transmitting the lockdown initiation communication to at least one official responsible for either directing flow of traffic in the area proximate the facility or operating a vehicle in the area proximate the facility, the lockdown initiation signal communicating to the at least one official to either direct traffic away from the facility or operate the vehicle away from the facility.

20. The processor based lockdown controller of claim 19, wherein the at least one official receives the lockdown initiation communication via a mobile device, the at least one official being at least one of a bus driver, a train conductor, a crossing guard, and a toll booth operator.

* * * * *